US012597015B2

(12) United States Patent
Kahn et al.

(10) Patent No.: US 12,597,015 B2
(45) Date of Patent: Apr. 7, 2026

(54) AGENTIC DATA MONETIZATION SYSTEM WITH A DATA ASSET BACKED CRYPTOCURRENCY

(71) Applicant: DataCoining LLC, Princeton, NJ (US)

(72) Inventors: David Brener Kahn, Princeton, NJ (US); Sorat Tungkasiri, Skillman, NJ (US)

(73) Assignee: DataCoining LLC, Princeton, NJ (US)

( * ) Notice: Subject to any disclaimer, the term of this patent is extended or adjusted under 35 U.S.C. 154(b) by 0 days.

(21) Appl. No.: 18/885,168

(22) Filed: Sep. 13, 2024

(65) Prior Publication Data

US 2025/0117780 A1 Apr. 10, 2025

Related U.S. Application Data

(63) Continuation of application No. 17/702,775, filed on Mar. 23, 2022, now Pat. No. 12,093,928.

(Continued)

(51) Int. Cl.
*G06Q 20/36* (2012.01)
*G06Q 30/0201* (2023.01)
*G06Q 40/04* (2012.01)

(52) U.S. Cl.
CPC ....... *G06Q 20/367* (2013.01); *G06Q 30/0206* (2013.01); *G06Q 40/04* (2013.01); *G06Q 2220/16* (2013.01)

(58) Field of Classification Search
CPC .. G06Q 20/367; G06Q 30/0206; G06Q 40/04; G06Q 2220/16; G06Q 20/02; G06Q 20/0655
See application file for complete search history.

(56) References Cited

U.S. PATENT DOCUMENTS

2011/0055019 A1 3/2011 Coleman
2011/0202881 A1 8/2011 Singh et al.
(Continued)

FOREIGN PATENT DOCUMENTS

GB 2 572 627 A 10/2019
KR 101935297 B1 4/2019
WO WO-2020/145887 A2 7/2020

OTHER PUBLICATIONS

A Blockchain-based System for Online Consumer Reviews K. Salah, A. Alfalasi, M. Alfalasi Department of Electrical and Computer Engineering Khalifa University of Science and Technology, Abu Dhabi, UAE (Year: 2019).*

(Continued)

*Primary Examiner* — Alexandru Cirnu
(74) *Attorney, Agent, or Firm* — Foley & Lardner LLP

(57) ABSTRACT

A system and method for operating a cryptocurrency, including generating, by first computing devices, raw data sets representative of activities performed by respective users while each of the users is using the Internet. A second computing device may determine an aggregate data value of at least a portion of an aggregate of the raw data sets. The at least a portion of the aggregate of the raw data sets being received from the users who contribute that portion of the raw data sets, the contributing users being data contributors. A basis value of a cryptocurrency as a function of the aggregate data value may be established. Total quantity of the cryptocurrency in circulation may be regulated as a function of the aggregate data value.

23 Claims, 17 Drawing Sheets

Related U.S. Application Data

(60) Provisional application No. 63/293,019, filed on Dec. 22, 2021, provisional application No. 63/274,137, filed on Nov. 1, 2021, provisional application No. 63/164,648, filed on Mar. 23, 2021.

(56) References Cited

U.S. PATENT DOCUMENTS

| | | | |
|---|---|---|---|
| 2011/0313915 | A1 | 12/2011 | Tang |
| 2017/0221021 | A1* | 8/2017 | Gazetov ............... G06Q 20/367 |
| 2018/0262514 | A1 | 9/2018 | Hall et al. |
| 2019/0197831 | A1* | 6/2019 | Batton .................. H04L 9/3239 |
| 2019/0287149 | A1 | 9/2019 | Papp et al. |
| 2019/0295177 | A1 | 9/2019 | Parker, Jr. |
| 2019/0333149 | A1* | 10/2019 | Kim ................... G06Q 20/3678 |
| 2019/0356641 | A1 | 11/2019 | Isaacson et al. |
| 2020/0020032 | A1 | 1/2020 | Bleznak et al. |
| 2020/0042989 | A1 | 2/2020 | Ramadoss et al. |
| 2020/0051081 | A1 | 2/2020 | Valecha et al. |
| 2020/0058019 | A1* | 2/2020 | Navin ................ G06Q 30/0201 |
| 2020/0153610 | A1 | 5/2020 | Bisti et al. |
| 2020/0160455 | A1 | 5/2020 | Singh et al. |
| 2020/0273002 | A1 | 8/2020 | Regen |
| 2020/0294033 | A1 | 9/2020 | Wilson et al. |
| 2021/0182804 | A1 | 6/2021 | Tavanez et al. |
| 2024/0086901 | A1 | 3/2024 | Moreira |

OTHER PUBLICATIONS

International Preliminary Report on Patentability on International Patent Application No. PCT/IB2022/053236 dated Oct. 5, 2023, 10 pages.

International Search Report and Written Opinion in PCT/IB2022/053236 dated Jul. 20, 2022, 13 pages.

Salah, et al, A Blockchain-based System for Online Consumer Reviews, Department of Electrical and Computer Engineering, Khalifa University of Science and Technology, Abu Dhabi, UAE, 2019.

* cited by examiner

123 - Full Name           MNO - IP address
456 - Medical Records     PQR - Income Bracket
789 - Ethnicity              STU - Credit Score
012 - Religion               VWX - Education
ABC - Home Owner        YZ1 - Age Range
DEF - Home Address or Zip   aaa - Gender
GHI - Email Address        bbb - Employer/Employment
JKL - Telephone Number     ccc - Political Affiliation

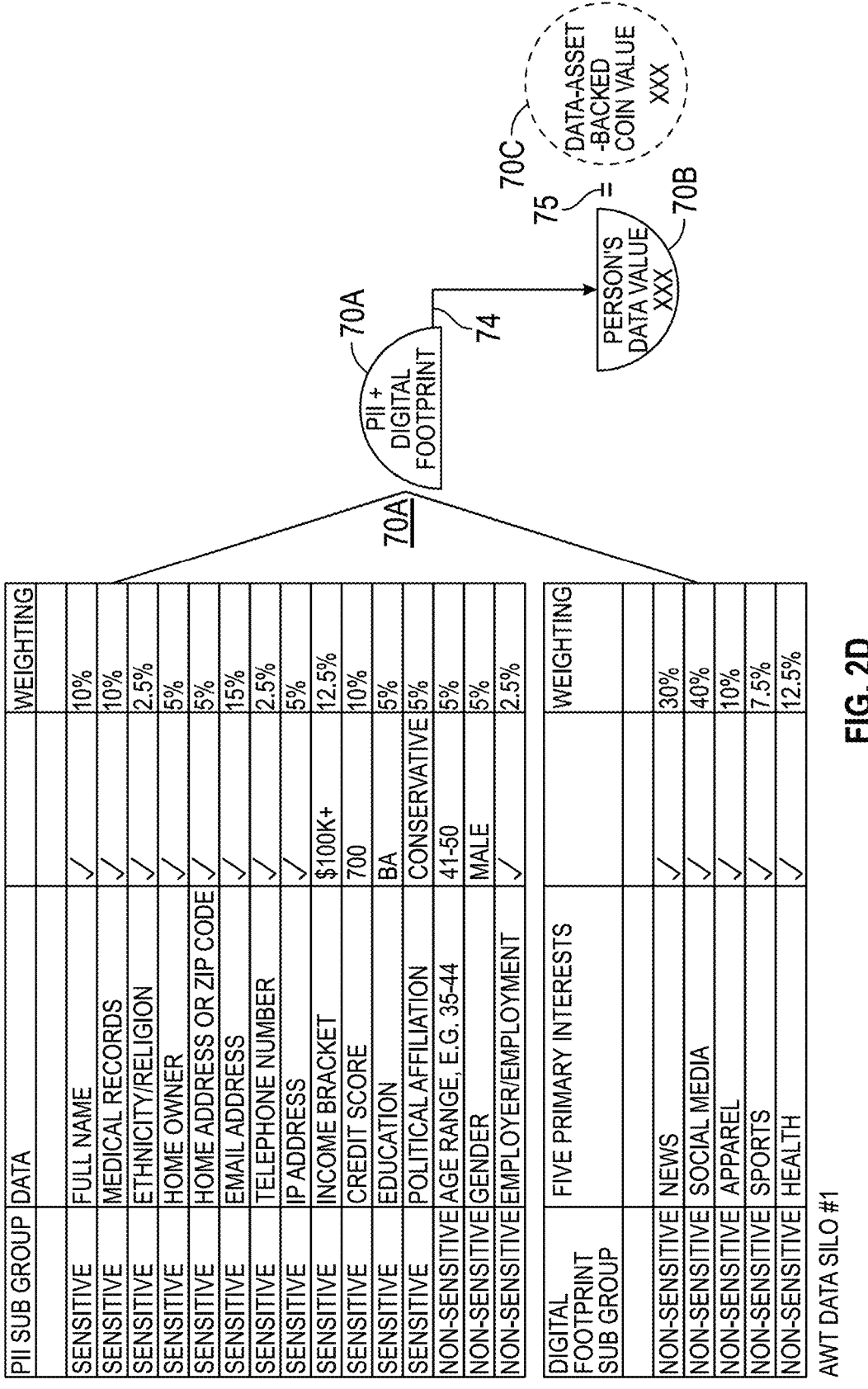

| PII SUB GROUP | DATA | | WEIGHTING |
|---|---|---|---|
| SENSITIVE | FULL NAME | ✓ | 10% |
| SENSITIVE | MEDICAL RECORDS | ✓ | 10% |
| SENSITIVE | ETHNICITY/RELIGION | ✓ | 2.5% |
| SENSITIVE | HOME OWNER | ✓ | 5% |
| SENSITIVE | HOME ADDRESS OR ZIP CODE | ✓ | 5% |
| SENSITIVE | EMAIL ADDRESS | ✓ | 15% |
| SENSITIVE | TELEPHONE NUMBER | ✓ | 2.5% |
| SENSITIVE | IP ADDRESS | ✓ | 5% |
| SENSITIVE | INCOME BRACKET | $100K+ | 12.5% |
| SENSITIVE | CREDIT SCORE | 700 | 10% |
| SENSITIVE | EDUCATION | BA | 5% |
| SENSITIVE | POLITICAL AFFILIATION | CONSERVATIVE | 5% |
| NON-SENSITIVE | AGE RANGE, E.G. 35-44 | 41-50 | 5% |
| NON-SENSITIVE | GENDER | MALE | 5% |
| NON-SENSITIVE | EMPLOYER/EMPLOYMENT | ✓ | 2.5% |

| DIGITAL FOOTPRINT SUB GROUP | FIVE PRIMARY INTERESTS | | WEIGHTING |
|---|---|---|---|
| NON-SENSITIVE | NEWS | ✓ | 30% |
| NON-SENSITIVE | SOCIAL MEDIA | ✓ | 40% |
| NON-SENSITIVE | APPAREL | ✓ | 10% |
| NON-SENSITIVE | SPORTS | ✓ | 7.5% |
| NON-SENSITIVE | HEALTH | ✓ | 12.5% |

AWT DATA SILO #1

70A

PII + DIGITAL FOOTPRINT

70A

74

PERSON'S DATA VALUE XXX

70B

75

70C

DATA-ASSET -BACKED COIN VALUE XXX

FIG. 2D

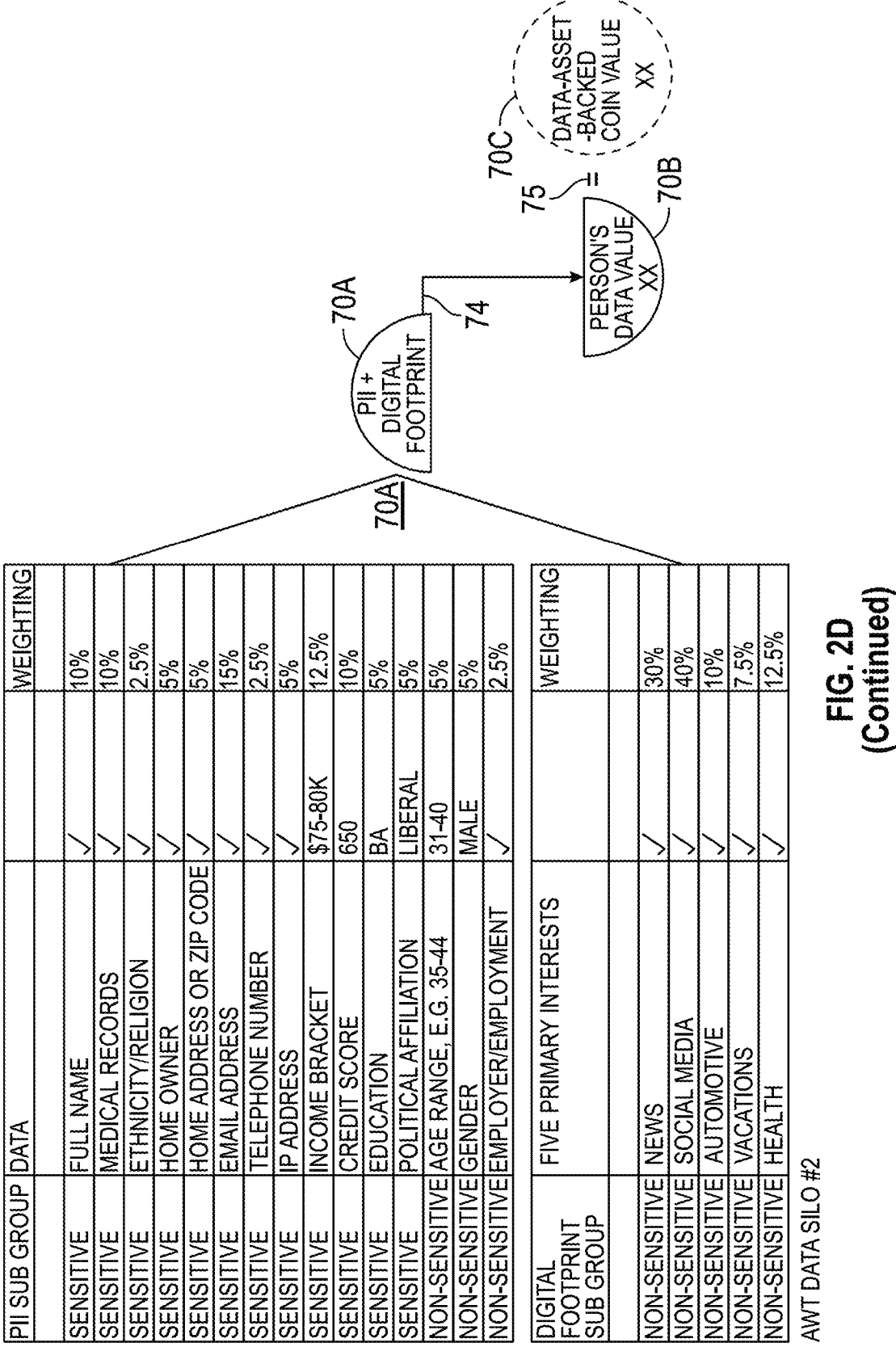

| PII SUB GROUP | DATA | | WEIGHTING |
|---|---|---|---|
| SENSITIVE | FULL NAME | ✓ | 10% |
| SENSITIVE | MEDICAL RECORDS | ✓ | 10% |
| SENSITIVE | ETHNICITY/RELIGION | ✓ | 2.5% |
| SENSITIVE | HOME OWNER | ✓ | 5% |
| SENSITIVE | HOME ADDRESS OR ZIP CODE | ✓ | 5% |
| SENSITIVE | EMAIL ADDRESS | ✓ | 15% |
| SENSITIVE | TELEPHONE NUMBER | ✓ | 2.5% |
| SENSITIVE | IP ADDRESS | ✓ | 5% |
| SENSITIVE | INCOME BRACKET | $75-80K | 12.5% |
| SENSITIVE | CREDIT SCORE | 650 | 10% |
| SENSITIVE | EDUCATION | BA | 5% |
| SENSITIVE | POLITICAL AFFILIATION | LIBERAL | 5% |
| NON-SENSITIVE | AGE RANGE, E.G. 35-44 | 31-40 | 5% |
| NON-SENSITIVE | GENDER | MALE | 5% |
| NON-SENSITIVE | EMPLOYER/EMPLOYMENT | ✓ | 2.5% |

| DIGITAL FOOTPRINT SUB GROUP | FIVE PRIMARY INTERESTS | | WEIGHTING |
|---|---|---|---|
| NON-SENSITIVE | NEWS | ✓ | 30% |
| NON-SENSITIVE | SOCIAL MEDIA | ✓ | 40% |
| NON-SENSITIVE | AUTOMOTIVE | ✓ | 10% |
| NON-SENSITIVE | VACATIONS | ✓ | 7.5% |
| NON-SENSITIVE | HEALTH | ✓ | 12.5% |

AWT DATA SILO #2

70A

70A

PII + DIGITAL FOOTPRINT

74

70B

PERSON'S DATA VALUE XX

75

70C

'DATA-ASSET -BACKED COIN VALUE XX

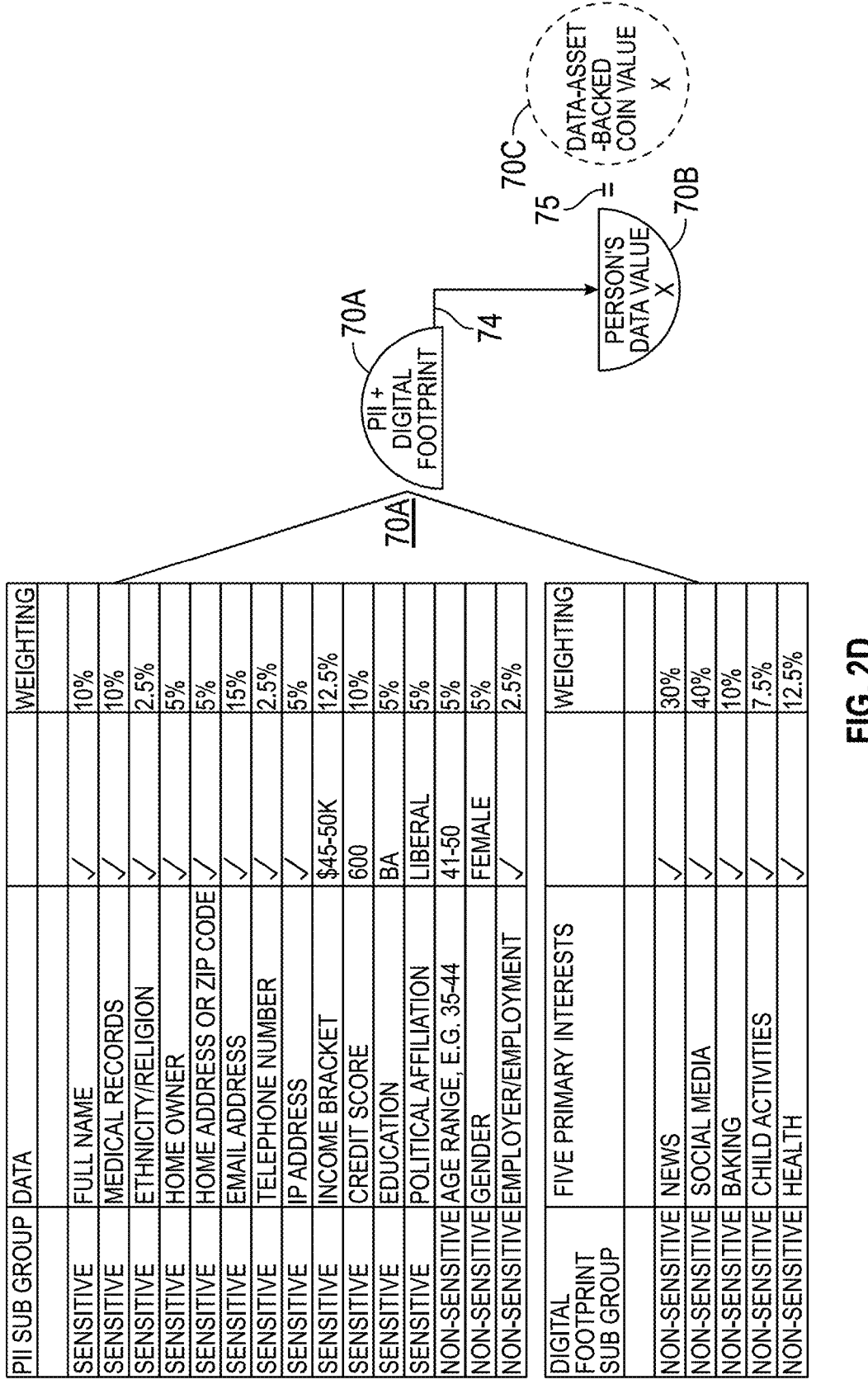

| PII SUB GROUP | DATA | | WEIGHTING |
|---|---|---|---|
| SENSITIVE | FULL NAME | ✓ | 10% |
| SENSITIVE | MEDICAL RECORDS | ✓ | 10% |
| SENSITIVE | ETHNICITY/RELIGION | ✓ | 2.5% |
| SENSITIVE | HOME OWNER | ✓ | 5% |
| SENSITIVE | HOME ADDRESS OR ZIP CODE | ✓ | 5% |
| SENSITIVE | EMAIL ADDRESS | ✓ | 15% |
| SENSITIVE | TELEPHONE NUMBER | ✓ | 2.5% |
| SENSITIVE | IP ADDRESS | ✓ | 5% |
| SENSITIVE | INCOME BRACKET | $45-50K | 12.5% |
| SENSITIVE | CREDIT SCORE | 600 | 10% |
| SENSITIVE | EDUCATION | BA | 5% |
| SENSITIVE | POLITICAL AFFILIATION | LIBERAL | 5% |
| NON-SENSITIVE | AGE RANGE, E.G. 35-44 | 41-50 | 5% |
| NON-SENSITIVE | GENDER | FEMALE | 5% |
| NON-SENSITIVE | EMPLOYER/EMPLOYMENT | ✓ | 2.5% |

| DIGITAL FOOTPRINT SUB GROUP | FIVE PRIMARY INTERESTS | | WEIGHTING |
|---|---|---|---|
| NON-SENSITIVE | NEWS | ✓ | 30% |
| NON-SENSITIVE | SOCIAL MEDIA | ✓ | 40% |
| NON-SENSITIVE | BAKING | ✓ | 10% |
| NON-SENSITIVE | CHILD ACTIVITIES | ✓ | 7.5% |
| NON-SENSITIVE | HEALTH | ✓ | 12.5% |

70A

PII + DIGITAL FOOTPRINT

70A

74

PERSON'S DATA VALUE X

70B

75

=

DATA-ASSET -BACKED COIN VALUE X

Work Token Communications

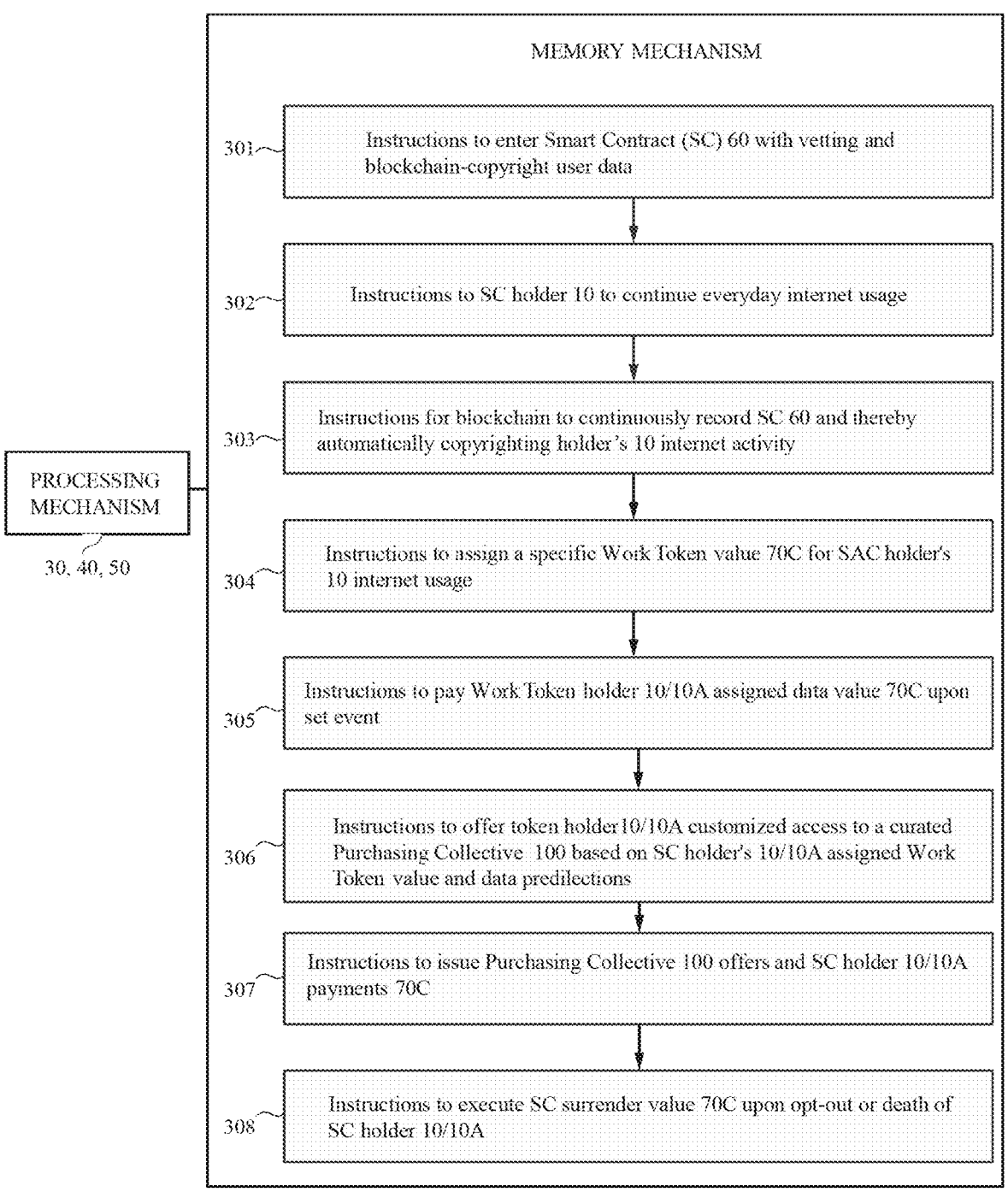

MEMORY MECHANISM

301 — Instructions to enter Smart Contract (SC) 60 with vetting and blockchain-copyright user data 302 — Instructions to SC holder 10 to continue everyday internet usage 303 — Instructions for blockchain to continuously record SC 60 and thereby automatically copyrighting holder's 10 internet activity 304 — Instructions to assign a specific Work Token value 70C for SAC holder's 10 internet usage 305 — Instructions to pay Work Token holder 10/10A assigned data value 70C upon set event 306 — Instructions to offer token holder10/10A customized access to a curated Purchasing Collective 100 based on SC holder's 10/10A assigned Work Token value and data predilections 307 — Instructions to issue Purchasing Collective 100 offers and SC holder 10/10A payments 70C 308 — Instructions to execute SC surrender value 70C upon opt-out or death of SC holder 10/10A

PROCESSING MECHANISM 30, 40, 50

FIG. 5

AGENTIC DATA MONETIZATION SYSTEM WITH A DATA ASSET BACKED CRYPTOCURRENCY

RELATED APPLICATIONS

This application is a continuation of U.S. application Ser. No. 17/702,775, filed Mar. 23, 2022, which claims priority to U.S. Provisional Patent Application Nos. 63/164,648, filed Mar. 23, 2021, 63/274,137, filed Nov. 1, 2021, and 63/293,019, filed Dec. 22, 2021; the contents of which are hereby incorporated by reference in their entirety.

BACKGROUND

There are two universal facts that all users of online Internet access:

(i) Every person produces data assets with significant commercial and social policy value; and (ii) Privacy, hence, data protection, is increasingly a universal concern for people for a wide range of reasons.

If a person uses the Internet, common property law dictates that he/she owns his/her data assets. Anytime an individual conducts Internet activity, particularly online purchases, his/her data digital footprint asset aggregates and builds a larger data set. Every individual's Personal Data combined with his/her digital footprint data is commercially valuable for the data sets' respective commercial and social policy applications/insights.

Data may best be thought of as an asset that accretes value through its use. When data is transformed into information that contains economic characteristics and facilitates actionable insights, the data becomes a commoditized asset.

SUMMARY

To provide cryptocurrency with an underlying basis value, users of a network, such as the Internet, in which value is given to personal identifiable information (PII) and online usage/presence data of a group of users may be collected and used to support cryptocurrency value. As the group of users becomes large, the value of data generated by the users may increase, thereby increasing the asset value of the cryptocurrency.

One embodiment may include a computer-based implementation based on the following interrelated premises: (i) every person produces valuable personal data as a function of his or her digital footprint through online usage which, in turn, creates a valuable tangible asset (data asset) that can be stored data (e.g., stored on a blockchain), which may assume the form of or be represented as a non-fungible token (NFT). The collected digital footprint may represent a user's creative and unique expression and may potentially be copyrighted and reside on a blockchain. The copyrighted data may be personally owned by respective individual users and serve as a personal valuable asset, and be categorized as intangible property or intellectual property when the tangible data asset (digital footprint) is applied in the form of a copyright and/or private data. If a person uses the Internet or a network, that individual should own the data s/he generates. In exchange for assigning or licensing a person's aforementioned blockchain copyrighted data assets, the person may receive a blockchain token incorporating that person's personal information and digital data-asset footprint data (Personal Data) through blockchain conversion. In an embodiment, an individual who works for a company may generate multiple data assets, a work asset and a personal asset, and such data assets may be respectively owned by the company and individual. In accordance with the principles described herein, the computer-based implementation of a browser, for example, or other application may support the ability to create one or more distinct data assets by distinguishing the distinct digital footprints based on time-of-day, location of a user, device being used by the user, whether the user is performing work activities or personal activities, or otherwise. More than two distinct data assets may be possible, as well.

The data asset that may be stored on a blockchain and may further be copyrightable or copyrighted, may be considered to be a Work Token. The Work Token may be converted into a specific data-asset backed cryptocurrency, optionally branded herein as a personally identifiable information coin (PIICOIN), supported by a pool of collective or aggregated Personal Data of users of an Internet browser configured to collect and/or process PII data, optionally including digital footprint (i.e., online activities), for example, thereby commanding immense commercial value. This Work Token may further be thought of as a unique digital form of self-sovereign identification with such an identity's associated centralized personal information. This PII data may include, but is not limited to, monetizable raw and platform processed information regarding:

A. Demographics: age, gender, income, marital status and ethnic background;

B. Psychographics: activities, personality and values, attitudes, interests, lifestyles, opinions, and religious beliefs;

C. Behavioral customer emphases: purchasing behavior, benefits, usage rates, and patterns; benefits sought, customer journey stage, usage based, occasion or timing, customer satisfaction, customer loyalty, and interests.

D. Geographics: local, regional, national, international.

E. Digital footprint: Categories of sites visited (e.g., social media, sports, educational, news sources of certain political leanings, shopping sites, financial sites, investment sites, searches, etc.), posts or messaging with determined sentiment, and so forth.

The Work Token may also be thought of as an additional form of self-sovereign digital identity. Such a digital selfhood may be owned by respective users, thereby providing individuals with control of their digital personality and presence while simultaneously instituting online interaction trust. The Work Token may present an immutable record of personal data credentials to third-parties, thereby allowing immediate authentication and resulting trust. In this way, a verifier's confidence in the Work Token may be transferred to and vested in that Work Token's owner. Therefore, a triad of trust is formed among the Work Token issuing platform, the Work Token owner, and third-party data acquirers. For an identity system to be self-sovereign, users or Work Token owners may regulate the input of one's verifiable information or personal data through an opt-in mechanism (e.g., opt-in selection of a customized browser configured to collect digital footprint data). The de-centralized opt-in feature limits or prohibits the (un) intended or non-permissioned sharing of users' personal data. This feature is in contrast to a centralized identity archetype, where an individual's identity and associated data is monetized without the data owner's permission by a third-party data harvester. Non-limiting examples of this non-permissioned commercial data use include Internet browsers, search engines, and social media platforms.

Therefore, a monetizable data-populated Work Token supporting a cryptocurrency PIICOIN is unlike cryptocurrencies that are simply backed by their developers' full faith vision, credit, networks, or crypto stablecoins backed by fiat. Instead, a cryptocurrency PIICOIN is backed by the data assets of generated by users who contribute the data for creating asset-backed cryptocurrency value that are available to create revenues in the form of targeted advertising or otherwise.

Therefore, the principles of a system and method may:
(i) allow a Smart Contract (i.e., a set of executable terms and conditions established by an owner of a Work Token and/or PIICOIN) established with an owner, who may be considered a Data Contributor, to populate, deposit, blockchain-copyright his or her information, imprint, non-fungible tokenize and assign, license, or optionally share ownership of the generated data so as to make available embedded data (of a Work Token) onto a Smart Contract. In return, the assigned Data Contributors may be paid directly for monetizing his/ her unique personal information and/or digital footprint through being issued either fractions of a PIICOIN or whole PIICOIN(s). The value of the PIICOINs may be created and supported by the revenue streams of a person's individual data assets and amalgamated curated data when combined with a large group of individual's collective data asset pool. A PIICOIN holder may exchange his/her PIICOIN cryptocurrency directly with a system that issues the PIICOINs for fiat payment or seek a third-party crypto exchange to cash-in his/her PIICOIN tokens. Alternatively, the PIICOIN holder may use his/her PIICOINs to purchase goods and services from a network of preferred vendors, for example, who accept PIICOINs as payment; and
(ii) create large-scale group purchasing power for Smart Contract recipients through a buying collective of like-minded and data-situated Smart Contract owners through their Smart Contracts interfacing and interacting through a large group Data Contributor data pool. A Smart Contract owner's individual PPI/Internet Activity Payment may be deposited into a platform account of his/her choice (e.g., a Smart Contract Issuer Platform (SCIP)). Through a pooled issuing SCIP purchasing and social cause collective of interactive/interacting Smart Contracts, the Purchasing Collective, allows vast numbers of Smart Contract owners to command unheard of group purchasing power and quantum discounts for purchasing goods/services, pre-approved financing for said purchases, create peer-to-peer Smart Contract exchanges and the support Smart Contract social networking/causes that will generate commissions for the Smart Contract system.

The principles provided herein may also summarized according the following condensed steps for protecting, storing, processing, and interrelating human individuals' opt-in Personal Data via a central Smart Contract Data Repository system configured to:
(1) in response to a data-owner contributor (user) submitting a machine-enabled electronic form to receive and record personal personally identifiable information of a user recognizing such as data asset enhanced through artificial intelligence configured to identify categories, likes, dislikes, etc., of a user along with demographic and other PII to increase value thereof;
(2) in response to a Data Contributor submitting or contributing a machine enabled electronic form to receive and record a human being's digital presence/ footprint recognizing such as data asset;
(3) create legal sovereign data copyright ownership or a non-fungible token (NFT) for the aforementioned Personal Data owner-contributors of PII and digital presence/footprint Personal Data by providing a specific electronic platform to blockchain copyright by U.S. law said PII and digital presence/footprint data using an electronic link to the enabling Smart Contract automated Personal Data copyrighting apparatus to allow the instantaneous and continuous blockchain-copyrighting and protection of said Personal Data;
(4) mold one or more plurality of Personal Data assets from one or more raw Personal Data sets from opt-in Personal Data owner-contributors providing both PII and digital presence/footprint data to create a plurality of blockchain-copyrighted data assets;
(5) tier, group, organize, and interrelate said Personal Data assets into specific data asset silos;
(6) protect and store the data asset silos as (or in) blockchains within a network of secure computers and servers;
(7) digitally store the unique blockchain-copyrighted subject identifiers and converted unique blockchain-copyrighted data to Smart Contract Data Repository as a plurality of data assets;
(8) license or sell through the data owner-contributor's opt-in Smart Contract the commercial value of said plurality of data assets to a third party data acquirer;
(9) through Smart Contract rights, transmit said blockchain-copyrighted data from the Smart Contract Data Repository using an electronic link to a data acquirer in exchange for good and valuable consideration including a specialized personal data-asset backed PIICOIN (or fiat) or electronic debit card payment;
(10) in response to a data owner-contributor submitting the aforementioned web-based Smart Contract intake form producing the blockchain-copyrighted unique human identifier and corresponding Personal Data assets to the repository, to create recompense in the form a data-asset backed PIICOIN;
(11) said data-asset backed PIICOIN is backed by the revenues generated by the large Data Repository;
(12) said data-asset backed PIICOIN is also backed by the revenues generated by commissions earned by providing the purchasing collective and social network;
(13) the human data owner contributor is invited electronically to participate in a collective purchasing cooperative (Purchasing Collective) with other data inputters that is offered quantum discounts for goods and services from select vendors; the Purchasing Collective may accept the data-asset PIICOIN in exchange for goods and services;
(14) the human data owner contributor is invited electronically to participate in a Social Collective of like-data and common cause-oriented individuals.

It should be understood that the use of blockchains for collecting and storing data may include using one or more blockchains for each individual user.

Moreover, the principles provided herein revolve around the Smart Contract Issuer Platform (SCIP), where the SCIP may be a system including multiple personal computing devices interacting with the SCIP computing network that enables any Internet-connected human being to safeguard, own, and profit from his/her personal identifying information (PII) and respective Internet digital presence/footprint. This data sovereignty—affording full control and legal ownership of one's Personal Data—may be accomplished through a blockchain-copyrighting of Data Contributor data to create a non-fungible token (NFT) that expands its blockchain blocks over time with each new data input to also serve as a personal work token. This collective blockchain-copyrighted data becomes both a valuable commercial and public policy asset. In return for protecting, contributing, sharing and ultimately monetizing this valuable Personal Data, Personal Data owner-contributors are rewarded by the SCIP with a new class of data asset-backed PIICOIN cryptocurrency or an alternative form of recompense. The SCIP data-asset backed PIICOIN cryptocurrency—unlike other cryptocurrencies such as Bitcoin, Tether, USD Coin, Binance or Dai—may use both the enormous commercial third-party data sales revenues and related commission-based sales revenues from the system's Purchasing Collective and Social Collectives, composed of Personal Data owner-contributors, to create and financially back ATCs.

In further detail, on an opt-in basis, the SCIP interacts with its human owner to capture, collect, imprint, copyright, deposit, cleanse, sort, analyze, configure, communicate and share data asset ownership rights. A Smart Contract may be crafted, housed, issued, and communicates via a decentralized blockchain SCIP system that enables its plurality of Smart Contracts to interact and interface. By mining human mindpower, a person may provision and continuously accrete digital data value on his/her Work Token subject to being stored subject electronic conditional requests. When continuous data input creates changes and updates, these data additions are made automatically and systematically through one or more processing activities and associated data sorting, parsing, analysis, tiering, interrelating and grouping (creating a database associated with data owners possessing similar geographic, economic, education, political, and other such aligned data strata). In exchange for a human owner agreeing to partner and share his/her data asset through a Smart Contract, the SCIP issued Work Token remunerates its human owner through issuing PIICOINs or an alternate form of recompense.

With a vast number of Work Tokens using artificial intelligence to communicate amongst one another, the system may create an exclusive Purchasing Collective to command quantum group discounts, the production of special limited-run items, and other bulk purchasing advantages along with preferred financing for goods/services and, if desired, the pseudonymous delivery of the goods along with a Social Collective for similar individuals through artificial intelligence recognition of their shared data traits.

A system and method for operating a cryptocurrency, including generating, by first computing devices, raw data sets representative of activities performed by respective users while each of the users is using the Internet. A second computing device may determine an aggregate data value of at least a portion of an aggregate of the raw data sets. The at least a portion of the aggregate of the raw data sets being received from the users who contribute that portion of the raw data sets, the contributing users being data contributors. A basis value of a cryptocurrency as a function of the aggregate data value may be established. Total quantity of the cryptocurrency in circulation may be regulated as a function of the aggregate data value.

BRIEF DESCRIPTION OF THE DRAWINGS

A more complete understanding of the method and apparatus of the presently claimed invention may be obtained by reference to the following Detailed Description when taken in conjunction with the accompanying Drawings wherein:

FIG. 2D is an illustration of a part of the opt-in PII data and digital footprint information that a Work Token captures;

FIG. 5 represents an example of the system's processing and non-transitory machine-readable memory mechanisms' transmittable enabling/disabling instructions consistent in congruity with the disclosure.

DETAILED DESCRIPTION OF THE DRAWINGS

Figure 1:
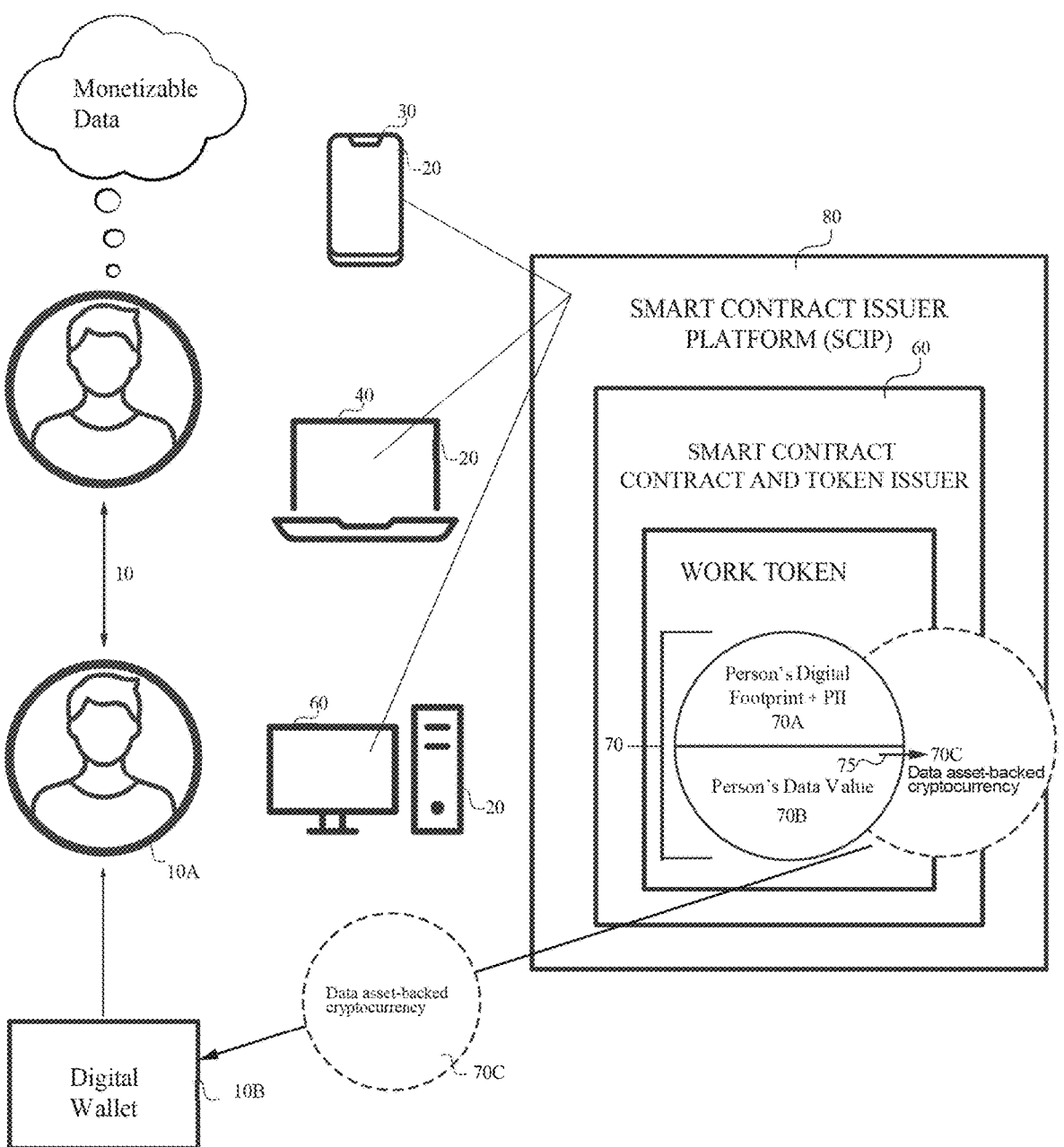
FIG. 1 is an illustration of a system including a plurality of computing devices that enable the capturing, depositing, imprinting, blockchain copyrighting, non-fungible tokenizing, cleansing, sorting, analysis, configuring, interrelating, and assignment or licensing or otherwise creating shared ownership of a prospective Smart Contract owner's personally identifiable information (PII) and digital footprint data assets.

The principles described herein may be configured to utilize data that is transformed into information that contains economic characteristics the provide actionable insights into users on an individual and aggregate basis. The principles described herein may utilize machine intelligence to track, capture, blockchain, blockchain-copyright, sort, interrelate and analyze data characteristics combined with other artificial intelligence mechanisms. Certain variables that help determine data's commercial value include data (i) reusability, (ii) ability to replicate or merge and amalgamate with other data to create new data, (iii) interrelate, and (iv) transferability to others. For data to be transformed into an asset, the data should be relevant, timely, and optimally formatted so as to be suitable for use and defect-free. Translating data into actionable commercial information necessitates being able to find patterns within the data that yield insights and, thus, create economic value. While one person's data certainly has commercial value, a combined data pool generated by millions or hundreds of millions of people has vast economic value. The collective data observation is especially true when combining data sets to create de novo insights, social policy, and commercial values for myriad market participants and stakeholders.

Personal Data assets may include, but are not limited to, personally identifiable information (PII), which may be information that directly (or indirectly) identifies an individual including names, addresses, social security numbers, dates of birth and digital presence/footprint including Internet browsing habits, purchasing history, his/her preferences on social media platforms, blog interactions, etc. In any embodiment described herein, personal identifying information and digital presence/footprint may include, but is not limited to, the data owner's: (1) name, or alternatively, a pseudonymous blockchain identification (2) physical address; (3) social security number; (4) telephone number; (5) email address; (6) information associated with one or more of the data owner's credit cards; (7) banking information; (8) IP address; (9) geographic address and zip code; and/or (10) other personal information including public electronic disclosures. Personal data also incorporates digital Internet search histories and queries. In particular embodiments, digital presence/footprint may include one or more tracking cookies.

As a representative example of data-asset value built by an issuer of a Smart Contract, the average recurring annual value of large search engine and social media sites is suggested to be about $112 with a weighted average of $184 per annual user. For the present disclosure, this type of recurring research and advertising Data Contributor value may be derived from a personal data repository of a Data Contributor associated with the Smart Contract. Therefore, the data repository associated with a Smart Contract may generate third party sales revenues for select data. These revenues provide a first "data-asset" or data revenues undergirding the value of specialized cryptocurrency or PIICOIN associated with a Smart Contract. In addition, the principles described herein confer a second data-asset revenue backed value when tiers of like-minded, financially situated, vetted and qualified interested consumers are grouped into large purchasing collectives to acquire discounted products and services, whereby a portion of those revenues may be allocated to supporting this new form of data-asset backed or revenue supported cryptocurrency or PIICOIN. In a different embodiment, a Peer-to-Peer Seller Network may confer commissions for the Smart Contract Issuer Platform to further support the cryptocurrency or PIICOIN. Lastly, the principles provided herein offer a fourth data-asset value: people's confidence in owning a blockchain copyrighted true sovereign digital identity and data footprint that may be safeguarded by "best-of-breed" technology and security practices to entice more people to join a network of issuers of Smart Contracts, and, hence, producing more data with every user. As will be provided further herein, the more data produced by each individual and/or a collective of individuals who issue Smart Contracts for their PII and digital presence/footprint (collectively Personal Data), the more that value the Data Contributor data to support value of the cryptocurrency.

The principles described herein includes capturing, imprinting, storing the Data Contributor data on a blockchain including an individualized blockchain, blockchain-copyrighting, sorting, cleansing, tiering, interrelating, and pooling valuable personal information and data assets onto a Smart Contract that may be utilized for a number of purposes, including generating value and participating with a platform provider to receive value, such as the PIICOIN cryptocurrency, for the respective users. When converted to blockchain or a tangible medium, a person's personal identifiable information and digital footprint (i.e., Personal Data) using specific selectable features by that person may be automatically copyrighted by U.S. law under common law rights and/or using a data compilation filing class. In an embodiment, a system and process may be configured to manually, semi-automatically, and/or automatically register the Personal Data with a governmental agency for federal copyright protection. This automated blockchain Personal Data conversion feature may grant an instantaneous copyright to afford direct ownership the Personal Data. This blockchain-copyrighted information is transformed into a non-fungible token (NFT) with the commensurate legal right and the ability, as a Work Token, to assign or license or otherwise share in the ownership of the Personal Data's capture and curated use. Therefore, one embodiment of a blockchain-based non-fungible token (NFT) may create a shared, unchangeable distributed ledger that allows an owner-contributor of Personal Information to record and track transactions within a network of the Smart Contract as a "block" to be included in a blockchain. When a block stores new information, the block may then be added to a blockchain associated with the Data Contributor that includes multiple blocks linked together and becomes available to every specific individual registered on that blockchain. Blockchain's widely adopted benefits include: transparency, decentralization, security, flexibility, a user-controlled network, efficiency, auditability, reduced transaction cost, faster transmission settlements, automated operations, distributed architecture and worldwide adoption.

The principles described herein may (1) generate a respective unique blockchain-copyrighted subject identifier for each of a plurality of individualized data owners in response to the each respective data owner's initial and continuous contribution of his/her PII/digital presence/footprint (Personal Data) of a particular form; (2) maintain a secure blockchain-based aggregative database for each respective individualized data-owner identifier, which may be grouped into machine organized tiers, groups, and subsets of data contributor owners electronically cataloged as such, and (3) electronically link each respective individualized data owner blockchain identifier to the (i) application initially submitted by the data owner-contributor; and (ii) the Personal Data assets collected, blockchain-copyright protected, imprinted, cleansed, sorted, analyzed, communicated, and configured to both safeguard and monetize said Personal Data.

In various embodiments, when automatically completing the blockchain-based copyright Smart Contract application intake process on behalf of the data owner-contributor, one embodiment of a system and process may be configured to receive and provide PII data, but not receive or provide any digital presence/footprint data or, conversely may be configured to receive and provide a personally identifiable or pseudonymous digital presence/footprint data, but not receive provide any PII data. Still yet, the blockchain-based copyright Smart Contract application intake process may be configured to receive and provide PII data and digital presence/footprint data in numerous opt-in combinations.

Therefore, in various embodiments, the principles described herein may be configured to: (1) identify a web-based blockchain data conversion process or program used to collect and convert into blockchain-copyright format one or more pieces of independent or combined PII/digital presence/footprint data or objects; (2) add the owner's Personal Data assets to the Smart Contract platform's Data Repository through an electronic form link; (3) in response to Personal Data owner-contributors completing the blockchain copyright process, create a unique Personal Data owner blockchain identifier to submit to the Smart Contract Data Repository blockchain or other configured data storage cache; (4) submit the unique blockchain-copyrighted converted Personal Data provided by Personal Data owner-contributors to the Smart Contract Data Repository blockchain or other configured data storage cache; (5) digitally store the blockchain-copyrighted identifier and corresponding accompanying PII/digital presence/footprint data; (6) provide access to the PII/digital presence/footprint data stored in the Smart Contract Data Repository blockchain or other configured data storage cache of Personal Data owner-contributors; (7) calculate the Personal Data asset commercial value by Personal Data owner-contributors amongst multiple data asset bundle values within the Smart Contract Data Repository, where blockchain copyrighted Personal Data input may be transmitted and stored; (8) take one or more actions based on the data access permission by Personal Data owner-contributors; (9) license or sell PII/digital presence/footprint data of data owner contributors on the behalf of said owner-contributors with specific attribution or anonymous generic attribution; and (10) remit agreed to compensation to said Personal Data owner-contributors.

In particular embodiments, one embodiment of a system and process may, for example, be configured to: (1) access the commercial appeal and value of one or more blockchain-copyrighted data bundles for a third party data acquirer which identifies one or more suitable data purchases from Personal Data owner-contributors; (2) receive an indication of an update to the one or more data asset bundles made by Personal Data owner-contributors; (3) identify one or more potential automatic data updates generated by Personal Data owner-contributors; (4) assess and analyze one or more potential updated data inputs by Personal Data owner-contributors to determine third party data appeal and commercial value of said updated data; (5) use one or more data modeling practices to identify one or more Personal Data assets associated within the Smart Contract Data Repository that may be affected by the updated data inputs by Personal Data owner-contributors; and (6) update any relevant parsing, sorting, analysis and collecting of the commercial data value generated by Personal Data owner-contributors that might utilize a different grouping, tiering or association vis-à-vis other data bundles as presently analyzed, interrelated, and grouped.

The principles may use machine intelligence to track, capture, sort, and analyze collective online Personal Data characteristics to create a novel cryptocurrency asset class backed by both individual and large group data pools that generate significant commercial revenues when acquired by third party purchasers. These third party generated revenues may be assigned or otherwise utilized to support or back the novel PIICOIN cryptocurrency. From the same aforementioned machine-based mechanisms and processes, additional revenues are generated by sales commissions from a Smart Contract sponsored Purchasing Collective affording quantum discounts and special purchasing advantages for Smart Contract member participants and commissions from Peer-to-Peer Seller networks along with separate advertising revenues from customized Social Collectives.

A cryptocurrency, in general, includes binary data conceived to work as an exchange medium, whereby individual token ownership records are stored in a ledger through a computerized database using robust cryptography to secure transaction records (i) to regulate the creation of additional coins, and (ii) to verify the transfer of token ownership. Crypto currencies currently are issued in two forms: (1) non-asset backed and (2) stablecoin-asset backed. Non-asset backed cryptocurrencies, similar to fiat money or fiat (i.e., a government-issued currency that is not backed by a physical commodity, such as gold, but rather by a government that issued fiat money), rely on the full faith and credit of the specific cryptocurrency founder's goals, vision, network and overall community involvement.

Stablecoin-backed cryptocurrencies are designed to be married to an internationally recognized type of fiat currency. In short, currencies sustain value because people believe they do, and, accordingly, may be used as a medium of exchange. In accordance with the principles described herein, a token coin (PIICOIN) is unlike conventional cryptocurrencies that are typically backed by their developers' full faith vision, credit or networks, or crypto-stablecoins backed by fiat. Instead, a PIICOIN is backed by (1) the value of an individual owners' data assets, (2) and when the data is pooled, a large number of the collective owners' aggregate data. Recompense in the form of PIICOINs, sent and stored in a digital wallet, or another type of value including fiat payments from membership in the SCIP is distributed to each Data Contributor who has joined the SCIP. SCIP members may receive varied recompense PIICOIN levels on a timely basis.

Governments create and issue marketable securities to generate proceeds used to finance expenditures. These government securities are collateralized by government revenue streams (future tax revenues or non-tax revenues from fees, tariffs, etc.) or assets (buildings or other infrastructure). As a general observation, a collateralized transaction is more likely to succeed if (1) it produces specific revenue streams designated for repayment and (2) the contractual terms are fully transparent to simply be understood.

Traditional asset securitization originates when a lender or a company with income-producing assets designates an asset bundle and then arranges to sell it to an investment bank or other financial institution. This institution often pools these assets with comparable ones from other sellers. In contrast, the principles described herein create a new model of data securitization by pooling and carmarking collective Personal Data silos as new type of asset bundles. The data bundle is licensed to data acquirers generating a steady stream of revenues. In addition, to the revenues from data licenses, sales commissions may also be generated from a group or pool of like-minded data contributor-owners creating an additional revenue stream to back the data-asset backed PIICOINs.

Historically, investors profiting from asset securitization received fixed or floating rate payments. These payments are funded by the cash flows generated by the portfolio of assets. Pointedly, investors are not money third-party contributors, but rather, first-party data contributor-owners. A system and method may be designed to sustain the Smart Contract s over time to ensure value accretion disbursement to Smart Contract owners. The SCIP rewards its Data Contributor base with a varied computed value of every individual owner's Smart Contract. This recompense number is based on each Smart Contract owner's online activities coupled with the characteristics and depth of a Smart Contract owner's PII and contributions to a large pool of Smart Contract owners whose data is aggregated for commercialization.

An asset-backed security (ABS) is a collateralized financial investment backed by an underlying asset pool. This asset pool generates cash flow from debt including loans, leases, credit card balances, or receivables. Traditionally, the underlying assets of these ABS pools may include home equity loans, automobile loans, credit card receivables, student loans, or other expected cash flows. In the case of the data asset-backed PIICOIN, the asset is individuals' collective Personal Data (PII and online usage/presence). Therefore, one principal difference between data asset-backed PIICOIN ABS and traditional ABSs is that the PIICOIN's underlying data assets are liquid (individual data along with group data has intrinsic commercial sales value). In contrast, the assets undergirding traditional ABSs are generally illiquid.

ABS issuers, within sensible reason, can be imaginative how specific cash flows backing the securities are created. ABS securities can be established from nearly any financial vehicle that generates revenues. Accordingly, ABS revenues could be generated from movies, royalty payments, aircraft landing slots, toll roads, solar photovoltaics, etc. In short relatively, any cash-producing vehicle or situation can be securitized into an ABS. While there are other budding asset classes (trade receivables, hospital receivables, auto leases, small-business loans and even royalties payable to rock stars from a specified pool of their works), in addition to those mentioned above, the system described herein uses Personal Data assets to generate revenues to create a new ABS class.

While individual investors can purchase the aforementioned traditional types of ABS securities to receive the cash flows, the system may flip this traditional ABS model on its head. For example, the system and method may allow Personal Data owner-contributors to collateralize their own data assets in a different manner. Unlike traditional ABSs, there is no debt created or subsequent debt transference (these Personal Data owner-contributors own their data through blockchain copyrighting it). These data owners license or assign the use rights of their data. In return, these data producer-owners are paid for said license or assignment by a data-asset backed PIICOIN collateralized by their own data contributions. Alternatively stated, nothing is ever purchased or debt incurred. Revenues are generated by licensing data to third party data acquirers. In addition, revenues backing data asset-backed PIICOIN are generated by a second stream of sales commissions directly attributable to the Purchasing Collective and a third revenue stream from commissions conferred by the Peer-to-Peer Seller Network, as described further herein.

An ABS usually creates three separate financing tranches: class A, B, and C. The senior tranche, A, is constructed to have an investment-grade rating attracting the largest Investor pool. The B tranche has lower credit quality and, thus, a corresponding lower yield than a senior tranche. Analogously, the data-asset backed PIICOIN may also have tranches defined as those data silos which command the greatest revenues analogous to a class A senior tranche, those silos which generate lesser revenues will be a type of class B, those silos generating the least revenues class are designated C, etc.

Traditionally, the asset backing of a security represents the total value of a company's shares relative to the company's assets. More precisely, asset backing characterizes the total value of all the company's assets divided by the number of outstanding shares that the company has issued. In the present embodiment, the data-asset backed cryptocurrencies refers to the total value of a company's collective Personal Data pool, divided by the number of issued outstanding data-asset backed PIICOIN tokens that the system and process has minted.

As the world of crypto tokens evolves, a system and method may also be thought of as creating a different type of "work token," which in turn, converts itself to a third asset class of cryptocurrency—one backed entirely by data. The everyday generic work token is understood to be an active rather than a passive financial instrument. This active financial instrument has traditionally required both an investment of capital and work (defined as additional noncapital investments including time, computing power, transcoding, governance, etc.) to claim ownership of the instrument. While the system and process incorporate these two components of capital and work, capital is not defined as fiat money or any close relation to fiat money such as historical commodities (e.g. gold, silver, platinum and like rare precious items). Instead, the principles provided herein define capital as a person's personal identifiable information (PII) and digital presence footprint otherwise known as Personal Data.

Thus, one embodiment may include a value paradigm that is partly enabled by creating a data-asset backed PIICOIN that creates a high-driver economic value effect. Because of the opt-in continual data monitoring and input, data value for individual or Data Contributor is enhanced daily as is the same individual's data value when combined with millions of other individuals into the SCIP data pool. This data-asset backed value revolving, in part, around the commercial third-party revenues the collective data generates backs the PIICOIN reward or compensation for being a member of the Smart Contract system. In addition, it confers additional value by developing one of the largest opt-in blockchain copyrighted, cleansed, sorted, analyzed, configured and grouped human data pools in the world which is itself an asset of enormous value.

Cryptocurrency Platform User Intake and Cryptocurrency Output

FIG. 1 represents an exemplary Personal Data owner-contributors' opt-in PII and digital presence/footprint 70A and may be administered through a Smart Contract data intake process or the SCIP processing methodology 80. The Smart Contract may be configured to accept data from one or more network devices 30, 40, 50 that transmit PII/digital presence/footprint data 70A captured and collected through a data harvesting Browser 20 configured to capture Internet usage data, which at least in part forms a digital footprint of a user (Data Contributor). As may be understood from this representation, the Smart Contract data intake and SCIP processing system 80 may be designed to accept data transmission from one or more data producer-owners' 10 devices 30, 40, 50, using a locally deployed specialized Browser 20 software application.

The prospective Data Contributor 10/10A may be vetted via the Smart Contract 60 to ensure the prospective Data Contributor 10/10A has committed no criminal/public offenses. In operation, the Smart Contract 60 may include conditions that are executed to cause a vetting process to occur when a Data Contributor 10/10A initially joins or registers with the system and, in an embodiment, may cause the vetting process to be executed on a periodic or aperiodic basis. Notably, other devices not depicted such as smart watches and other data producing devices such as smart cars, brain implants, other future devices, etc. which are not included in this specific representation are contemplated herein. Computing devices 30, 40, 50 may be configured to send and/or receive signaling across a network. The computing devices 30, 40, 50 may communicate with a decentralized SCIP network entity 80 that incorporates a prospective Smart Contract 60 Data Contributor 10/10A intake process. In an embodiment, the decentralized SCIP entity 80 is an open-source, public, distributed computing platform. A typical Smart Contract 60 is generally understood to be computer code stored on a blockchain and containing a set of governing rules between contracting parties. In an embodiment, the parties may be a Data Contributor (e.g., Data Contributor 10/10A) and platform owner that provides and/or supports a cryptocurrency that is data-backed for valuation support.

In certain embodiments, the Smart Contract PII/digital presence/footprint data intake and SCIP processing system 80 is designed to communicate via a confirmation e-mail sent to a new PII/digital presence/footprint data intake and SCIP processing system 80 human participant member 10 that s/he has completed his/her Smart Contract 60 and now is an active continuous data contributing member 10 of the SCIP network 80 by virtue of the individual's 10 everyday digital activities 70A as tracked by the SCIP 80 through its specialized data Browser 20.

In certain embodiments, the PII/digital presence/footprint data intake and SCIP processing system 80 is designed to: (1) present a webform Smart Contract 60 whereby a human data producer-owner 10 is enabled to agree to a Smart Contract's 60 transparent legal terms and conditions to blockchain copyright 20A his/her Personal Data 70A; (2) said human data producer-owner 10 having agreed to the Smart Contract's 60 terms and conditions may subsequently be vetted by said Smart Contract 60 to ensure no criminal history or convictions, said human data producer-owner 10 is enabled to electronically fill out an opt-in webform process 60 to create a virtual profile 10; (3) PII/digital presence/footprint data intake and SCIP processing system 80 then proceeds to machine analyze one or more pieces of computer code associated with the SCIP webform Personal Data intake process (such as Javascript, HTML, etc.); (4) to then chart one or more business processes that utilize the PII data 70A collected via the webform based at least in part on the analyzed one or more pieces of computer code.

When the legally enforceable procedures and conditions of the Smart Contract 60 are satisfied, a Work Token 70 is created, blockchain-copyrighted, and enabled through data input and digital footprint tracking 70A of one's Personal Data into a blockchain format that may be automatically copyrighted under U.S. law by transferring or digitally memorializing said Personal Data to a tangible medium. The Personal Data may also considered private information and afforded privacy rights as governed by the U.S. Constitution and other privacy laws in the U.S. and other countries. The data PII/digital asset footprint 70A of the Data Contributor 10/10A may be assigned or licensed or otherwise developed for shared ownership of the data asset 70A, and issued/assigned by the SCIP 80. The opt-in PII/digital footprint data asset 70A SCIP of the u Data Contributor 10/10A may be simultaneously and automatically copyrighted 20A by U.S. law in converting the data to blockchain in the name of the Data Contributor 10/10A (i.e., data producer). In an embodiment, the data asset 70A may be registered with the U.S. Copyright Office as the data may be considered a work within a database formed by individual Data Contributors 10/10A. In an embodiment, the data asset 70A may be selectably registered in that raw data of Internet usage may be processed and limited by a Data Contributor 10/10A, thereby selectably limiting data of the data asset 70A to be shared and monetized by the Data Contributor 10/10A via a platform, as further described herein.

The Work Token 70 captures any opt-in user's 10 PII and Internet activity data assets 70A from a plurality of non-exclusive devices 30, 40, 50 using a Browser protocol 20 that a human 10 is been invited to use by the SCIP 80. In particular embodiments, one or more remote computing devices including a smartphone 30, a laptop 40, a desktop computer 50 or any other computer capable of executing a set of instructions (sequential or otherwise) that specify actions to be taken by that computer. In certain embodiments, one or more remote computing devices 30, 40, 50 comprise at least a share of the computing devices 30, 40, 50 and resulting SCIP network 80. Further, while only a single computer is depicted, the term "computer" shall also be understood to include a vast collection of computers that individually or jointly execute a set (or multiple sets) of instructions to perform any one or more of the methodologies discussed herein.

In certain embodiments, the Smart Contract PII/digital presence/footprint data intake and SCIP processing system 80 utilizes a specialized Browser 20 tracking, monitoring, and recording a human's 10 digital presence/footprint to collect Personal Data 70A for use in a specific processing activity by the SCIP 80 token issuer to convert said data to blockchain format 20A to then subsequently evaluate one or more pieces of computer code 70A associated with the human's 10 digital presence and activity 70A to determine: (1) one or more systems associated with the human's 10 to which the data of the Personal Data 70A (e.g., one or more Personal Data SCIP 80 assets which serve as a destination asset to data entered via the SCIP 80) is automatically tracked and deposited into the SCIP PII/digital presence/ footprint data intake and SCIP processing system's 80 data repository. In certain embodiments, the specialized Browser 20 is designed to send PII/digital presence/footprint data 70A via one or more gateways, construct one or more ports to admit one or more data human owners' 10 PII/digital presence/footprint 70A data connections. The SCIP data intake and SCIP processing system 80 may be designed to implement one or more data collection processes including the blockchain copyrighting 20A, imprinting, cleansing, sorting, analysis, configuration, transferring, access, usage, storage and communication of said data attributes 70A. The SCIP data intake and SCIP processing system 80 may, in reply to recognizing specific data attributes 70A from said data collection and SCIP 80 intake process, be designed to isolate and collect certain PII/digital presence/footprint 70A details. These Personal Data strata 70A such as an individual data human owner's 10 age, gender, geographical location, income bracket and other PII aspects 70A along with, for example, the data owner-contributor's digital presence/footprint 70A (i.e. preferred shopping, social platforms, or news websites etc.) In this manner, the SCIP data intake and processing system 80 may be designed to recognize, extract, parse, package and monetize data strata culled from an individual human owner 10 or a machine-grouped batch of human owners 10 for the purchase and acquisition of their data 70A by a third-party data purchaser 90.

In certain embodiments, the one or more computer networks 30, 40, 50 associated with the SCIP Personal Data intake and SCIP processing system 80 comprise one or more secure appropriate servers, one or more appropriate PII/ digital presence/footprint 70A databases, one or more restricted networks, and/or any other suitable device and/or network portion capable of securing and storing said PII/ digital presence/footprint data 70A. In particular embodiments, one or more remote computing devices including a smartphone 30, a laptop 40, a desktop computer 50 or any other computer capable of executing a set of instructions (sequential or otherwise) that specify actions to be taken by that computer. Once again, while only a single computer is depicted, the term "computer" shall also be understood to include a vast collection of computers that individually or jointly execute a set (or multiple sets) of instructions to perform any one or more of the methodologies discussed herein.

The SCIP data intake and SCIP processing model 80 may include: (1) obtaining blockchain-copyrighted 20A data for the SCIP data model 80 by using one or more electronic questionnaires or automated forms querying a human owner's 10 particular PII/digital presence processing Work Token 70 activity; (2) utilizing one or more intelligent identity mechanisms including blockchain to identify PII/ digital presence/footprint 70A on deposit within the SCIP system 80 and then map such data 70A to a designated SCIP data sub-model; (3) obtaining data from one or more application programming interfaces (API) from a customized software application 20. Through its special intake software application 20, the SCIP system 80 is designed to: (1) identify new data digital presence/footprint activities 70A; (2) automatically generate a Personal Data asset classification value 70B; (4) inventory for identified new data assets 70A; and (5) install the newly generated data asset Work Token 70 inventories on said SCIP system 80.

In certain embodiments, the one or more computer networks 30, 40, 50 associated with the SCIP data intake and processing system 80 comprise one or more secure appropriate servers, one or more appropriate PII/digital presence/ footprint 70A databases, one or more restricted networks, and/or any other suitable device and/or network portion capable of securing and storing said PII/digital presence/ footprint data 70A. In certain embodiments, the one or more computer networks 30, 40, 50 associated with the SCIP data intake and processing system 80 comprise one or more secure appropriate servers, one or more appropriate PII/ digital presence/footprint 70A databases, one or more restricted networks, and/or any other suitable device and/or network portion capable of securing and storing said PII/ digital presence/footprint data 70A.

The opt-in user's PII and Internet activity data assets 70A may can once again be thought of as a work token. After using the specialized data Browser protocol 20 to access a Smart Contract 60, said contract 60 establishes the legal and technical procedure protocols to acquire a Data Contributor's 10/10A opt-in combined PII/digital footprint data asset 70A and linked accompanying valuation 70B in exchange for compensation in the form of data-asset backed PIICOINs 70C or an alternative form of valuable reward.

The SCIP PII/digital presence/footprint data intake and processing system 80 system is designed to construct a unique subject blockchain copyrighted 20A identifier representing the PII/digital presence/footprint asset inventory 70A of an individual data producer-owner 10/10A. In response to a 70A of an individual data producer-owner 10/10A inputting his/her PII data 70A both actively through submitting a webform Smart Contract 60 to become a Data Contributor 10/10A in the SCIP data intake and processing system 80. Upon becoming a Data Contributor 10/10A, said Data Contributor's 10/10A continuous digital presence/footprint 70A is automatically actively captured and monitored through a SCIP specialized Browser 20 (though his/her everyday digital activities). The unique Data Contributor identifier 10/10A and associated data input 70A is blockchain copyrighted 20A automatically by U.S. law when committing Personal Data 70A to a tangible medium as represented by blockchain mathematic software code 20A. This blockchain copyright feature 20A is configured to automatically update a human owner's 10 digital presence/ footprint 70A on a daily instantaneous basis as said human owner 10 conducts Internet and digital activity 70A while being updated periodically with a governmental organization overseeing copyrightability.

The initial blockchain created SCIP Work Token 70 contains a hash pointer as a link to a previous block, a timestamp and transaction data providing for a the blockchain copyright action 20A and assignment or licensing or ownership sharing mechanism for the data asset 70A. Using the SCIP apparatus Work Token 70 housed within the SCIP 80, an as yet undetermined value amount is designated and promised as compensation for said opt-in data asset 70A. Accordingly, the data asset 70A is then converted into an ascribed value 70B that is immediately attributed, assigned and claimed by the Data Contributor 10/10A who is a member of the SCIP 80 and, provided possession of his/her Work Token 70. This data-asset backed value 70B will then be transformed into a distinct data-asset backed PIICOIN 70C value or other form of valuable recompense including fiat or electronic debit cards which is directly deposited in the Smart Contract 60 owner's digital wallet 10B.

Depending on a human owner's 10 preference, the devices 30, 40, 50 may connect to the Internet or other digital gateways using a virtual privacy network 80A. In response to the custom opt-in PII/digital footprint data asset capture 70A of a singular human's 10 mind, the conditional request to create and assign data asset value 70B which may become or take the form of a distinct data-asset backed PIICOIN 70C is fulfilled. Therefore, a conditional request establishes strictures, that when fulfilled, allow the targeted opt-in PII/digital footprint data asset 70A to create data asset value represented by the data-asset backed PIICOIN 70C. The conditional request for the opt-in data PII/digital footprint data asset 70A access is created and enabled by the Smart Contract 60. This conditional request allows the Work Token 70 issued through the SCIP system 80 to track, capture, deposit, blockchain-copyright, imprint, cleanse, sort, analyze, configure, communicate and assign or license or otherwise develop shared ownership status. As a feature of the smart token, Data Contributors 10/10A may establish communications among their respective SCIP 80 issued Work Tokens 70 using their respective opt-in PII/digital footprint 70A as a large purchasing group that can command quantum group discounts (not traditional discounted tokens but time sensitive individually curated offers for specific tiered or sorted groups of SCIP 80 Data Contributors 10/10A to further create the token coin value 70B ultimately represented by an PIICOIN 70C or alternate form of recompense including fiat or electronic debit cards. The amount and type of opt-in data along with opt-in PII/digital footprint data asset 70A and subsequent data valuation 70B collected using the SCIP network's 80 conditional responses may be ranked, weighted, and/or otherwise value determined for a Data Contributors 10/10A's 10/10A individual SCIP value 70B. Machine learning, artificial intelligence, and other data analytics may be utilized to determine a SCIP's 70 data input worth 70B or valuation that is ultimately converted to a distinct data-asset backed PIICOIN 70C, or other form of valuable recompense. An AI weighting chart in TABLE I example might attribute PII data value as such:

TABLE I

| AI Weighting Table | | |
| --- | --- | --- |
| Sub Group | Data | Weights |
| sensitive | full name | 10% |
| sensitive | medical records | 10% |
| sensitive | ethnicity/religion | 2.5% |
| sensitive | home owner | 5% |
| sensitive | home address, partial address, like a country or zip code | 5% |
| sensitive | email address | 15% |
| sensitive | telephone number | 2.5% |
| sensitive | IP address | 5% |
| sensitive | income bracket | 12.5% |
| sensitive | credit score | 10% |
| sensitive | education | 5% |
| sensitive | political affiliation | 5% |
| non-sensitive | age range, e.g. 35-44 | 5% |
| non-sensitive | gender | 5% |
| non-sensitive | Employer/employment | 2.5% |

The Work Token 70 stores an individual's opt-in PII/digital data footprint asset 70A and converts said data asset 70A into a unique stored data value 70B. As presented subsequently in FIG. 4, a SCIP's value 70B is then transformed into a distinct data-asset backed PIICOIN 70C value or other form of valuable recompense. This value creation 70B may be determined in different ways or by tiers depending on the specific data criteria sought and purchased by third party purchasers 90 or as determinative for specific offers 209 communicated to a Data Contributor 10/10A by the purchasing collective 100. Thus, the system may be configured to provide the SCIP system 80 accessible to third party data purchasers 90 to enable and expedite the retrieval and electronic access to the centralized storage of PII/digital presence/footprint data 70A for each of a plurality of respective Data Contributors 10/10A. The system may be configured to automatically determine if one or more blockchain copyrighted 20A data asset bundles 70A may be of interest to third party data purchasers 90 in response to one more general or specific queries. In certain embodiments, the system may be configured to automatically perform one or more third-party data acquisition queries, associated payment acceptance for said queries, and permissioned data delivery related to the analysis of and response to the one or more of data acquisitions of said data queries 204B.

The Smart Contract 60 may reside on a decentralized SCIP entity 80 which may include a distributed ledger technology to allow a Smart Contract 60 to be accessed by human 10 owner's computing device 30, 40, 50. When the Smart Contract 60 receives an acceptance by a prospective Data Contributor 10/10A, it automatically assigns a SCIP 80 issued Work Token 70 to the SCIP member and Data Contributor 10/10A. Within the simple Smart Contract agreement 60, the SCIP prospective Data Contributor 10/10A formally agrees and declares that all input, tracked, captured, and communicative PII/digital footprint data asset 70A is converted to blockchain-copyright 20A in that Data Contributor's 10/10A name.

The Smart Contract 60 issued Work Token 70 is then assigned a commercial and possible social policy value 70B which will be transformed into a distinct data-asset backed PIICOIN 70C value or other form of valuable recompense. This value 70B could increase by 1.7 megabytes every second a machine tethered person 10 uses the Internet. The SCIP 80 receives remuneration for the use of the Data Contributor's 10/10A opt-in PII/digital footprint data asset 70A that was tracked, captured, deposited, blockchain copyrighted 20A, imprinted, cleansed, sorted, analyzed, configured, communicated and assigned or licensed or otherwise created shared ownership and issued by the SCIP system 80 from third-party commercial and social policy entities 90 along with commissions earned on sales of goods and services through the Purchasing Collective 100 created by the SCIP system 80. The SCIP system 80 then pays part of this consideration created by the SCIP member and Data Contributor's 10/10A data-assets 70B to said SCIP member and Data Contributor 10/10A through a digital wallet 10B. Part of the compensation paid to the SCIP 80 is retained by the SCIP 80 as profit.

Figure 2:
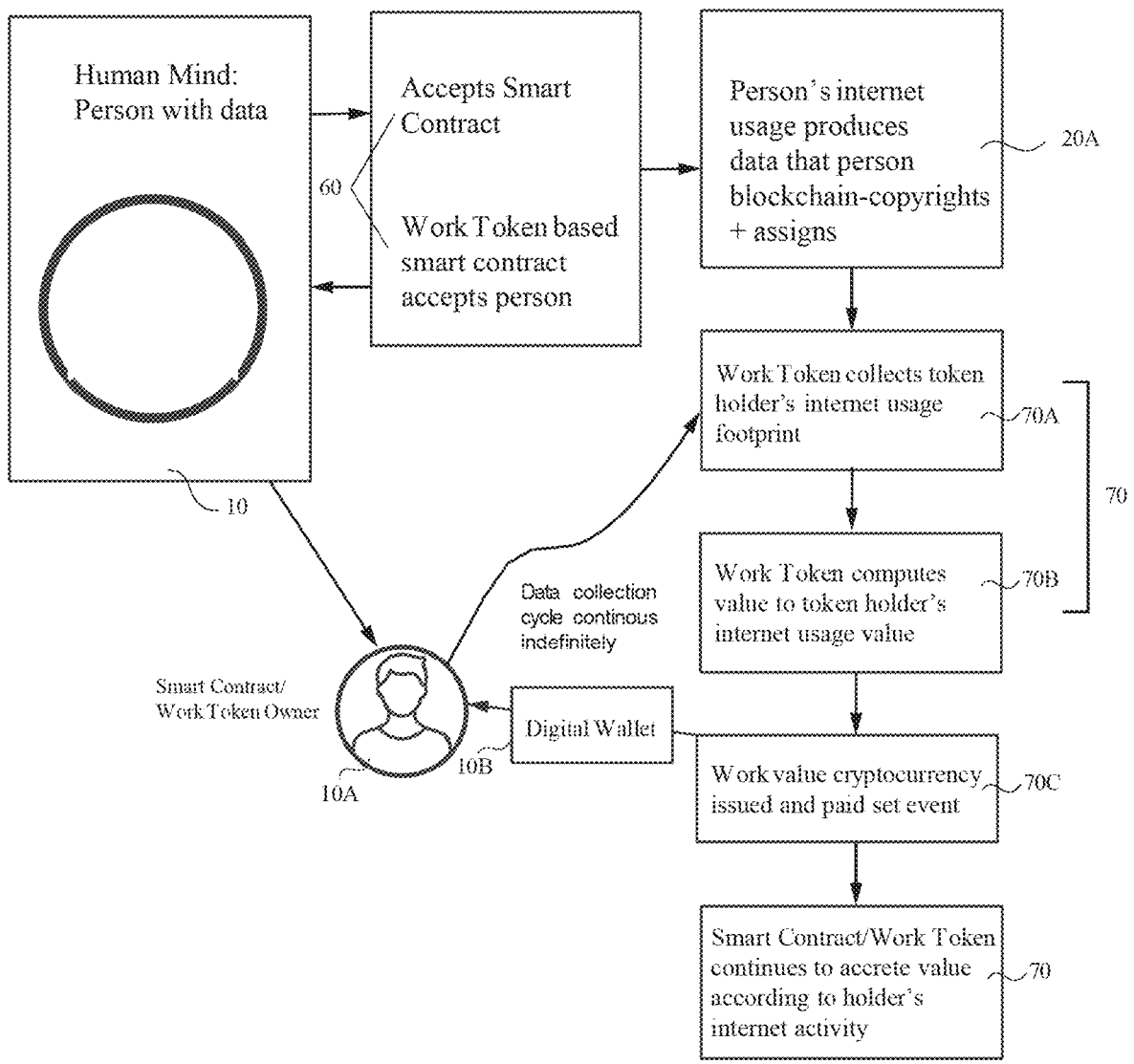
FIG. 2 is an illustration of an example of the system whereby a natural human data asset producer agrees to enter into a Smart Contract.

With regard to FIG. 2, a data tokenizing/coining process may be predicated on the fact that every human 10 mind produces Personal Data assets 70A with corresponding commercial value 70B. This commercial value 70B will be transformed and parleyed into a distinct data-asset backed PIICOIN 70C or other form of valuable recompense including fiat money. A human 10 accepts the SCIP contract 60 which then vets the prospective Data Contributor 10/10A using machine learning to ensure s/he has not committed any known or suspected criminal/public offense activities. If successfully vetted, the prospective Data Contributor 10/10A is invited and enabled to embed a specialized Browser protocol 20 in his/her personal device 30, 40, 50 or, alternatively provided with a mobile device 30 with said specialized Browser protocol 20 already embedded.

In various embodiments, an human's 10 data assets 70A may be associated with specific processing activities that may include the capture, collection, blockchain copyright 20A, imprint, cleanse, sort, analyze, communicate, configure, store, transfer, access, use, etc. of a specific of data attributes 70A (PII/digital presence/footprint). Notably, a specific data asset bundle's 70A information may clarify, for example, one or more relationships between and/or among one or more other data asset bundles 70A associated with the Data Contributor 10/10A or a machine-grouped cadre of similarly situated or presented Data Contributors 10/10A.

The specialized SCIP Browser 20 is configured to data scrape and monitor one or more digital presence/data footprint sources 70A to recognize and record a Data Contributor's 10/10A presence and footprint 70A. Said Data Contributor's 10/10A presence and footprint 70A is automatically blockchain copyrighted 20A at the moment of use and/or at the conclusion of the user's online activity 70A. Immediately after recognizing and recording said Data Contributor's 10/10A blockchain copyrighted 20A digital presence/footprint 70A, the SCIP data intake and processing system 80 analyzes the Data Contributor's 10/10A digital presence and footprint 70A to imprint, cleanse, sort, analyze, configure, transfer, access, use, store and communicate data attributes 70A. Periodically, after the PII/digital presence/footprint 70A is stored, the SCIP data intake and processing system 80 assigns a commercial value 70B at a moment in time to a Data Contributor's 10/10A collective PII/digital presence/footprint 70A. The SCIP data intake and processing system 80 may be serviced by a plurality of servers or any other secure appropriate data storage locations to safeguard, store, and monetize Personal Data 70A.

In one embodiment, the interactive SCIP 80 Work Token 70 creation is enabled and may be displayed if the prospective Data Contributor 10/10A is successfully vetted as a citizen in good standing. The good citizen standing may be established by the Smart Contract 60 using a plurality of data bases and public information sources. In acceptance of the prospective Data Contributor's 10/10A ability to create a SCIP 80 issued Work Token 70, a booking interface or display may be enabled and provided to a prospective Data Contributor 10/10A by the SCIP system 80. The moment a prospective Data Contributor 10/10A subject to good citizenship vetting (having committed no known or suspected criminal or public offenses), is accepted by the Smart Contract 60 and enabled through the SCIP system 80 to become a Data Contributor 10/10A, that Data Contributor 10/10A begins to create a unique opt-in PII/digital footprint 70A. This opt-in PII/digital footprint data asset 70A is then blockchain-copyrighted 20A into a NFT or like digital object as it is created and fixed in a tangible form that it is perceptible either directly or with the aid of a machine or device 30, 40, 50 connected to the SCIP network 80.

In certain embodiments, the SCIP data intake and SCIP processing system 80 is designed to complete one or more steps associated with the specialized Browser 20 to recognize specified and targeted PII/digital presence/footprint 70A data to blockchain copyright 20A and subsequently create sorted, tiered, and group specific data silos 70A for the plurality of data Contributors 10/10A. In certain embodiments, the software applications 20, 60, 70, 80 may undergird one or more computing machines 30, 40, 50. In certain embodiments, the one or more machines 30, 40, 50 through the application and use of the specialized Browser 20 may be designed to perform one or more of the steps designated vis-à-vis the SCIP Smart Contract 60 and data intake and processing system 80.

The Data Contributor's 10/10A blockchain-copyrighted affirmation 20A and assignment or licensing or alternative creation of shared ownership of the data asset 70A is formally enacted by the SCIP system's 80 individualized Smart Contracts 60. Following the system's processing and non-transitory machine-readable memory mechanisms, transmittable enabling instructions are issued assigning a value 70B. As long as the Data Contributor 10/10A maintains correctly inputted PII 70A and sustains an online Internet or network presence 70A, the Work Token's 70 features opt-in PII/digital footprint asset 70A and data valuation 70B which will be transformed into a distinct data-asset backed PIICOIN 70C, or other form of valuable recompense including alternative digital currency payments subject to government regulations and/or fiat payments, that works in concert with the Work Token 70 continues to accrete value 70B which will be transformed into a distinct data-asset backed PIICOIN 70C value or other form of valuable recompense over time as the Data Contributor 10/10A increases his/her blockchain copyrighted data 20A and said data is assigned or licensed or otherwise developed shared ownership PII/digital footprint thereby generating more valuable data 70B which will be transformed into a distinct data-asset backed PIICOIN 70C value or other form of valuable recompense including fiat money.

In certain embodiments, the SCIP data intake and processing system 80 is designed to complete one or more steps associated with the specialized Browser 20 to recognize specified and targeted PII/digital presence/footprint 70A data to blockchain copyright 20A and subsequently create sorted, tiered, and group specific data silos 70A for the plurality of Data Contributor 10/10A. In certain embodiments, the software application may undergird one or more computing machines 30, 40, 50. In certain embodiments, the one or more machines 30, 40, 50 through the application and use of the specialized Browser 20 may be designed to perform one or more of the steps designated vis-à-vis the SCIP data intake and processing system 80.

Cryptocurrency Platform User Data Input and Work Analysis

Figure 2A:
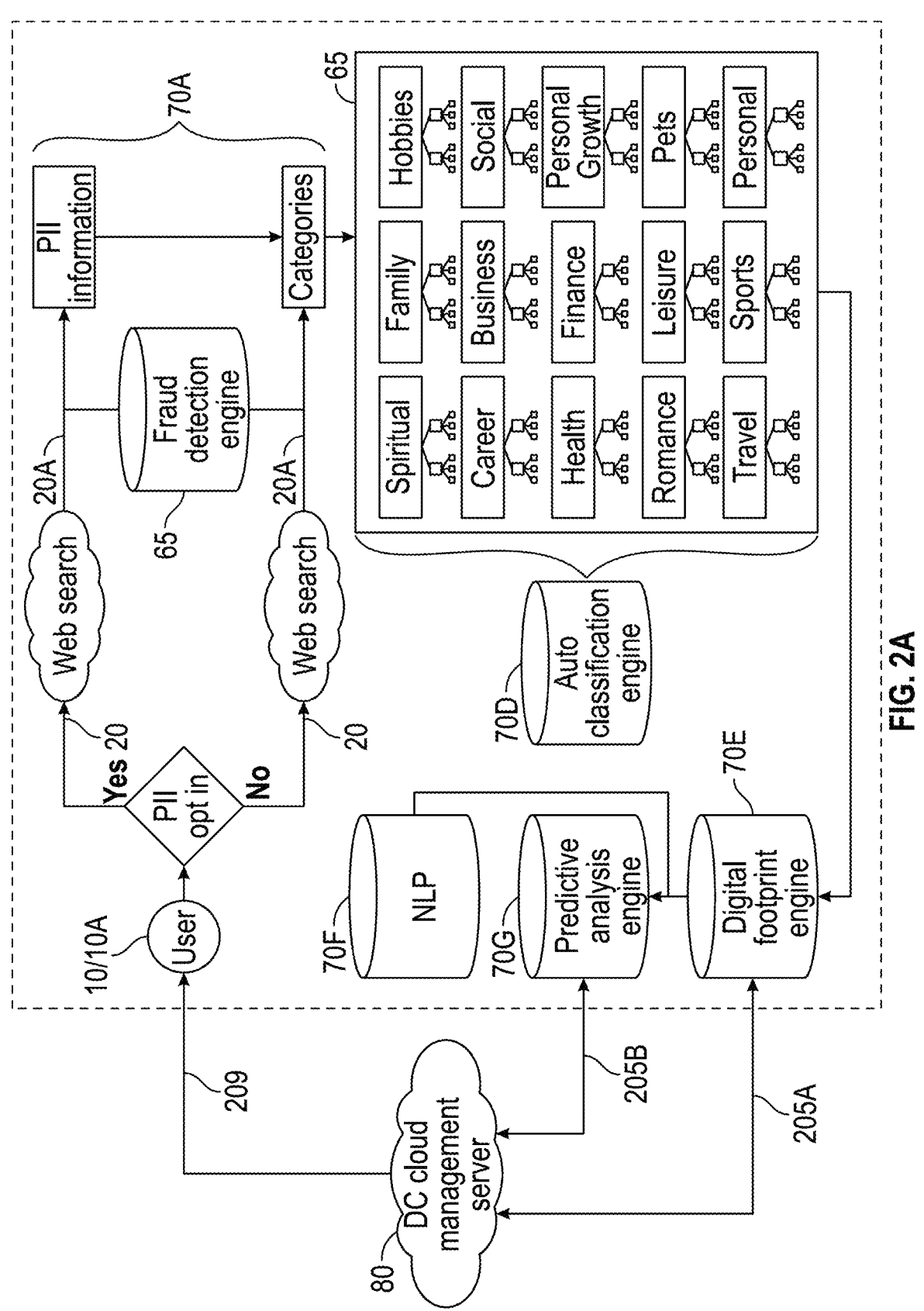
FIG. 2A is an illustration that represents the SPIC artificial intelligence and machine learning engines through the Auto Classification Engine.

FIG. 2A is an illustration that represents the SCIP's 80 artificial intelligence and machine learning capabilities through its respective Fraud Detection, Auto Classification, Digital Footprint, and Predictive Analysis Engines 65, 70D, 70E, 70G. When a Data Contributor 10/10A opts in, he or she fills out a questionnaire via a Smart Contract 60 (FIG. 1) to regulate PII data 70 input which enables a Data Contributor 10/10A to refrain from submitting any digital footprint data 70A that the Data Contributor 10/10A does not want to include. This PII data 70A is unique to the Data Contributor 10/10A and may be verified through an email and a background check. The PII data 70A creates the initial information composing an individual's Work Token 70. The Work Token 70 may serve to both protect and house the PII and digital footprint data (PII information) 70A that may be grouped into specific categories by the SCIP 80 by a processor. In an embodiment, the PII information 70A is limited to being stored on designated devices 30, 40, and 50 of the Data Contributor 10/10A.

Data Contributors 10/10A have the option of not inputting any PII information or data 70A and may continue to use a browser tool 20 of the platform. Accordingly, the collection digital footprint data 70A data may be anonymously categorized without any identifiable PII information. Aware of scammers or unethical individuals who seek to game or deceive the SCIP 80, a Fraud Detection Engine 65 may prevent automated/artificial web surfing by automatically detecting a web bot or other automated tool that purports to be an actual Data Contributor and automatically stopping the purported Data Contributor from further web surfing.

An Auto Classification Engine 70D may be configured to categorize digital footprint data into multiple (e.g., fifteen) representative categories 65, such as: (1) Spiritual; (2) Family; (3) Hobbies; (4) Career; (5) Business; (6) Social; (7) Health; (8) Finance; (9) Personal Growth; (10) Romance; (11) Leisure; (12) Pets; (13) Travel; (14) Sports and (15) Personal/private interests. It should be understood that additional and/or alternative categories may be utilized for categories. In an embodiment, when a user is becoming a Data Contributor 10/10A, a user interface of a Smart Contract may present the categories for the to-be Data Contributor 10/10A to automatically submit or contribute for data valuation. The Smart Contract may thereafter include selected categories by each respective Data Contributor 10/10A for use when executed to perform data valuation of curated data 204 by the user's digital footprint 70A. In operation, the Smart Contract of each of the Data Contributors 10/10A may be utilized by the system to automatically access the selected categories, which may be tagged as particular categories and stored on a blockchain associated with the respective Data Contributor 10/10A.

The categories may contain nearly an infinite number of (in) directly related subcategories. A "Hobbies" category may, for example, include a subcategory of fishing. Within subcategory fishing, further sub-categories may automatically be classified and launched by machine learning and/or artificial intelligence to automatically create subcategories and/or identify content of websites or other digital footprint data for classification thereof. Attendant examples to fishing could include the descending subcategories of "Deep Sea" or "Freshwater" subcategories, which may be further broken down into additional subcategories, such as "Deep Sea Vacations" or "Freshwater Vacations" followed by another descending subcategory of "Poles" for each respective type, etc. to naturally develop and align with one another in a hierarchical or descending manner as recognized by machine learning as further depicted in FIG. 2B.

Data Contributors 10/10A may create data value (or fractions) of earn cryptocurrency 70C by naturally surfing 20 the Internet using the browser 20. For example, every Internet site a Data Contributor 10/10A visits, that Data Contributor 10/10A may earn or be afforded data value 70B (e.g., a fraction of a penny) to be accumulated in the total PIICOIN 70C. In this example, a Data Contributor 10/10A may earn $0.0001 in PIICOIN 70C value 70B when s/he visits www.youtube.com. Users will earn an additional $0.0001 when searching for specific topics. For example, if the Data Contributor 10/10A visits youtube.com and searches for "how to make New York style pizza" and clicks on a video to watch that video, that Data Contributor 10/10A may earn $0.0001 in data value 70B to be included in his/her PIICOIN 70C (as dictated by his/her digital footprint 70A and recompense data value 70B).

In one embodiment, an Auto Classification Engine 70D may utilize artificial intelligence configured to categorize both PII input data 70A and digital footprint information 70B to include both independent and interrelated categories, such Hobbies, Health, and Personal Growth. Hobbies and Personal Growth may logically and methodically align because the Data Contributor 10/10A wants to learn something both new and health-related. As a result, the Data Contributor 10/10A creates a monetizable consumable opportunity 209, 211, 240 (FIG. 4) driven by artificial intelligence 300 (FIG. 3C) supporting predictive analysis as implemented by a Digital Footprint Engine 70E and Predictive Analysis Engine 70G. The Digital Footprint Engine 70E and Predictive Analysis Engine 70G are configured to monitor and process a digital footprint of the Data Contributor 10/10A to respectively capture locations and categorize the digital footprint of the user.

The Digital Footprint Engine 70E may be configured to track URLs that a Data Contributor 10/10A visits (e.g., URL location and time spent on the URL locations) and potentially track how the Data Contributor 10/10A interfaces on any given URL location. Actual content may or may not be curated, but interaction events may be curated, thereby creating data value 70B for the Data Contributor 10/10A. The Predictive Analysis Engine 70G may be configured to use the URL locations tracked along with the time spent at the URL locations to predict using (artificial intelligence and/or machine learning (AI/ML) future engagements or other digital footprint activities. As an example, the Predictive Analysis Engine 70G may predict future shopping levels (browsing and/or purchasing) and categories of interest by each of the Data Contributor 10/10A.

In an embodiment, the Engines 70E and 70G may be embedded in a web browser, be a plug-in for a web browser, or be a distinct system that may access digital footprint data generated by the Data Contributor 10/10A while using the browser 20 or other software system. This predictive analysis is further enhanced by a user's opting-in for the SCIP 80 to utilize a natural language processing (NLP) Engine 70F. Positive or negative statements may be captured to further understand sentiment of certain subjects, such as products, people, movies, news, politics, political candidates, etc., by the Data Contributor 10/10A when posting, emailing, talking, or otherwise performing online activities related to the subjects. As the Data Contributor 10/10A continues to use the SCIP 80, the smarter or more detailed his/her Work Token 70 becomes as supported by the Digital Footprint Engine 70E and Predictive Analysis Engine 70G.

In a further embodiment, as the Data Contributor continues 10/10A to search the Internet (and/or other network) using the web browser 20, the Data Contributor 10/10A creates the digital footprint 70A inclusive of personal interests, desires, and needs. The Auto Classification Engine 70D and Digital Footprint Engine 70E may respectively capture, recognize, decipher, and customize personal data inputs, which creates a Work Token 70, to feed the Work Token 70, which may be representative of an individualized data persona, into the Predictive Analysis Engine 70G. All three respective AI Engines 70E, 70F, 70G may work collectively to determine how an individual might best benefit from his/her Work Token 70. The Engines 70D, 70E, 70F, 70G may be processed by and/or work in conjunction with DC cloud management or SCIP 80 server to obtain information that may be most relevant to the Data Contributor 10/10A. Alternatively stated, the Work Token 70 of a Data Contributor 10/10A may be supported by the respective Auto Classification Engine 70D, Digital Footprint Engine 70E, and Predictive Analysis Engine 70G, which individually and/or collectively identify what offers, groups, news, etc. might be of the greatest interest to the Data Contributor 10/10A with the Work Token 70.

Each respective Engine 70D, 70E, 70F, 70G may thus serve as a micro-machine learning and artificial intelligence engine. Initially, the Engines 70D, 70E, 70F, 70G may determine personal interests, habits, needs, and wants along with likely or predictive future iterations of the categories relating to online life or continuous digital footprint 70A of the Data Contributor 10/10A. Ultimately, the Engines 70D, 70E, 70F, 70G may determine habits, needs, and wants of the Data Contributor to generate the digital footprint 70A to provide the Data Contributor 10/10A with highly valued suggestions, offers information, or items to create a customized Data Contributor ecosystem that the Data Contributor 10/10A may want and need. This customized Data Contributor data is exchanged 205A, 205B between the Engines 70E, 70G and the SCIP or DC Cloud Management Server 80 that governs a Work Token 70 of the Data Contributor 10/10A through instructions of a Smart Contract 60 of the Data Contributor 10/10A.

In a further embodiment of the interaction among the AI Engines 70E, 70F, 70G, the respective Auto Classification 70D, Digital Footprint 70E, NLP 70F, and Predictive Analysis 70G Engines collectively work in concert to decipher a user's 10/10A possible purchasing interests. In this case, the Auto Classification Engine 70D may identify intersecting Finance and Personal interests regarding personal transportation of the Data Contributor 10/10A. The Auto Classification engine 70D may recognize within the interests from both Finance and Personal Interest classifications as stored in the PII input data 70A of the Data Contributor 10/10A that the Data Contributor 10/10A is looking for a mid-size, four-door non-hybrid SUV. PII input data 70A may be charted and derived by the Digital Footprint Engine 70E from the online activity using the Browser 20 has narrowed the interests of the Data Contributor 10/10A to purchasing an American-made non-hybrid SUV.

As PII input data 70A is further refined by the natural language processing (NLP) Engine 70F, the Engine 70F may recognizes that, from online forum discussions and other opt-in electronic communications related to the Data Contributor 10/10A, the Data Contributor 10/10A knows people who have had bad experiences with Ford products. Consequently, the Data Contributor 10/10A may believe these negative experiences related online represent poor Ford product quality. Therefore, the Predictive Analysis Engine 70G may forgo sending any direct marketing messages or offers 209 regarding Ford products to the Data Contributor 10/10A. The Predictive Analysis Engine 70G may interact with the DC Management Server or SCIP 80 to provide marketing materials and/or customized special offers 209 through the Work Token 70 of the users 10/10A. This can include a like-minded group of individuals 10/10A with common interests based on the respective PII input data 70A, thereby enabling the system to form a specific Purchasing Collective 100. This specific Purchasing Collective 100 may then make a special customized offer 209 from General Motors® and Fiat Chrysler®, but not Toyota®, Tata®, Mitsubishi®, Kia®, etc., as dictated by the NLP Engine 70F, to best satisfy the interests and wants as identified in the PII input data 70A of the Data Contributor or like-minded Data Contributors.

Figure 2B:
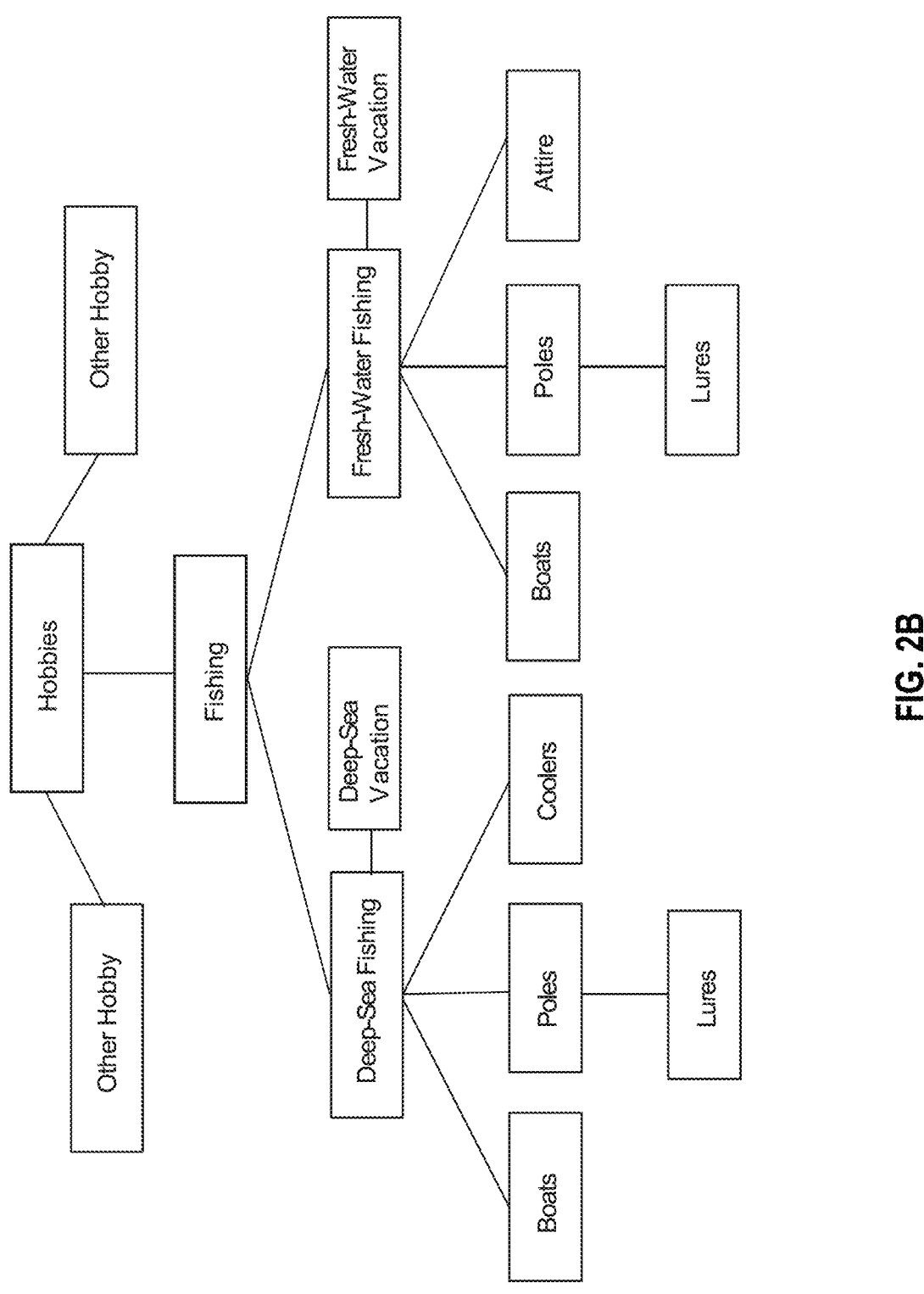
FIG. 2B is an illustration that represents a detailed "Hobbies" category of the Auto Classification Engine.

FIG. 2B is a further illustration of the Auto Classification Engine 70D depicting a detailed "Hobbies" representative subcategory of fishing. Fishing as a hobby may have subcategories, such as "Deep Sea" or "Freshwater" subcategories, which may further have subcategories of "Deep Sea Vacations" or "Freshwater Vacations" followed by another subcategory of "Poles" for each respective type of fishing, etc. to naturally develop and align as recognized by machine learning or artificial intelligence, as further depicted in a hierarchical structure shown in FIG. 2B.

Figure 2C:
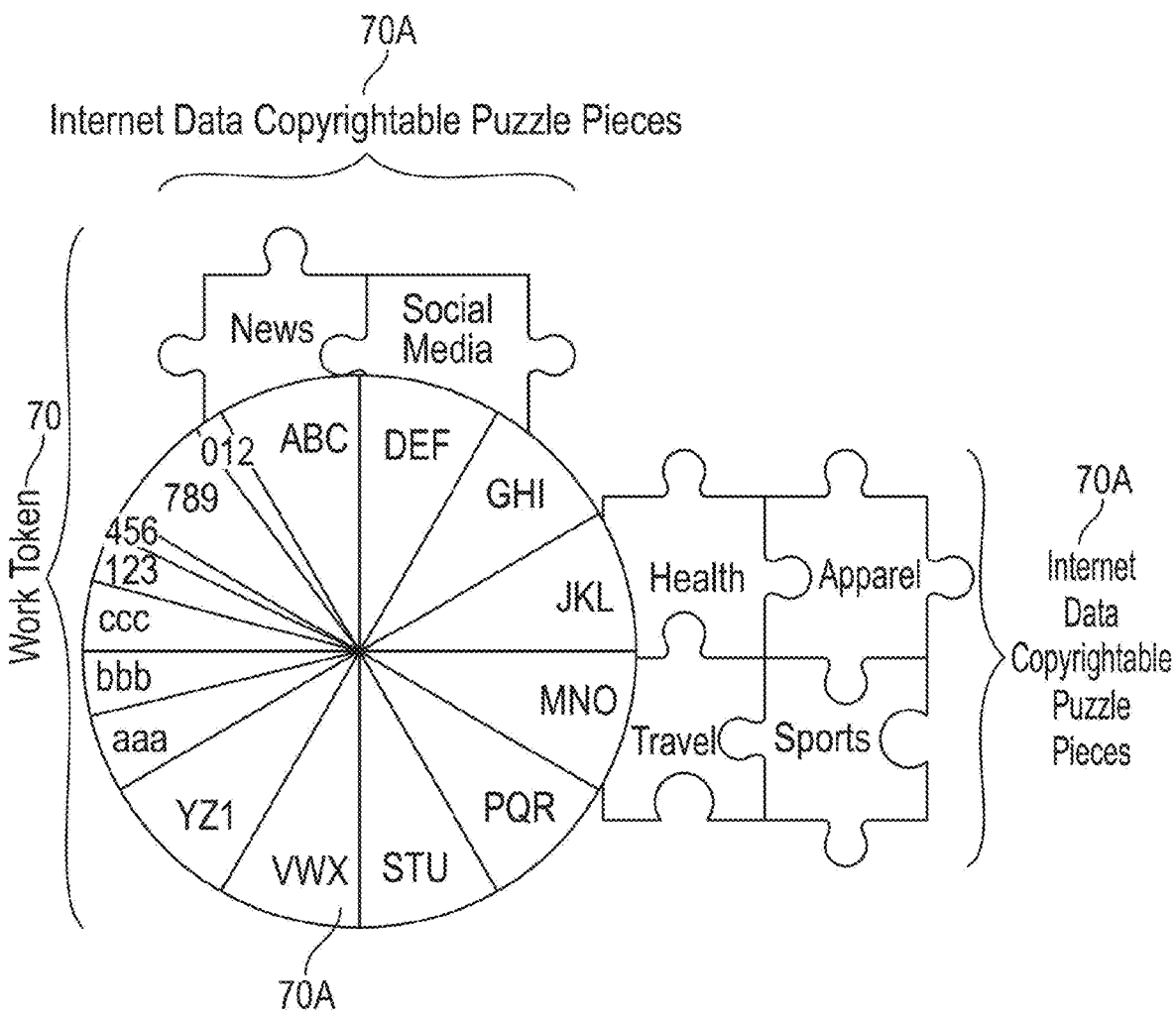
FIG. 2C represents personally identifiable information (PII) and digital footprint in the form of a PII Data Copyrightable Pie

FIG. 2C is an illustration that represents personally identifiable information (PII) 70A and digital footprint 70A in the form of a PII Data Copyrightable Pie. This Data Copyrightable Pie may serve as an original work and unique representation of a Data Contributor's 10/10A PII and digital footprint 70A. Each Work Token 70 may have different color coded individually labeled PII "Data Slice" 70A and digital footprint Data Puzzle Pieces 70A. Alternative formats, shapes, colors, etc., may be utilized to perform the same or similar functional. This PII and digital footprint information 70A can be weighted and color coded. As each PII Data Slice 70A and Data Puzzle Piece 70A is weighted, it can become larger or smaller depending on algorithms that determine the data's commercial importance or value 70B. In parallel, certain elements of the Data Copyrightable Pie may be color coded to represent a certain age bracket, income level, education, geographic location, internet interests, etc. In one embodiment example, the PII Data Slice 70A regarding age could be an array of blue shades and hews coded as such within the Data Copyrightable Pie:

| | |
|---|---|
| Ages 15-20 | Turquoise |
| Ages 21-26 | Royal Blue |
| Ages 27-32 | Navy Blue |
| Ages 33-38 | Cobalt Blue |
| Ages 39-44 | Light Blue |
| Ages 45-51 | Baby Blue |
| Ages 52-57 | Tiffany Blue |
| Ages 58-63 | Midnight Blue |
| Ages 64-69 | True Blue |
| Ages 70-75 | Cerulean Blue |
| Ages 76+ | Cornflower Blue |

In another embodiment example, the Data Slice 70A regarding PII income brackets could be an array of green shades and hews coded as such within the Data Copyrightable Pie:

| | |
|---|---|
| $25,000-$35,000 | Teal |
| $36,000-$46,000 | Turquoise |
| $47,000-$57,000 | Chartreuse |
| $58,000-$68,000 | Kelly Green |
| $69,000-$79,000 | Forest Green |
| $80,000-$90,000 | Lime Green |
| $91,000-$101,000 | Hunter Green |
| $102,000-$112,000 | Cyan Green |
| $113,000-$123,000 | Dark Green |
| $124,000-$134,000 | Neon Green |
| $135,000-$145,000 | Aquamarine |
| $146,000-$156,000 | Mint Green |
| $157,000-$167,000 | Light Green |
| $135,000-$145,000 | Olive Green |
| $146,000-$156,000 | Spring Green |
| $156,000-$166,000 | Pastel Green |
| $167,000-$177,000 | Jade Green |
| $178,000-$188,000 | British Racing Green |
| $189,000-$199,000 | Emerald Color |
| $200,000+ | Moss Green |

In a third embodiment example, the Data Slice 70A regarding PII education could be an array of purple shades and hews coded as such within the Data Copyrightable Pie:

| | |
|---|---|
| High School or GED | Amethyst Purple |
| Associates Degree | Blue-Violet |
| Four-year A.B. Degree | Dark Purple |
| Computer Science Degree | Dark Violet |
| Engineering Degree | Heliotrope Purple |
| Master's Degree | Indigo Purple |
| PhD | Iris Purple |
| MBA | Lavender |
| JD | Electric Indigo |
| MD | English Violet |

In a fourth embodiment example, the Data Slice 70A regarding PII zip code could be an array of color shades and hews coded as such within the Data Copyrightable Pie as can all other types of these types of PII Data Slices be demarcated by color in a similar fashion.

The Data Puzzle Pieces 70A may create an "Asymmetrical Crust" attached to the Data Pie. These Puzzle Pieces represent different aspects of a Data Contributor's 10/10A digital footprint 70A which fit together in AI arranged groups such as "News" and "Social Media" Puzzle Pieces finding a natural alignment and connection. In another embodiment, Internet search interests mapped out may create Data Puzzle Pieces encompassing "Health," "Apparel," "Sports," and "Travel." In this example, each of these interests is interconnected as "Health" may have a *nexus* with workout "Apparel," which may have a *nexus* with "Sports," which may have a connection with adventure "Travel" sports packages, etc. These logical and geometric puzzle piece connections may be utilized for a wide variety of interrelating an individual's digital footprint and interests expressed either consciously or unconsciously by a user's online activities and automatically captured and generated by a system configured to monitor and analyze a user's online presence, for example.

Each Puzzle Piece, similar to the Data Pie slices, may be color coded. A representative example as found in FIG. 2A could be as follows:

News Puzzle Piece Representations

| | |
|---|---|
| Conservative News Puzzle Piece | Red |
| Liberal News Puzzle Piece | Blue |
| Independent News Puzzle Piece | White |

Social Media Use Representations

| | |
|---|---|
| Heavy Social Media Use | Dark Green |
| Moderate Social Media Use | Medium Green |
| Light Social Media Use | Light Green |

Health Representations

| | |
|---|---|
| Heavy Health Interests | Dark Orange |
| Moderate Health Interests | Medium Orange |
| Light Health Interests | Light Orange |

Apparel Representations

| | |
|---|---|
| Formal Apparel Interests | Dark Yellow |
| Casual Apparel Interests | Medium Yellow |
| Sport Apparel Interests | Light Yellow |

Note: Apparel Puzzle Pieces may be segmented into three colors with different sized segments and colors represented by all three interests in one subdivided Puzzle Piece as described above.

Sports Representations

| | |
|---|---|
| Football | Dark Red |
| Basketball | Medium Red |
| Baseball | Light Red |
| Golf | Salmon Pink |

Note: Sports Puzzle Pieces may be segmented into four representative colors with different sized segments and colors represented all three interests in one subdivided Puzzle Piece as described above.

Travel Representations

| | |
|---|---|
| Domestic | Dark Brown |
| Europe | Medium Brown |
| South America | Light Brown |
| Asia | Tan Brown |

Note: Travel Puzzle Pieces may be segmented into many colors with different sized segments and colors represented all three interests in one subdivided Puzzle Piece as described above.

FIG. 2D represents part of the opt-in PII data and digital footprint information 70A that a Work Token 70 captures. Spreadsheets representative of Work Token Silos #1-#3 for each of the examples 2B-1, 2B-2, and 2B-3 are listed below.

| PII Sub Group | Data | Data Contributor Submitted | Weighting |
|---|---|---|---|
| sensitive | full name | ✓ | 10% |
| sensitive | medical records | ✓ | 10% |
| sensitive | ethnicity/religion | ✓ | 2.5% |
| sensitive | home owner | ✓ | 5% |
| sensitive | home address or zip code | ✓ | 5% |
| sensitive | email address | ✓ | 15% |
| sensitive | telephone number | ✓ | 2.5% |
| sensitive | IP address | ✓ | 5% |
| sensitive | income bracket | $100k+ | 12.5% |
| sensitive | credit score | 700 | 10% |
| sensitive | education | BA | 5% |
| sensitive | political affiliation | conservative | 5% |
| non-sensitive | age range, e.g. 35-44 | 41-50 | 5% |
| non-sensitive | gender | male | 5% |
| non-sensitive | Employer/employment | ✓ | 2.5% |

| Digital Footprint Sub Group | Five Primary Interests | Data Contributor Submitted | Weighting |
|---|---|---|---|
| non-sensitive | News | ✓ | 30% |
| non-sensitive | Social Media | ✓ | 40% |
| non-sensitive | Apparel | ✓ | 10% |
| non-sensitive | Sports | ✓ | 7.5% |
| non-sensitive | Health | ✓ | 12.5% |

| PII Sub Group | Data | Data Contributor Submitted | Weighting |
|---|---|---|---|
| sensitive | full name | ✓ | 10% |
| sensitive | medical records | ✓ | 10% |
| sensitive | ethnicity/religion | ✓ | 2.5% |
| sensitive | home owner | ✓ | 5% |
| sensitive | home address or zip code | ✓ | 5% |
| sensitive | email address | ✓ | 15% |
| sensitive | telephone number | ✓ | 2.5% |
| sensitive | IP address | ✓ | 5% |
| sensitive | income bracket | $45-50K | 12.5% |
| sensitive | credit score | 600 | 10% |
| sensitive | education | BA | 5% |
| sensitive | political affiliation | liberal | 5% |
| non-sensitive | age range, e.g. 35-44 | 41-50 | 5% |
| non-sensitive | gender | female | 5% |
| non-sensitive | Employer/employment | ✓ | 2.5% |

| Digital Footprint Sub Group | Five Primary Interests | Data Contributor Submitted | Weighting |
|---|---|---|---|
| non-sensitive | News | ✓ | 30% |
| non-sensitive | Social Media | ✓ | 40% |
| non-sensitive | Baking | ✓ | 10% |
| non-sensitive | Child Activities | ✓ | 7.5% |
| non-sensitive | Health | ✓ | 12.5% |

| PII Sub Group | Data | Data Contributor Submitted | Weighting |
|---|---|---|---|
| sensitive | full name | ✓ | 10% |
| sensitive | medical records | ✓ | 10% |
| sensitive | ethnicity/religion | ✓ | 2.5% |
| sensitive | home owner | ✓ | 5% |
| sensitive | home address or zip code | ✓ | 5% |
| sensitive | email address | ✓ | 15% |
| sensitive | telephone number | ✓ | 2.5% |
| sensitive | IP address | ✓ | 5% |
| sensitive | income bracket | $75-80K | 12.5% |
| sensitive | credit score | 650 | 10% |
| sensitive | education | BA | 5% |
| sensitive | political affiliation | liberal | 5% |
| non-sensitive | age range, e.g. 35-44 | 31-40 | 5% |
| non-sensitive | gender | male | 5% |
| non-sensitive | Employer/employment | ✓ | 2.5% |

| Digital Footprint Sub Group | Five Primary Interests | | Weighting |
|---|---|---|---|
| non-sensitive | News | ✓ | 30% |
| non-sensitive | Social Media | ✓ | 40% |
| non-sensitive | Automotive | ✓ | 10% |
| non-sensitive | Vacations | ✓ | 7.5% |
| non-sensitive | Health | ✓ | 12.5% |

The three examples depicted in FIG. 2D as depicted above show different PII and digital tracking data's 70A commercial worth input values 70B and information. FIG. 2D includes the uniform PII and digital footprint data that are inputted 70A by two representative males, respectively Work Token 70 Silos #1 and #2 and one female represented by Work Token 70 Silo #3. FIG. 2D furthermore shows how representative non-exclusive PII and digital footprint information 70A is selectively and collectively inputted and captured within a Work Token 70. This PII and digital footprint 70A is then transformed or converted 74 through artificial intelligence and machine learning mechanisms 75 into a PIICOIN cryptocurrency value 70C. Note, that three different PIICOIN cryptocurrency award values ("XXX" vs. "XX" vs. "X") 70C are assigned depending on value of the data of the Work Token 70 Data Contributor 10/10A.

In an alternative embodiment, the Pie Crust that is represented as a ring that encircles an outer circumference of the pie may be colored based on a user's online usage. As an example, a person who performs a lot of online shopping may have a certain color, someone who partakes in social media may be assigned with another color, left and right political activities with yet another color (e.g., red and blue), or a combination of colors, either mixed or distinct, based on a collective nature of a user's online presence. The colors may be assigned by an AI engine (e.g., neural network)

configured to identify a categorize a user's interests and behaviors. As another example, the AI engine may attempt to identify a user's personality traits to generate a color map that may align with traditional or proprietary personality trait quadrants.

Work Token Value Creation and Differentiation

Figure 3:
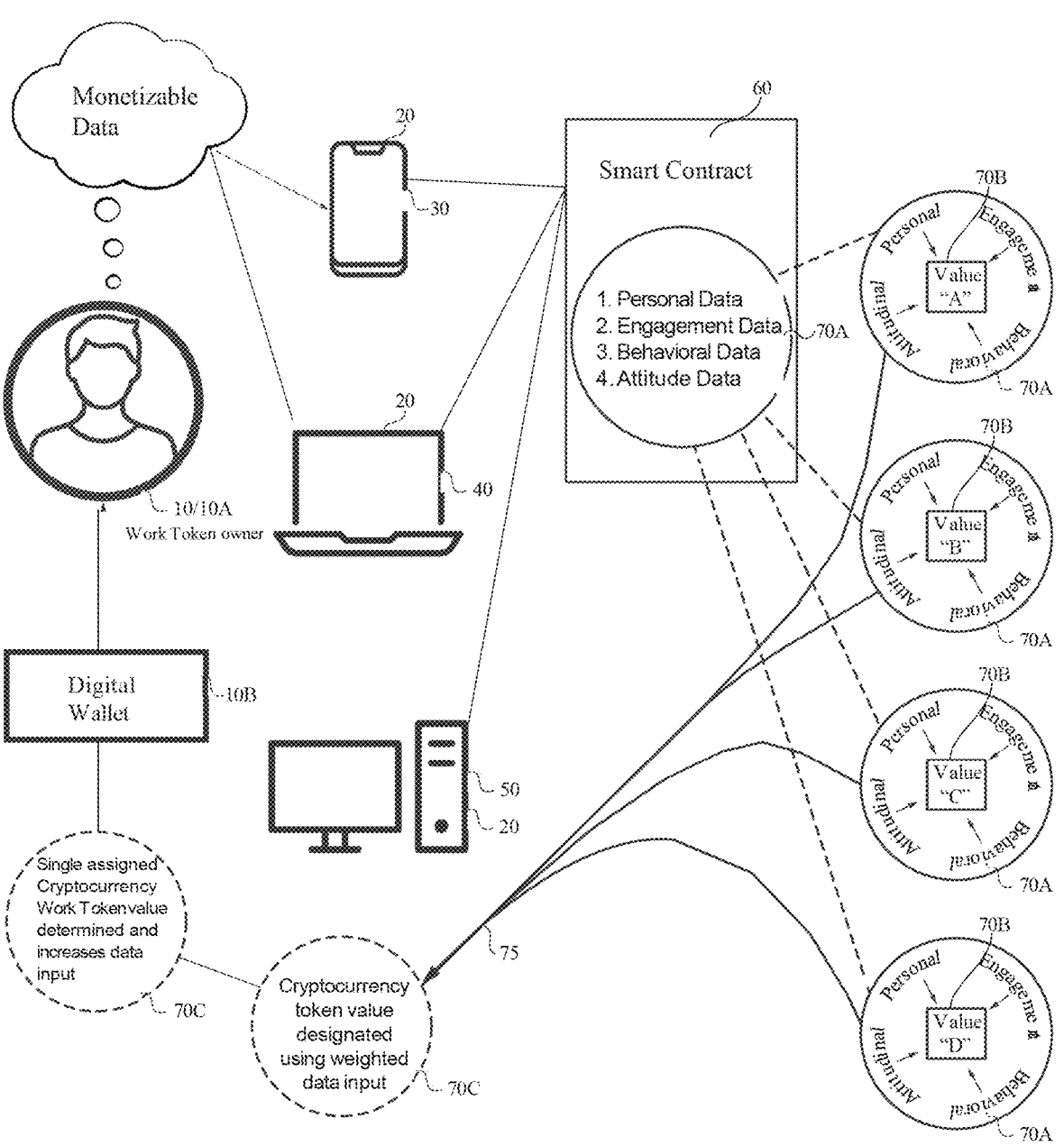
FIG. 3 is an illustration that represents the Smart Contract Work Token that captures any Internet user's opt-in PII/digital footprint data from a plurality of devices using a Browser protocol.

FIG. 3 is an illustration that represents the Smart Contract Work Token 70 that captures any Internet user's opt-in PII/digital footprint data 70A from a plurality of devices 30, 40, 50 using a Browser protocol 20 that a prospective Data Contributor 10/10A agrees to use via fulfilling the Smart Contract 60 to capture, populate, deposit, imprint, blockchain-copyright, non-fungible tokenize, cleanse, sort, configure and assign or license or share ownership 20A of data onto the Work Token 70.

Once a Smart Contract 60 is created, the SCIP 80 generated Work Token 70 stores an individual's opt-in PII/digital footprint data asset 70A. The SCIP system 80 captures, deposits, stores, configures, analyzes and converts said opt-in PII/digital footprint 70A into a stored data commercial value 70B which is subsequently transformed into a distinct data-asset backed PIICOIN 70C value or other form of valuable recompense ascribed by the SCIP system 80. The SCIP 80 issued Work Token 70, understood as a combination of the SCIP owner's 10/10A opt-in PII/digital footprint asset 70A combined with the resultant ascribed value 70B as depicted, could represent any number of different values as suggested by the illustration, but, is ultimately assigned a value in time 70B which may become or take the form of a distinct PIICOIN 70C data-asset-backed PIICOIN or other form of recompense. The selected SCIP value 70B is then assigned to the specific SCIP 80 issued Work Token 70 which had generated the opt-in PII/digital footprint data asset 70A. The SCIP's value 70B now transformed into a distinct data-asset backed PIICOIN 70C value or other form of valuable recompense transmitted to the Data Contributor 10/10A and held through a digital wallet 10B.

In various embodiments, the specialized Browser 20 installed on the Data Contributors 10/10A computing devices 30, 40, 50 may be constructed to allocate one or more processes including the blockchain-copyright function 20A that comprise part of the SCIP data intake and processing system 80. The one or more software applications embedded into the Data Contributors' 10/10A computing devices 30, 40, 50, could be configured to allow access to the one or more computer networks supporting the SCIP data intake and processing system 80. Therefore, said SCIP data intake and processing system 80 system may then be designed to accept from one or more computing devices 30, 40, 50 interfacing with the SCIP data intake and processing system 80 system via a Firewall or other digital security measures one or more networks inputting raw PII/digital presence/footprint data 70A to create sorted, tiered, and group specific data silos 70A for analysis, parsing, grouping, tiering, interrelating and storage to appoint a commercial value 70B in time of said data 70A In particular embodiments, the SCIP system 80 is configured to: (1) generate a Work Token 70 data asset bundle model for one or more data asset bundles 70A that was blockchain copyright protected 20A, imprinted, cleansed, sorted, analyzed, communicated, and configured to both safeguard and monetize said data 70A; (2) generate a data asset class inventory commercial value 70B for each of the one or more Data Contributors 10/10A; and (3) map one or more relationships between one or more aspects of the data owners' inventory, the one or more data asset bundles, etc. within the particular data model. The SCIP data intake and processing system 80 may be organized to provide an explanation of the data categories, groupings, tiers, interrelations, and other organizational data parsing and siloing features for interested third party-data acquirers 90. In other embodiments, the SCIP data intake and processing system 80 may be designed to avail itself one or more machine learning techniques to recognize certain types of combined PII and digital presence/footprint data 70A such as, for example, the geographical state or country where PII/digital presence/footprint 70A data originates.

In a particular embodiment, an individual Data Contributor 10/10A serves as a primary data asset bundle 70A associated with a specific processing activity central to the development of the SCIP data storage system 80 that is correspondingly configured to build a SCIP data model 80 associated with the particular data intake processing Work Token's 70 activity. Furthermore, in particular embodiments, the SCIP system 80 is configured to identify an individual Data Contributor/10A by scanning a central or, alternatively, a plurality of computer systems associated with a particular individual Data Contributor 10/10A. In various embodiments, the SCIP system 80 is configured to identify an individual data producer-owner 10/10A from a plurality of data individual Data Contributors 10/10A identified, distinguished, and differentiated in response to completion and submission of a plurality of individual Data Contributor 10/10A users from the unique blockchain copyrighting 20A of an individual's Work Token's 70 Personal Data.

Data Monetization

Figure 3A:
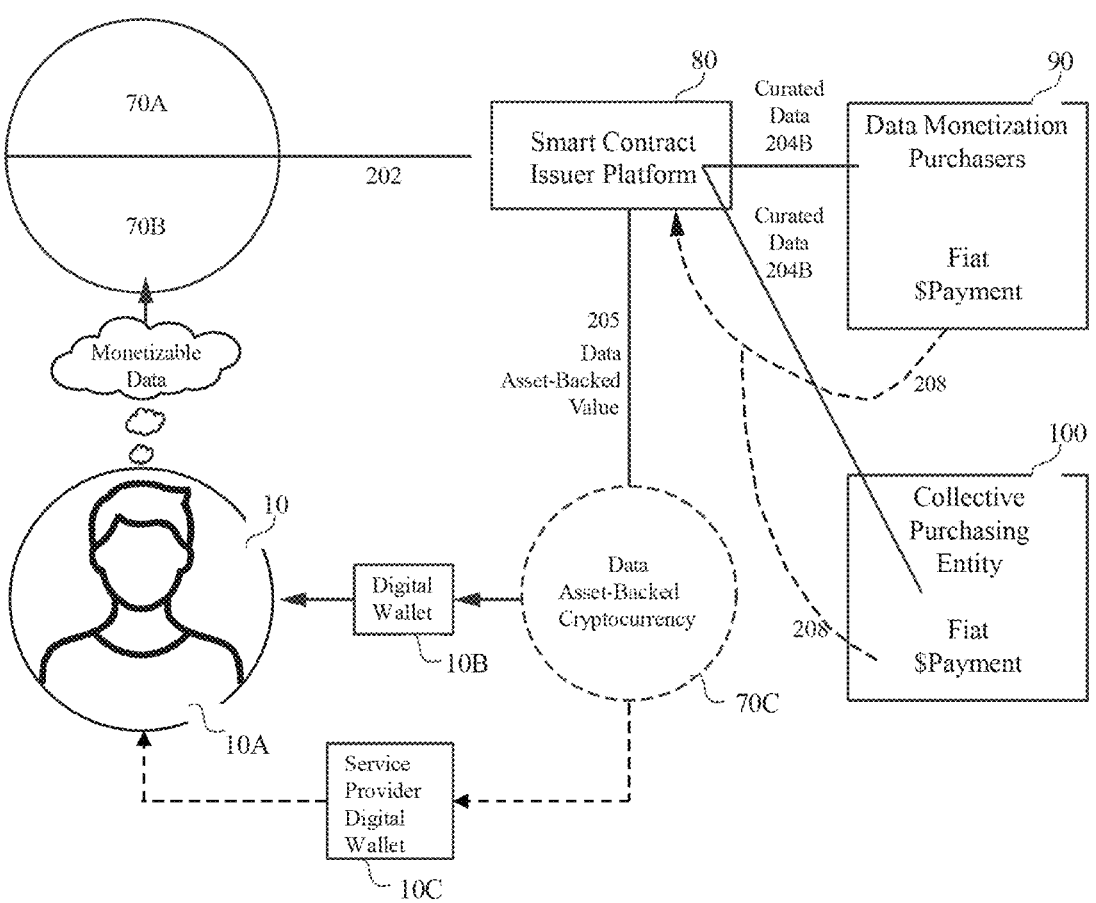
FIG. 3A represents an example of the system whereby a human person uses a computing device to deposit his/her PII and generate opt-in data that is classified and assigned a Smart Contract value depending on the commercial and social policy applications/insights value of said data assets determined by artificial intelligence that may be used or acquired by first and third parties to be paid to the Data Contributor in congruity with the disclosure through the issuance of PIICOINs or another form of recompense.

FIG. 3A represents an example of the system whereby a human 10 generates opt-in monetizable PII/digital footprint data 70A and a resulting commercial value 70B (collectively 70) that is captured via the SCIP system 80 and sold to data monetizers 90 whereby the fiat proceeds 208 of said sale are funneled back 208 to the SCIP system 80. The SCIP system 80 assigns and issues a subsequent recompense value 70C via a data-asset-backed PIICOIN 70C of one or more PIICOINs 70C which is distributed to the Data Contributor 10/10A through the SCIP owner's digital wallet 10B. In an embodiment, the Data Contributor 10/10A may contractually be provided services (e.g., via a Smart Contract) by a service provider, and rather than the Data Contributor 10/10A being paid by the data-asset-backed PIICOIN 70C, the service provider may be paid by the platform into a service provider digital wallet 10C. Because the contracts between the service provider and Data Contributor 10/10A and Data Contributor 10/10A and cryptocurrency platform may both be smart contracts, the smart contracts may function to cause the payments to automatically be made when the platform is to pay the Data Contributor 10/10A. And, because the Data Contributor 10/10A has a smart contract with the service provider (e.g., insurance company), in the event of an incident (e.g., hurricane), the smart contract may automatically trigger payment from the insurance company to the digital wallet 10B (payment path not shown between account of the service provider and digital wallet 10B) of the Data Contributor 10/10A in response to the service provider's obligations as a result of the incident.

This same FIG. 3A also represents an example of the system whereby a human 10 generates opt-in monetizable PII/digital footprint data 70A and a commercial value 70B within a Work Token 70 that is captured and analyzed via the SCIP system 80 to offer special, customized offers 209 to the Data Contributor 10/10A from the SCIP's Purchasing Collective 100. Should the Data Contributor 10/10A choose to purchase the special, customized offer from the Purchasing Collective 100, the goods/services 211 are delivered to the Data Contributor 10/10A while a fiat payment commission 212 is remitted to the SCIP Issuer 80 in return for generating the sale 210 part of which supports the data asset-backed PIICOIN 70C.

In certain embodiments, the one or more computing networks tethered to the SCIP data intake and processing system 80 creates one or more restricted networks. In further embodiments, the one or more computing networks create one or more network portions connected via one or more secure appropriate routers, one or more secure appropriate network hubs, one or more secure appropriate network switches. In various embodiments, a data model generation system may, on behalf of a particular third-party data purchaser 90, produce a SCIP data model 80 that encompasses a plurality of processing activities including Work Token 70 applications. In other embodiments, the system may be configured to produce a discrete data SCIP model 80 for each of a plurality of Work Token 70 processing activities undertaken.

The blockchain copyrighted 20A data asset SCIP model 80 may further comprise one or more individual Data Contributor's 10/10A assets 70A to create an assemblage of SCIP system's 80 data assets 70A housed in the SCIP issued Work Tokens 70. The exemplary data model 20, 20A, 60, 70, 80 depicted in this figure assets comprises a Data Contributor's 10/10A individual assets 70A pooled a data subject into a collection of the SCIP system's 80 data asset Work Tokens 70 that are blockchain copyright protected 20A, imprinted, cleansed, and analyzed. In addition, these data assets or Work Tokens 70 are sorted, analyzed, communicated, and configured to monetize said data by offering sub-groupings and tiers of data customized to the wants and needs of third-party data purchasers 90.

The System may, for example, store the Work Token 70 data assets model in the one of more SCIP system models 80. In various embodiments, producing the Work Token 70 data model comprises producing a data structure Work Token 70 that encapsulates information pertaining to one or more data asset Work Token bundles 70 along with attributes 70A/70B and other elements that make up the SCIP 80 generated Work Token 70 data model. As may be understood in light of this disclosure, the one or more Work Token(s) 70 data assets may include any Work Token 70 data assets 70A that may be similar, related to one another, or grouped together as similar Work Token 70 data bundles 70A. In certain embodiments, the one or more Work Token's 70 data assets 70A may be related as they are attributed to an individual Data Contributor 10/10A or group of similarly data defined Data Contributors 10/10A or groups of Data Contributors 10/10A.

The SCIP system 80 generates Personal Data inventory 70A from individual Data Contributors 10/10A. Said Personal Data inventory 70A may include attributes 70A associated separately with each and every individual Data Contributors 10/10A who, when machine-grouped together in different tiers and sub-groups 70A according to their respective data attributes 70A, comprise a plurality of from individual Data Contributors 10/10A. Best understood in light of this disclosure, the SCIP system 80 may be configured to generate the one or more Data Contributors 10/10A placeholder fields based at least in part on, for example: (1) the type, disclosure, and breadth of the Work Token 70 data inputted by the individual Data Contributor 10/10A; (2) one or more third party data purchasers 90 utilized by the SCIP system 80; and (3) the number of internal and external collection or storage assets typically associated with the SCIP repository system 80.

In analyzing one or more of the SCIP system's data asset inventories 80 for each of the one or more the Work Tokens 70 data subsets the SCIP data model 80 has organized, the SCIP system 80 may, for example, recognize one or more specific data attributes 70A that are siloed into one or more data SCIP system inventories 80. In various embodiments, the SCIP system 80 may use artificial intelligence and specialized algorithms evaluate one or more Work Token(s) 70 data assemblies related to with the SCIP system data model 80 to recognize and act upon one or more of the SCIP system's 80 data asset Work Token 70 inventories. The SCIP system 80 is designed to construct a large body of vetted SCIP 80 data assemblages or Work Tokens 70 to identify inventory attributes for each of the known Work Tokens 70 data assets 70A.

In certain embodiments, the SCIP data intake and processing system 80 system is designed to provide third-party data purchasers 90 contractual and interface access the SCIP data intake and processing system 80 to enable harvesting specific PII/digital presence/footprint data 70A categories of commercial, policy or academic interest for each of a plurality of respective data subjects, as described herein.

In certain embodiments, the SCIP data intake and processing system 80 may be constituted to allow individual Data Contributors 10/10A whom the SCIP data intake and processing system 80 has identified as sharing certain similar data attributes 70A to communicate with other Data Contributors 10/10A via their respective Work Tokens 70 regarding commercial offers and social opportunities that might interest said individual data producer-owner parties via their respective Work Tokens 70. In response to this feature, the SCIP data intake and processing system 80 may impose corporate type or governing rules how these Data Contributors 10/10A may form an organic purchasing group seeking certain goods or services that the SCIP data intake and processing system 80 may locate for them at the most competitive pricing by harnessing the power of, for example, a like-minded and like-financially situated group of people. In certain embodiments, the SCIP data intake and processing system 80 may, for example, affirmatively or negatively respond to a request by an organically formed group of Data Contributors 10/10A for certain goods or services if these goods and services are, indeed, available to said Data Contributors group 10/10A. In further response to this feature's social opportunities, the SCIP data intake and processing system 80 may impose corporate type or governing rules via Work Token 70 interactions and corresponding inter-relatability to suggest a particular or set of Social Collectives that might interest Data Contributors 10/10A to join.

Similarly in certain embodiments, the SCIP data intake and processing system 80 may be designed to automatically decide one or more actions to take in response to a current request from group of Data Contributors 10/10A. Accordingly, for example, the SCIP data intake and processing system 80 may: (1) compare the number of interested like-minded, like-financially, and geographically similar potential Data Contributors 10/10A who might become purchasers 10/10A; (2) recognize how many of these interested parties have committed and purchased other offers secured and proffered by the SCIP data intake and processing system 80; (3) offer the proposed deal; (4) facilitate the group purchase; (5) take a commission from said purchase; (6) ensure the goods or services are delivered to its constituent of Data Contributors 10/10A.

Cryptocurrency Valuation and Regulation

Figure 3B:
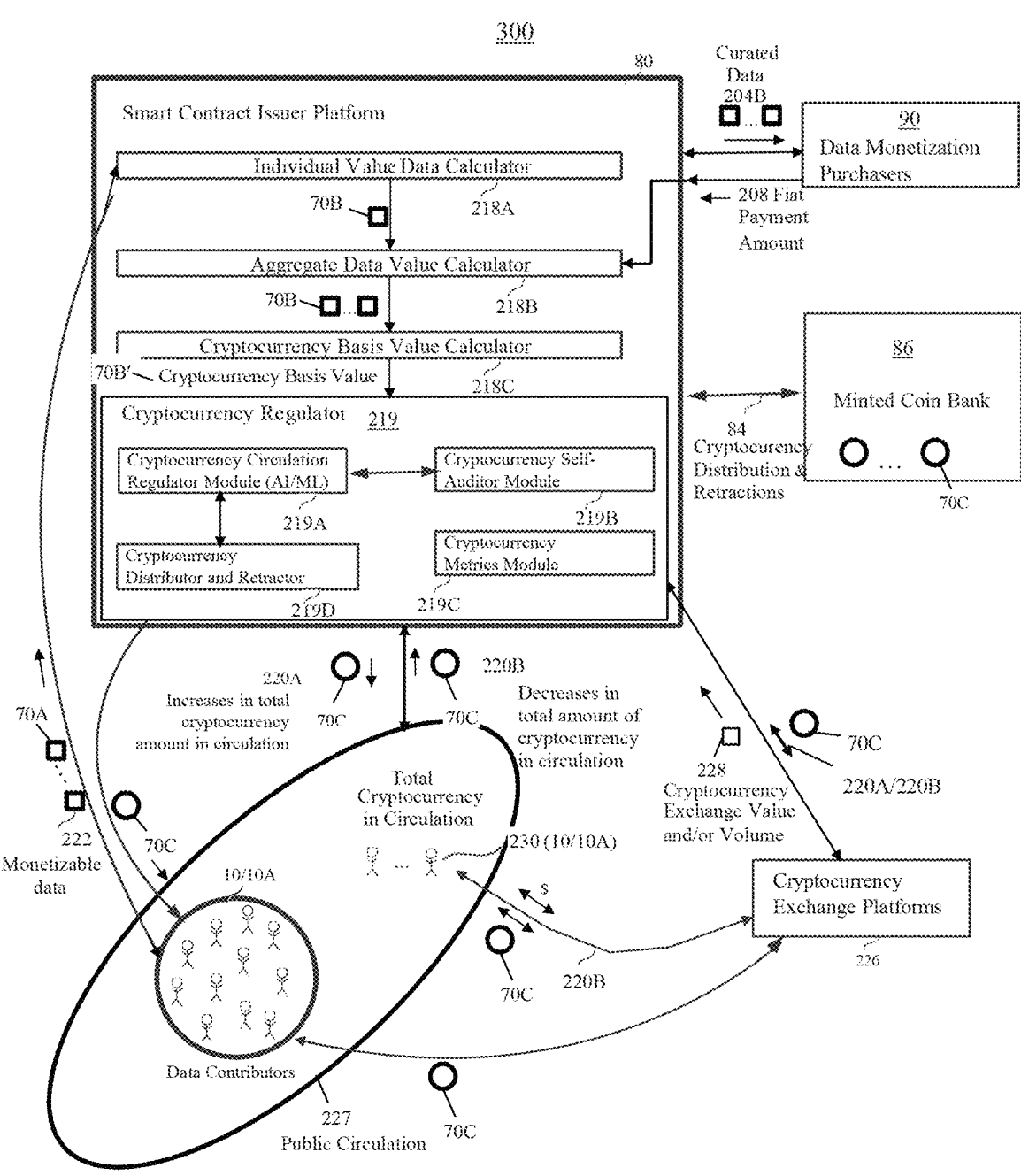
FIG. 3B is an illustration of an illustrative cryptocurrency environment may be configured to regulate an amount of cryptocurrency in circulation based on underlying data asset value produced by Data Contributors.

With regard to FIG. 3B, an illustration of an illustrative cryptocurrency environment 300 may be configured to regulate an amount of cryptocurrency in circulation based on underlying data asset value produced by Data Contributors 10/10A is shown. In an embodiment, an amount of cryptocurrency 70C placed into public circulation 227 to be held by public cryptocurrency owners 230, which may include distributing the cryptocurrency 70C as compensation to Data Contributors 10/10A, who are also owners of the cryptocurrency 70C, may be automatically regulated, as further described herein. In an embodiment, an Individual Value Data Calculator 218A may govern and support an Aggregate Data Value Calculator 218B in that calculations by the Individual Value Data Calculator may be provided to the Aggregate Data Value Calculator 218B. The Aggregate Data Value Calculator 218B may be used to determine total amount of value of data produced by a collective Data Contributors 10/10A.

A Cryptocurrency Basis Value Calculator 218C may be used to calculate value of the cryptocurrency based on cumulative average fiat of individual data value 70B of the Data Contributors 10/10A. The Calculator 218C may generate a cryptocurrency basis value 70B' that may be communicated to a cryptocurrency regulator 219 for use in regulating an amount of cryptocurrency in circulation, as further described herein. The Calculators 218A, 218B, and 218C may be executed on a periodic or aperiodic basis to calculate respective data values.

These two respective Calculators 218A and 218B may, in turn, interact with the Cryptocurrency Regulator 219 in which a Cryptocurrency Circulation Regulator Module 219A and Cryptocurrency Self-Auditor Module 219B to respectively determine an aggregate amount of cryptocurrency 70C in circulation and perform supply metric calculations (e.g., cryptocurrency supply M1, M2, M3, etc. calculations), as further described herein. In an embodiment, the Module 219A may utilize AI and/or ML to calculate statistics and regulate an amount of cryptocurrency in public circulation 227.

The SCIP 80 may automatically distribute 220A the calculated amount of cryptocurrency 70C as sourced 84 from the Minted Coin Bank 86 (i.e., a reserve with minted cryptocurrency not in circulation) to the respective Data Contributors 10/10A through their digital wallets 10B. The minted coin bank 86 may be used as a repository of all minted cryptocurrency 70C. As shown, the cryptocurrency 70C may be put into circulation via the cryptocurrency exchange platforms 226. This aggregate cryptocurrency amount may be automatically regulated based on, at least in part, results from the Calculators 218A-218C and Modules 219A-219D (optionally incorporated into the SCIP 80) the total quantity of the cryptocurrency 70C in circulation. Data Contributors 10/10A and other cryptocurrency holders 240, which may also include the Data Contributors 10/10A, may sell or exchange their cryptocurrency holdings 70C on public Cryptocurrency Exchange Platforms 226. In an embodiment, the Modules 218A, 218B, 219A, and 219B are interdependent in that calculations from one calculator (e.g., calculator 218A) may be used by another calculator (e.g., calculator 218B).

The cryptocurrency regulator 219 may further include a cryptocurrency distributor and retractor 219D that may be configured to distribute and retract cryptocurrency 70C that is in circulation as a function of results of the calculators 218A and 218B along with the Modules 219A and 219B. The aggregate supply of cryptocurrency 70C may be a function derived from the basis of the aggregate data value determined by the individual data value 70B of the collective Data Contributors 10/10A. In an embodiment, the cumulative data value 70B may be calculated as cumulative fiat value associated with the collective Data Contributors 10/10A, and may be performed on a periodic or aperiodic (e.g., event driven) time interval. Through programmed parameters, the Cryptocurrency Regulator 219 may utilize the Cryptocurrency Circulation Regulator Module 219A to determine how to regulate the cryptocurrency in circulation based on results from the Modules 218A and 218B.

The Cryptocurrency Circulation Regulator Module 219A may be configured with an artificial intelligence engine (not shown) and/or machine learning engine (not shown) to regulate the amount of cryptocurrency 70C to be placed or withdrawn in circulation based on the valuation of the aggregate data value 70B. This valuation may be influenced on the open market through cryptocurrency exchange platforms 226 or based on another machine learning calculus. In one embodiment, information, such as Cryptocurrency Exchange Value and Volume 228, may be communicated from the cryptocurrency exchange platforms 226 and used by the Regulation of Cryptocurrency Circulation Regulator Module 219A to influence cryptocurrency regulation (e.g., amount of the cryptocurrency 70C of the cryptocurrency 70C in circulation). In an embodiment, the Cryptocurrency Exchange Value and Volume 228 data may be utilized by the Module 219A to determine whether to partition into smaller fractions of existing cryptocurrency 70C, issue additional cryptocurrency 70C, or otherwise adjust the cryptocurrency in circulation.

The Regulation of Cryptocurrency Circulation Regulator Module 219A may further be configured to operate autonomously or receive certain parametric inputs (e.g., range of cryptocurrency allowed to be in circulation at any given time) in providing rules for the Module 219A. As noted, the SCIP 80 calculates an amount of cryptocurrency 70C to both be distributed 220A to each Data Contributor 10/10A, and, hence, all aggregate Data Contributors 10/10A on a quarterly or other set time basis along with the cryptocurrency owners 230 (who may or may not be Data Contributors 10/10A). In other words, the cryptocurrency owners 230 may acquire the cryptocurrency 70C by being (i) Data Contributors 10/10A, (ii) purchasers via cryptocurrency exchange platforms 226, or (iii) otherwise (e.g., receive cryptocurrency 70C via payment in any other manner). In addition, cryptocurrency distributor and retractor 219D may be configured to automatically or semi-automatically (e.g., interact with a human to approve a change before performing any or any major adjustment to the cryptocurrency supply in circulation). In an embodiment, the cryptocurrency distributor and retractor 219D may utilize artificial intelligence, machine learning, or any other programmatic configuration to automatically monitor and regulate the amount of cryptocurrency in circulation.

As previously described, the cryptocurrency distributor and retractor 219D utilizes the aggregate data value created by the Data Contributors 10/10A as a basis of the overall fiat value of the cryptocurrency in circulation, which may be used by the cryptocurrency distributor and retractor 219D to perform the functions of distributing and retracting the cryptocurrency in circulation, as shown. In a non-limiting embodiment, the cryptocurrency distributor and retractor 219D may perform distribution of the cryptocurrency 70C by (i) electronically distributing the cryptocurrency 70C to digital wallets 10B of Data Contributors 10/10A on a periodic or aperiodic basis in response to producing monetizable data, (ii) to the cryptocurrency exchange platforms 226, or (iii) otherwise. In a non-limiting embodiment, the cryptocurrency distributor and retractor 219D may perform retraction of the cryptocurrency 70C from circulation through (i) open market repurchases via the cryptocurrency exchange platforms 226, (ii) direct buy-back offers from the Data Contributors 10/10A and/or cryptocurrency.

In another embodiment, the SCIP 80 through its respective interdependent Calculators (Individual Data Value) 218A, (Aggregate Data Value) 218B, (Cryptocurrency Circulation Regulator Module 219A) and (Self-Auditor Module 219B) may determine to decrease the amount of cryptocurrency 70C in circulation. This is accomplished by fractionating the shares of cryptocurrency 70C issued to Data Contributors 10/10A in return for monetization of their combined PII and Digital footprint 70A. The cryptocurrency may be fractionated up the sixteenth decimal. As an example, the respective Calculators 218A-218C and Modules 219A-219D, optionally working in concert, may determine that the cryptocurrency 70C should be divided into 10 parts (similar to a US dollar being partitioned into 10 dimes) if the Individual Data Calculator 218A feeds the Aggregate Data Calculator 218B information that the Individual Data Value (combined PII and digital footprint 70A) has, on gross average, risen above a $200 USD mark. Hence, the aggregate of Data Contributors 10/10A are valued at an average of $200 apiece (used by potentially thousands or millions of people). As a result, the SCIP 80 may determine that fractionated cryptocurrency distributions 220A shall be made as a function of the individual Data Contributor's 10/10A value 70B as represented and distributed by a cryptocurrency value 70C. Therefore, in this example, if a Data Contributor's combined PII and digital footprint 70A were to be calculated to be $80 and the current market value of the cryptocurrency is $200, the Data Contributor 10/10A would receive four one-tenths (200/80) of a cryptocurrency 70C coin. The regulation of the cryptocurrency 70C through reacquisition may best be analogously described or compared to share or stock splits by a company.

In a further embodiment, as an example of how the interdependent Calculators 218A, 218B and Modules 219A, 219B, 219C may regulate the withdrawal of cryptocurrency 70C and thus decrease the amount of cryptocurrency 70C in market circulation, the Individual Data Value Calculator 218A could determine that should the Individual Data Value (the total combined PII and digital footprint 70A produced by all current Data Contributors 10/10A) falls below $100 USD, a designated amount the cryptocurrency 70C may be reacquired by the SCIP 80 through the Modules 219A and 219B. The withdrawal 84 of cryptocurrency can be accomplished through open market purchases. The regulation of the cryptocurrency 70C through reacquisition may best be analogously described or compared to share or stock repurchases by a company.

With further regard to FIG. 3B, an illustration of an embodiment of cryptocurrency 70C being placed into public circulation to both Data Contributors 10/10A and/or cryptocurrency owners 230. The Data Contributors 10/10A may earn cryptocurrency 70C by performing work (e.g., providing their respective PII and using a specialized browser that maintains their respective data under their control), and may be configured to regulate in part using an Individual Value Data Calculator 218A to determine value of the PII and digital footprint 70A to generate Data Value 70B. The collective Data Value of the Data Value 70B may governs and supports an Aggregate Data Value Calculator 218B, which calculates the collective data value that may be used to be an underlying value of the cryptocurrency 70C. The results of the two respective Calculators 218A and 218B be used by a Cryptocurrency Regulator 219 with a Cryptocurrency Circulation Regulator Module 219A and Cryptocurrency Self-Auditor Supply Metric Calculators 219B to mutually determine an aggregate amount of cryptocurrency 70C to be distributed 220A to each respective Data Contributors 10/10A as a function of the individual data value 70B and, hence, all Data Contributors 10/10A for an aggregate Data Value 218B. The SCIP 80 automatically distributes 220A the calculated amount of cryptocurrency 70C as sourced 84 from the Minted Coin Bank 86 to the respective Data Contributors 10/10A through their digital wallets 10B. This aggregate cryptocurrency amount is automatically regulated through a series of interdependent Calculators 218A, 218B and Modulators 219A, 219B, 219C (incorporated into the SCIP 80) the total quantity of the cryptocurrency 70C in circulation. Data Contributors 10/10A may sell or exchange 224 their cryptocurrency holdings 70C on public Cryptocurrency Exchange Platforms 226.

This regulation of cryptocurrency 70C in circulation is a function derived from the basis of the aggregate SCIP 80 platform's data value (cumulative fiat value 70B of all Data Contributors 10/10A as converted into a cumulative cryptocurrency value 70C) within the SCIP 80 at a given interval in time. Through programmed parameters, artificial intelligence and/or machine learning may regulate the amount 220 of cryptocurrency 70C to be placed into or withdrawn from circulation based on the cryptocurrency's 70C valuation. This valuation may be, in part, determined on the open market through cryptocurrency exchange platforms 226 or based on another machine learning calculus. As noted, the SCIP 80 calculates an amount of cryptocurrency 70C to both be distributed 220A to each Data Contributor 10/10A, and, hence, all aggregate Data Contributors 10/10A on a quarterly or other set basis along with the public 230 (who do not wish to become Data Contributors 10/10A) who simply wish to acquire the cryptocurrency 70C from cryptocurrency exchanges 226. In addition, the Calculators 218A, 218B and Modules 219A, 219B, 219C may determine, once again through programmed machine learning parameters, to retract 84, and thus decrease certain amounts of cryptocurrency 70C from the market through open market repurchases 226 or direct buy-back offers from Data Contributors 10/10A. It should be understood that some or all of the Calculators 218A, 218B and Modules 219A, 219B, 219C may be utilized in performing the cryptocurrency regulation and that the functionality performed by the Calculators and Modules may be represented in different manners.

In another embodiment, the SCIP 80 through its respective Calculators (Individual Data Value) 218A, (Aggregate Data Value) 218B, (Cryptocurrency Circulation Regulator Module) 219A, (Self-Auditor) 219B, (Metrics) 219C may determine to decrease the amount of cryptocurrency 70C in circulation. This is accomplished by fractionating the shares of cryptocurrency 70C issued to Data Contributors 10/10A in return for monetization of their combined PII and Digital footprint 70A. The cryptocurrency may be fractionated up the sixteenth decimal. As an example, the respective Calculators, working in concert, could determine the cryptocurrency 70C should be divided into 10 parts (similar to a US dollar being partitioned into 10 dimes) if the Individual Data Calculator 218A feeds the Aggregate Data Calculator 218B information that the Individual Data Value (combine PII and digital footprint 70A) has, on gross average, risen above a $200 USD mark. Hence, the aggregate of Data Contributors 10/10A are valued at an average of $200 apiece which could be thousands to millions of people. As a result, the SCIP 80 determines that fractionated cryptocurrency distributions 220A shall be made as a function of the individual Data Contributor's 10/10A value 70B as represented and distributed by a cryptocurrency value 70C. Therefore, in this example, if a Data Contributor's combined PII and digital footprint 70A were to be calculated to be $80 70B and the current market value of the cryptocurrency was $200, the Data Contributor 10/10A would receive four one-tenths (200/80) of a cryptocurrency 70C coin. The regulation of the cryptocurrency 70C through reacquisition may best be analogously described or compared to share or stock splits by a company.

In a further embodiment, as an example of how the Calculators 218A, 218B and Modules 219A, 219B, 219C may regulate the withdrawal of cryptocurrency 70C and thus decrease the amount of cryptocurrency 70C in market circulation, the Individual Data Value Calculator 218A could determine that should the Individual Data Value (the total combined PII and digital footprint 70A of current Data Contributors 10/10A) fall below $100 USD, a designated amount the cryptocurrency 70C will be reacquired by the SCIP 80 through the Regulation 219A and Self-Auditing 219B Calculators working in concert. Said withdrawal 84 of cryptocurrency can be accomplished through open market purchases. The regulation of the cryptocurrency 70C through reacquisition may best be analogously described or compared to share or stock repurchases by a company.

Automatic Auditing and Cryptocurrency Metrics

With further regard to FIG. 3B, and in particular with the Cryptocurrency Self-Auditor Module 219B, the system may be configured to perform automatic self-auditing. Automatic self-auditing may be used to track and account for cryptocurrency (e.g., Crypto Coin) that is distributed and exchanged. In an embodiment, one or more software modules may be configured to monitor cryptocurrency transactions that are performed by the system, which is generally a peer-to-peer distributed platform on which users are able to exchange cryptocurrency at any fractional denomination. The cryptocurrency itself may be configured to be self-reporting, digital wallets may be configured to be self-reporting, and/or Smart Contracts may be configured to be self-reporting. In an alternative embodiment, a software module may be configured to inspect blocks of data on one or more blockchains associated with cryptocurrency exchanges, where the blocks of data may include metadata representative of transfers and/or transactions of the cryptocurrency. In summary, a centralized or distributed set of software modules may be configured to perform automatic auditing on existing cryptocurrency that has been supplied to the digital market. In an alternative embodiment, rather than using software modules per se, a cryptocurrency and/or blockchain platform may be established that automatically tracks and self-reports or is capable of being polled so as to enable a fully transparent automatic audit of cryptocurrency in the market. Because the platform may be configured to be automatic, additional detail may be provided, such as report the financial strength of the current owner, type of current owner, commercial versus consumer, and so on so that additional information may be gleaned from the automatic auditing.

In addition to self-auditing module 319B, the Cryptocurrency Metrics Module 319C may support monetary metrics that analysts may utilize to determine the "health" of the cryptocurrency and ecosystem (e.g., marketplace(s)) being supported by the cryptocurrency. For example, monetary metrics may be analogous to conventional monetary metrics of physical currency, including M1, M2, M3, etc. As understood for conventional physical currency, M1 is the money supply that is composed of physical currency and coin, demand deposits, travelers' checks, other checkable deposits, and negotiable order of withdrawal (NOW) accounts. M1 is a narrow measure of the money supply that includes physical currency, demand deposits, traveler's checks, and other checkable deposits. M2=M1+savings deposits+money market funds+certificates of deposit+other time deposits. M3 is a collection of the money supply that includes M2 money as well as large time deposits, institutional money market funds, short-term repurchase agreements, and larger liquid funds. M3 is closely associated with larger financial institutions and corporations than with small businesses and individuals. M4=M3+total post office deposits. While it is noted that M1 and M3 are generally no longer used as guidance for establishing monetary policy, such monetary parameters are still used to help economic analysts to determine health of the financial system, economy, etc.

For digital cryptocurrency, analogous and/or different monetary metrics may be established that are used to track the cryptocurrency. As described above with regard to the automatic auditing, the automatic auditing may provide metadata associated with the cryptocurrency. The monetary metrics may be formulated to provide analogous metrics as conventional monetary metrics for physical money or may represent different metrics that is more particular to the health of the cryptocurrency (e.g., average size of cryptocurrency transactions, average fragmentation of the cryptocurrency, location(s) of largest non-fragmented cryptocurrency, speed of transaction of different size fragmented cryptocurrency, geophysical locations of the cryptocurrency, amount of exchanges of cryptocurrency and physical currency in any form over the past day, week, month, quarter, and year, for example, and so forth). From the monetary metrics, certain insights into the cryptocurrency, markets in which the cryptocurrency is exchanged, and so on may be gleaned by economists, thereby providing a more transparent and "healthier" cryptocurrency marketplace.

Finally, the self-auditing module 319B may, where applicable, allow the platform to withhold applicable taxes related to the distribution of PIICOINs or other types of recompense. In the alternative, the self-auditing module 319B can direct any applicable tax forms and liability requirements to distributees of the platform's PIICOIN or alternate forms of compensation.

Work Token Communications

Figure 3C:
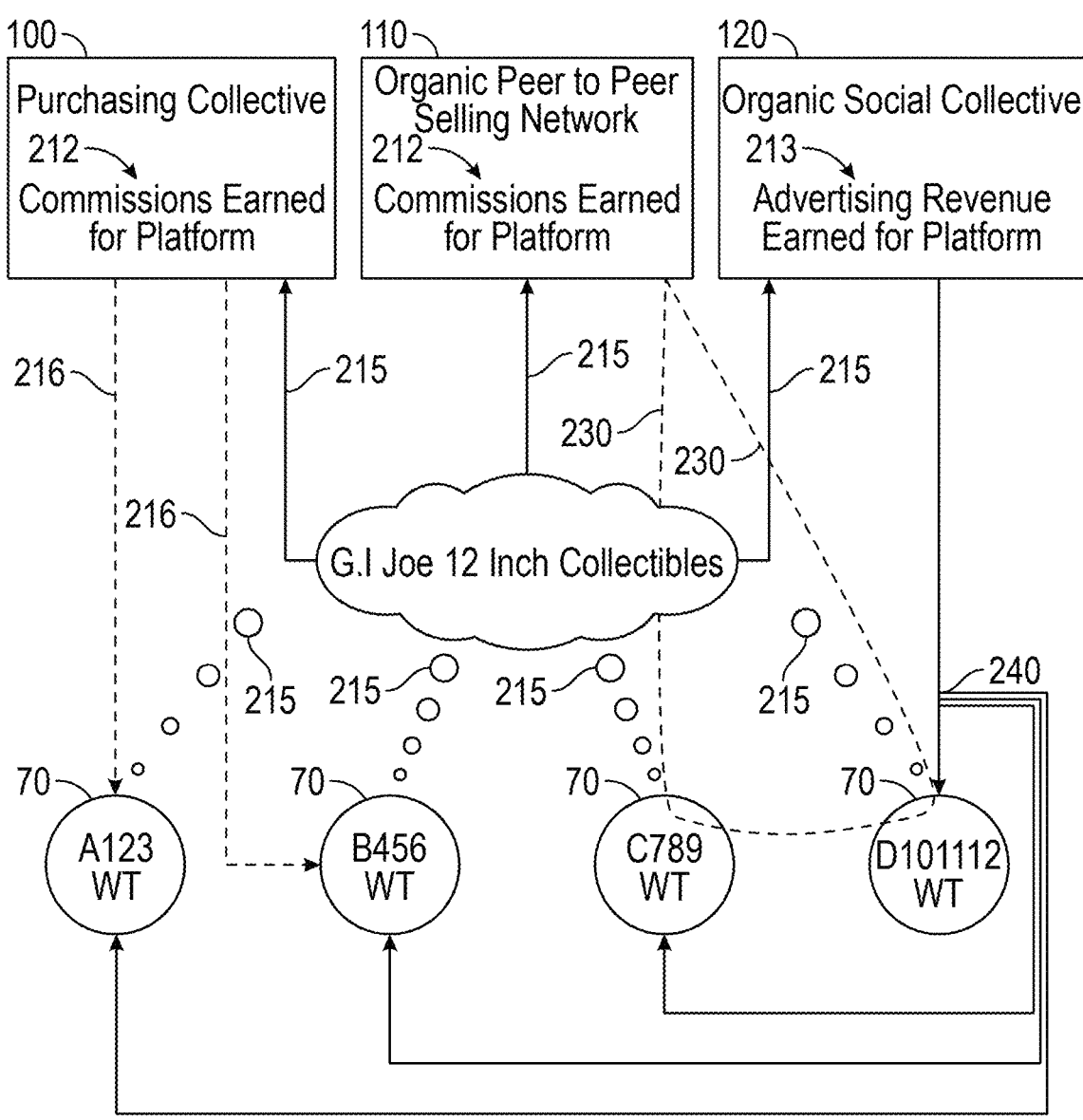
FIG. 3C represents Work Tokens A123, B456, C789 and D101112 independently communicating with one another through artificial intelligence and machine learning through three distinct channels: (1) the Purchasing Collective; (2) Organic Peer-to-Peer Selling Network and (3) the Organic Social Collective.

FIG. 3C represents Work Tokens 70 A123, B456, C789 and D101112 independently communicating 215 with one another through artificial intelligence and machine learning through a common "interest cloud" related to three distinct channels: (1) the Purchasing Collective 100; (2) Organic Peer-to-Peer Selling Network 110 and (3) the Organic Social Collective 120. FIG. 3B demonstrates Work Tokens 70 owned by people 10A with a common interest in 12-inch G.I. Joe collectable soldiers. The Work Tokens 70 recognize a similar hobby interest in their respective assigned Data Contributors 10/10A of collecting 12-inch G.I. Joe action figures. This mutual recognition is shared with the Purchasing Collective 100 which then proceeds to transmit a special offer 209 of a G.I. Joe collectable merchandise at a discounted group purchase for interested Data Contributors A123 and 8456 10/10A. If one or more sales is consummated via the Purchasing Collective 100, then a sales commission 212 is earned by the SCIP system 80. In another embodiment, the same G.I. Joe interest is recognized by a Work Token 70 C789 that has a particular G.I. Joe for sale and another Work Token D101112 that is looking for this particular G.I. Joe (because its owner performed an online search or directly submitted a request via a customized Internet browser or other system (e.g., sales platform) with which the Token interacts or may otherwise utilize).

An offer and sale to cryptocurrency owners 230 may be made between a potential seller Work Token 70 C789 to a potential buyer Work Token 70 D101112. If one or more sales is consummated via the Peer-to-Peer Selling Network 110, then a sales commission 212 is earned by the SCIP system 80. Finally, the respective Work Tokens 70 A123, B456, C789, and D101112 may choose to join a Social Collective 120 or a subgroup of a Social Collective with an interest in G.I. Joe collecting. Advertising revenues 213 from the Social Collective may be generated when products of interest are offered to the respective, representative Work Tokens 70 A123, B456, C789 and D101112 that have joined the Social Collective 120. The sales commissions 212 and advertising revenues 213 are retained by the SCIP system 80 in support of its data-asset backed PIICOINS 70C.

Peer-to-Peer Work Token Communications

Figure 3D:
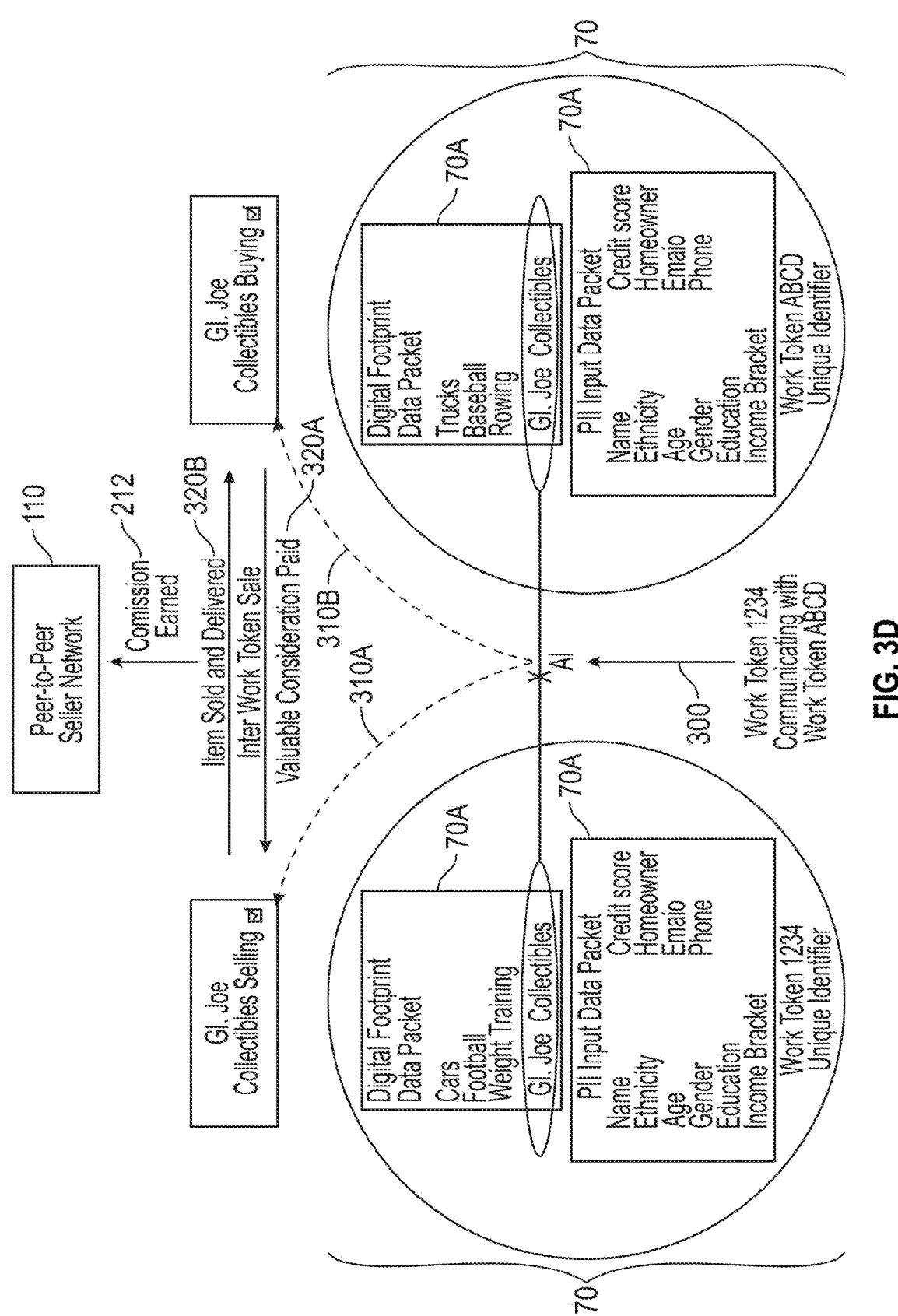
FIG. 3D represents a detailed look at the small business aspect of the Peer-to-Peer Seller wherein two respective Work Tokens independently communicate with one another through artificial intelligence and machine learning.

FIG. 3D of the system further represents how SCIP 80 generated Work Tokens 70 communicate with one another and SCIP 80 sponsored and curated platforms 100, 110, 120 via the SCIP 80 system. Four individual Data Contributors 10/10A, represented in FIG. 3B as A123, B456, C789, and D101112, are represented through Work Tokens 70. As an example of a mutual interest captured from their Work Tokens' 70 PII and digital footprint/presence 70A, each of the respective Work Tokens 70 (A123, B456, C789, and D101112) has an interest 215 in GI Joe 12-inch collective action figures. In one embodiment, the SCIP 80 sponsored Purchasing Collective 100 makes a special GI Joe 12-inch offer all of the SCIP 80 member and owners 10/10A. Of the four Data Contributor 10/10A Work Token 70 owners represented (A123, B456, C789, and D101112), two individual Work Tokens 70 (A123 and B456) through their Data Contributors 10/10A decide to avail themselves 216 of the Purchasing Collective's 100 offer and make the purchase.

The SCIP 80 makes a commission from this sponsored sale and similarly orchestrated sales. In a second embodiment, the SCIP 80 sponsored Peer-to-Peer Selling network 110 matches two Work Tokens (C789 and D101112) with person (C789) having a GI Joe to sell and a person (D101112) who is interested in purchasing this particular GI Joe item. The Work Tokens 70 interact by offering to sell and purchase a GI Joe Figure making a Work Token 70 (C789) to Work Token (D101112) 70 direct sale. The SCIP 80 makes a small commission for helping to orchestrate this type of peer-to-peer Work Token 70 sale. In a third embodiment, all four Work Tokens 70 (A123, B456, C789, and D101112) opt-in to join a Social Collective or Organic Social Network 130 to enjoy, interact, expand and pursue their GI Joe hobby interest. The SCIP 80 earns advertising revenues from those Work Token 70 (A123, B456, C789, and D101112) Social Collective 120 sponsored Data Contributors 10/10A who choose to partake.

Small Business Owner Work Token Communications

Figure 3E:
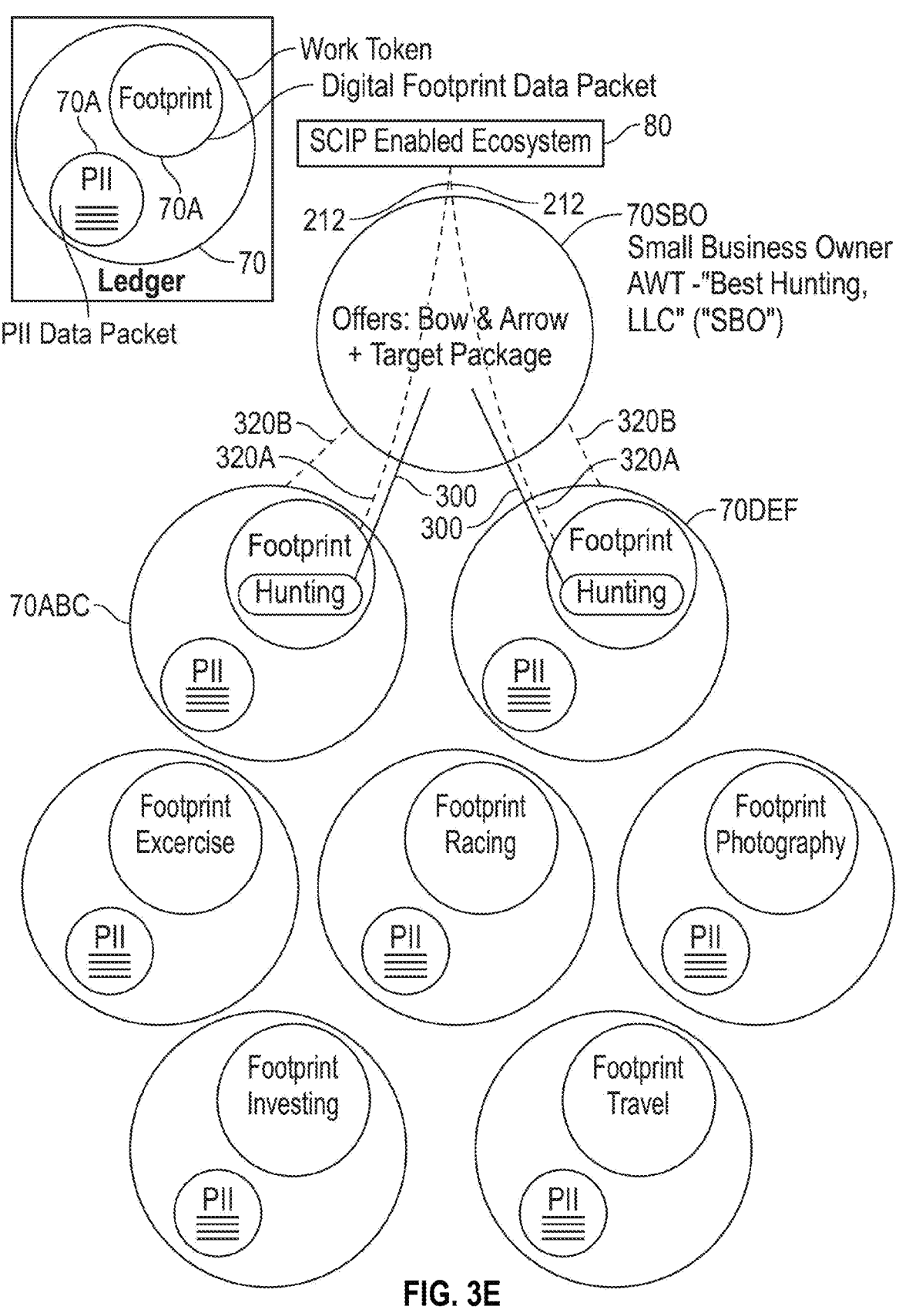
FIG. 3E represents a small business enabled SCIP ecosystem wherein a seller Work Token is able to recognize through artificial intelligence that two Work Tokens out of many different Work Tokens in the SCIP ecosystem show similar interests (as opposed to dissimilar interests) in hunting.

FIG. 3E represents a detailed look at the small business aspect of the Peer-to-Peer Seller Network 110 wherein two respective Work Tokens 70 1234, 70 ABCD independently communicate with one another through artificial intelligence 300 and machine learning. While each Work Token 70/1234, 70/ABCD differs in personally identifiable information and digital footprint packets (including interests) 70A, the Work Tokens 70 1234 and ABCD identify that each party has a mutual interest in 12-inch G.I. Joe collectable action figures. The respective Work Tokens 70 1234 and ABCD using artificial intelligence 300 communicate directly with one another regarding a G.I. Joe collectable that first Work Token 70 1234 owner has for sale and which the second Work Token 70 ABCD owner is interested in purchasing. The Work Tokens proceed to consummate a direct offer 310A, acceptance 310B, pay valuable consideration (fiat or PII-COIN) 320A and arrange delivery 320B of the G.I. Joe collectable. The selling Work Token remits a sales commission 212 to the Peer-to-Peer Seller Network 110 run by the SCIP system 80.

Continuing with FIG. 3E, the figure represents a small business enabled SCIP ecosystem 80 wherein a seller Work Token SBO70 is able to recognize through artificial intelligence 300 that two Work Tokens 70 ABC and DEF out of many different Work Tokens 70 in the SCIP ecosystem 80 show similar interests (as opposed to dissimilar interests) in hunting. Automatically, through artificial intelligence 300, the seller Work Token SBO70 "Best Hunting LLC" offers a special bow and arrow package for sale 320B to the two respective potential purchaser Work Tokens ABC and DEF interested in hunting. The two respective potential purchaser Work Tokens 70 ABC and DEF accept the offer, pay valuable consideration (fiat or PIICOIN) 320A and, in return, the bow and arrow package is delivered on behalf of the seller Work Token SBO70 to the two purchasing Work Tokens 70 ABC and DEF. A commission 212 from the sale is remitted to the enabling SCIP system 80.

Cryptocurrency Platform Communications

Figure 4:
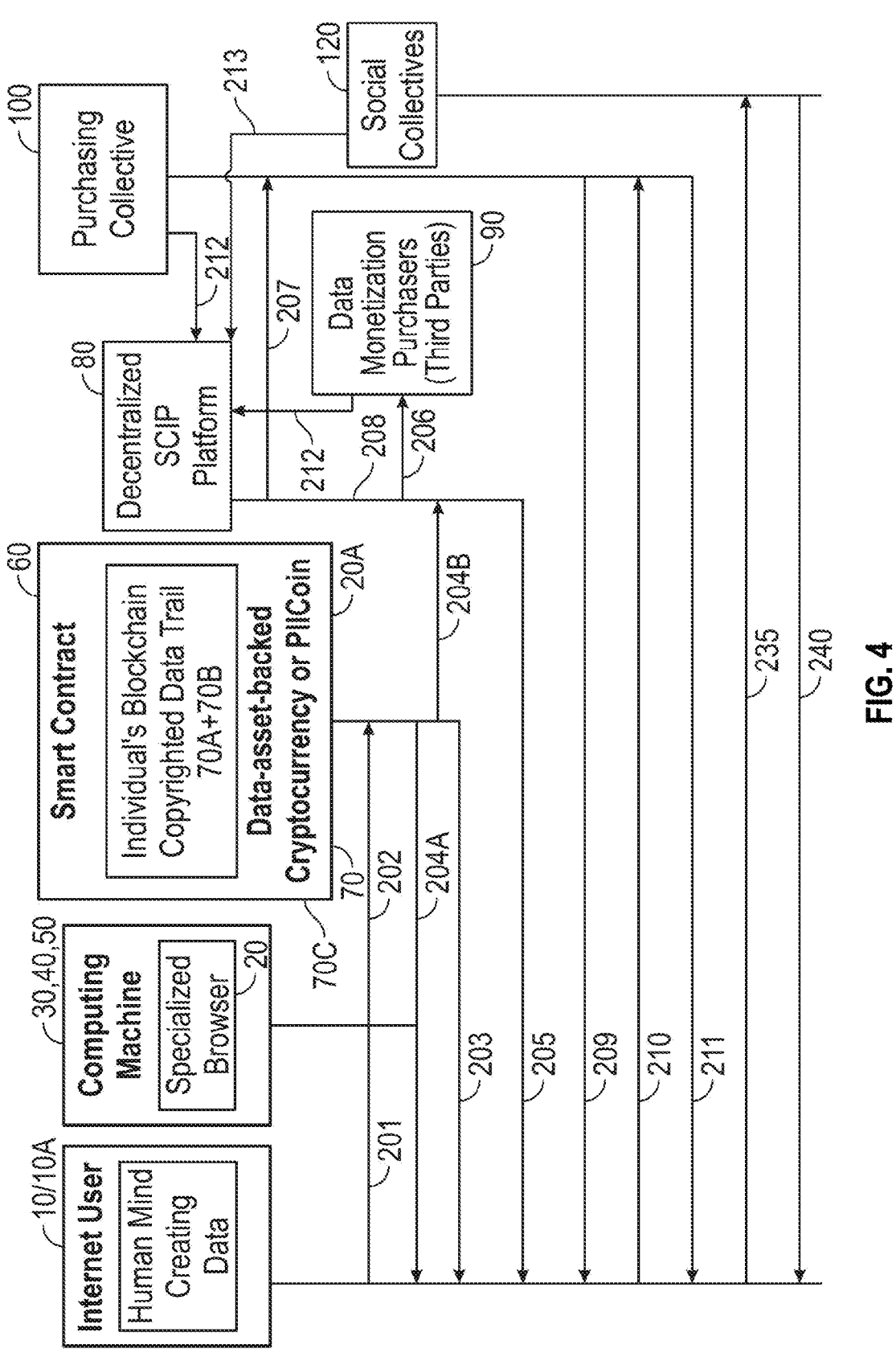
FIG. 4 represents a data flow diagram example of the system's features that generates a Smart Contract that vets a prospective Data Contributor and, if vetting is successful, a Smart Contract is and authorized and enabled to generate, capture, deposit, imprint, blockchain-copyright, non-fungible tokenize, cleanse, sort, analyze, communicate, configure, interrelate with other Smart Contracts, and assign or license or otherwise create shared ownership to accrete value onto a Smart Contract connecting the Smart Contract with other Smart Contracts and the Smart Contract Issuer computing network in congruity with the disclosure.

FIG. 4 of the system represents a monetizable opt-in data flow diagram for a Data Contributor 10/10A subject to be vetted for having committed no known or suspected criminal/public offenses as vetted via a Smart Contract 60. Once a prospective Data Contributor 10/10A is accepted by the Smart Contract 60, the enabled and assigned SCIP 80 generated Work Token 70 may begin generating opt-in PII/digital footprint data asset 70A when interfacing with the Internet or alternative digital network accreting a SCIP 80 Work Token's 70 value 70B. A SCIP 80 Work Token's 70 commercial value 70B is transformed into a distinct data-asset backed PIICOIN 70C value or other form of valuable recompense determined by artificial intelligence using different methods including value-laden tiers or classifications depending on the specific PII/digital footprint data asset 70A criteria sought and purchased by third party purchasers 90. The PII/digital footprint data asset 70A criteria is also used for specific offers communicated 209 to a Data Contributor 10/10A by the Purchasing Collective 100.

A computing machine 30, 40, 50 interfaces 201 with the prospective Data Contributor 10/10A through a specialized Browser 20 to automatically and seamlessly produce 202 an individual SCIP 80 member and Data Contributor's 10/10A blockchain-copyrighted 20A and assigned or licensed or as otherwise developed shared ownership of the PII/digital footprint data asset 70A, which through accepting a Smart Contract 60, produces a singularly identifiable SCIP 80 generated Work Token 70 assigned to a that individual Data Contributor 10/10A. As soon as the individual Data Contributors 10/10A makes the digital declaration and commitment to blockchain-copyright 20A his/her digital trail 70A, proof of the individual user's blockchain-copyright 20A and assignment or licensing or otherwise created shared ownership of his/her data asset 70A is transmitted 203 back to the human user/owner 10/10A. The Data Contributors's 10/10A opt-in PII/digital footprint asset 70A is authenticated 202 and transmitted 204A. Once vetted and accepted 204B, the SCIP 80 member and Data Contributor 10/10A is then electronically sent through the decentralized SCIP system 80 serving as a data repository for all SCIP 80 generated Work Tokens 70 generated by said SCIP system apparatus 80. As used herein, "authenticated" refers to the computing device 30, 40, 50 confirming that the opt-in PII/digital footprint 70A is both accurate and valid.

The decentralized SCIP system 80 generates and sends 205 an individualized Work Token 70 to the human owner/Data Contributor 10/10A. This data capture, encapsulation, and sorting mechanism includes the Data Contributor's 10/10A opt-in PII/digital footprint 70A crypto-identity and value 70B which is transformed into a distinct data-asset backed PIICOIN 70C value or other form of valuable recompense. This recompense value is assigned to the Data Contributor 10/10A. Upon the receipt of said value determination 70B, the human data contributor 10 becomes an actual Data Contributor 10/10A. The SCIP system 80 transmits 206 the data Personal Data 70A to third party data purchasers 90, who purchase the use of the opt-in Personal Data asset 70A housed within a Data Contributor's 10/10A SCIP 80 generated Work Token 70. The third-party data purchasers 90 then remit fiat or another form of valuable payment 208 to the SCIP system 80 to be distributed, in part, and retained, in part, as governed by the mutually agreed Smart Contract 60 between the SCIP 80 and the Data Contributor 10/10A.

Outside data purchasers 90 may include third-party businesses, manufacturers, social policy think tanks, public health, safety and regulatory agencies, and others. These purchasers 90 are interested in compiling trustworthy, transparent real-time opt-in PII/digital footprint data asset collections 70A to influence respective business practices, humanitarian goals, medical research, legislation and other goals. In one preferred embodiment, the specialized Browser 20 provides for the SCIP system server 80 to store and enable the steps 201, 202, 204 to exchange data asset 70A between the SCIP owner's device 30, 40, 50 and issuing SCIP system 80 which determines the SCIP 80 generated Work Token's 70 commercial value 70B which takes the form of a distinct data-asset-backed PIICOIN 70C or other form of recompense including fiat or electronic debit card payment.

Compensation 208, the value 70B of Work Token 70, provided by a data purchaser 90 is routed through the issuing SCIP system 80 and into the individual SCIP 80 Data Contributors's 10/10A digital wallet 10B per the Smart Contract 60. In one embodiment, the Smart Contract 60 leverages the decentralized SCIP system 80 to create a blockchain immutable ledger and record of the issuing SCIP system's 80 initiated data sale transaction using a Data Contributors's 10/10A linked data and digital wallet 10B to the Work Token owner's 10/10A device 30, 40, 50. The commercial data value 70B that is generated is determined in conjunction with the purchase 208 of the data asset 70A by a data buyer 90 to digitally verify the transaction safeguarding the opt-in PII/digital footprint data asset's 70A authenticity and integrity. The Data Contributor 10/10A is entered 207 into a vetted and curated SCIP 80 Purchasing Collective entity 100 that offers quantum discounts (not traditional discounted tokens but time sensitive individually curated offers for specific tiered or sorted groups of SCIP data contributors) on goods/services 210 along with other advantageous terms such as preferred financing along with interactive SCIP 80 generated Work Token 70 also to Peer-to-Peer Selling 110 and Social Networking platforms 120.

The Data Contributor 10/10A can elect to receive and accept goods/services offers 209 generated by artificial intelligence 300, in part, enacted by the SCIP's 80 Digital Footprint, NLP, and Predictive Analysis Engines 70E, 70F, 70G whereby the purchases 210 are then delivered 211 from the Collective Purchasing Entity 100 using the issuing SCIP system's 80 trusted and approved shipper or services provider. If one or more sales is consummated via the Purchasing Collective 100, then a sales commission 212 is earned by the SCIP system 80. As disclosed herein, in one preferred embodiment, to technically capture, blockchain-copyright, store, deposit, cleanse and transmit 20A the targeted opt-in PII/digital footprint data asset 70A derived or mined from a Data Contributor's 10/10A Work Token 70, the SCIP system 80 may utilize an on-board computing resource to capture, blockchain-copyright, compile, cleanse, sort, analyze, transmit the targeted data selection requested by a data purchaser 90 in return for payment 208. In a further embodiment, a Data Contributor 10/10A may choose to join 240 a Social Collective 120 by receiving an invitation 235 through his/her Work Token 70 that may, in part be derived from his/her PII information input 70A into his/her Smart Contract 60 combined with digital footprint information 70A captured and analyzed by the Digital Footprint, NLP, and Predictive Analysis Engines 70E, 70F, 70G (described in FIG. 2). Advertising revenues may generated by those opt-in users 10/10A and remitted 213 to the SCIP 80.

Notably, other networks or combinations of networks for SCIP 80 Data Contributor's 10/10A Work Token 70 formation, transactions, and inter-SCIP multiple owner 10/10A Work Token 70 to Work Token 70 communications may be used. The SCIP system server 80 may transmit the custom data asset selection 70A from its platform 80 to a data purchaser 90 in exchange monetary compensation 208 that is paid to the SCIP system 80 a part of which is allocated to back the SCIP's data-asset backed PIICOIN 70C. In some examples, the SCIP server 80 may apply a hash function to the targeted data asset selection 70A and verify that the contents of the targeted opt-in PII/digital footprint data asset 70A selection has fulfilled a request from the data purchaser 90. A hash function is a cryptographic digital footprint 70A comprised of numbers and characters affixed in series to an informational segment to secure that information, preclude error, and/or be housed on the blockchain as completed transaction. A data purchaser 90 may execute a second hash function to exactly mirror the first hash function representing the desired opt-in PII/digital footprint data asset 70A/70B (collectively a Work Token 70). When the first and second hash functions are identical, a hash value is created to ensure opt-in PII/digital footprint data asset 70A/70B (70) validity and integrity through the SCIP blockchain system 80. This 70A/70B (70) Work Token is transformed into a new data-asset backed cryptocurrency or PIICOIN 70C.

In certain embodiments, the SCIP data intake and processing system 80 may be designed to using machine learning, for example: (1) identify a silo of cultivated Personal Data 70A of particular interest to a data acquirer 90, (2) determine a plurality of data assets 70A including certain data elements of a specific cultivated data silo 70A, the entire data silo 70A, or a group of data silos 70A that individually or collectively best suits the interests of a data acquirer 90, (3) package the Personal Data 70A for commercial sale to data acquirer 90; (4) transmit the data package 70A to data acquirer 90; (5) receive electronic financial recompense for the electronic commercial delivery of said data acquirer 90.

In other certain embodiments, the SCIP data intake and processing system 80 may be designed to: (1) receive a Personal Data 70A subject access request from a data acquirer 90; (2) access the SCIP data intake and processing system 80 data repository to identify the requested data 70A or data sets 70A; (3) determine those Personal Data assets 70A of the plurality of data assets 70A held in the SCIP data repository 80 including any unique data producer-owner 10 identifiers, (4) access the Personal Data of its producer-owner 10 and/or a tier or group of similar producer-owners 10 deposited in each of the data assets 70A of the plurality of data assets 70A stored within the SCIP data repository 80 that include the unique request by the data acquirer 90, and (5) implement one or more actions based on the data 70A subject 10/10A access request.

Smart Contract Processing

FIG. 5 represents processing and machine-readable memory mechanisms that transmit and enable instructions to create a Work Token 70 (including components 70A/70B). Having entered into a Smart Contract 60, instructions are transmitted and enabled using sequential steps 301, 302, 303, 304, 305, 306, 307, and 308. The first step 301 instructs that a prospective SCIP 80 member and Data Contributor 10/10A has agreed to be bound to the Smart Contract 60 thereby blockchain-copyrighting 20A the assenting SCIP 80 Data Contributors's 10/10A PII/digital footprint asset 70A/70B (collectively a Work Token 70) in the individual's name to track, capture, deposit, blockchain-copyright, non-fungible tokenize, imprint, cleanse, sort, analyze, configure, communicate, assign or license or otherwise create shared ownership and issued his/her newly issued/assigned SCIP 80 generated Work Token 70 (collectively 70A/70B). The second step 302 commences tracking of the SCIP 80 Data Contributors's 10/10A Internet and electronic digital usage through a plurality of devices 30, 40, 50. Said devices 30, 40, 50 may incorporate one or more memory resources to compile and store data 70A and/or instructions interfacing with a computing system residing on the SCIP system 80. A computing system 30, 40, 50 may include one or more processing resources to fulfill instructions issued by an operating system (e.g., Windows, etc.) to deliver and enable regular services for applications running on the computing system.

Smart phones and watches, laptops and personal computing systems, tablets, wearable fitness/motion devices and other devices connecting to the Internet-of-Things (IoT) may be incorporated in (non) virtualized architectures. IoT enabled devices include electronic devices and any machine that such devices connecting to a network to allow data flow and transfer. among other cyber-physical systems. The third step 303 instructs the SCIP system's blockchain 80 to continuously record a SCIP 80 Data Contributor's 10/10A everyday digital presence 70A to create a blockchain-copyrighted 20A crypto-identity and continuous associated digital footprint 70A as provided by the special Browser 20 that continuously blockchain copyrights the user's internet and digital activity 70A creating a continuously updated and growing non-fungible token (NFT) 70 doubling as a Work Token 70 that is assigned or licensed or otherwise developed in shared ownership regarding the SCIP data assets' 70A corresponding commercial value 70B. The fourth step 304 issues instructions to assign a specific variable SCIP 80 generated token commercial value 70B which may become or take the form of a distinct data-asset-backed PIICOIN 70C value of one or more PIICOINs 70C or other form of recompense provided to the Data Contributor 10/10A based on his/her online activity/history 70B.

The fifth step 305 issues instructions to pay a distinct data-asset-backed PIICOIN 70C in the form of one or more PIICOINs 70C or alternative form of recompense including but not limited to fiat or electronic debit card payment to the SCIP 80 Data Contributor 10/10A upon a set contractual event 60 or set of events 60. The sixth step 306 offers Data Contributors 10/10A customized access to a curated Purchasing Collective 100, Peer-to-peer Selling Network 110, and/or Social Network 120 based on his/her Work Token value 70B and data predictors or a group interaction of similarly situated Work Tokens 70 whose PII and digital footprint/presence 70A similar data sets can communicate with one another to form a grass-roots purchasing collective and organic social network of like-minded and situated people grouped together by their interests, beliefs, demographics, politics, gender, age, etc.

The seventh step 307 may issue instructions through the communication of multiple suitably identified SCIP 80 generated Work Tokens 70 to the Purchasing Collective 100 to make special offers and accept Data Contributor 10/10A payments using fiat or a Data Contributor's 10/10A earned data-asset-backed PIICOINs 70C through the issuing SCIP system's 80 trusted shippers and services providers. The eighth step 308 issues instructions to execute and deliver a SCIP 80 generated Work Token 70 surrender value 70B which may become or take the form of a distinct data-asset-backed PIICOIN 70C value or other form of recompense should a SCIP 80 Data Contributor 10/10A opt-out of his/her Smart Contract 60 or with the natural death of said Data Contributor 10/10A. While a Work Token 70B may be determined using a variable calculation based on total amount of a PII and digital footprint 70A of a Data Contributor 10/10A, an alternative embodiment of the system may provide for the Data Contributor 10/10A receiving a fixed amount for a minimum amount of data contribution. Still yet, the Work Token 70B may be set to fixed amounts of value when the Data Contributor 10/10A performs an amount of data contribution within different ranges of contribution.

Should the Data Contributor 10/10A contractually opt-out and terminate his/her relationship with the SCIP system 80, that SCIP 80 former member and Data Contributor's 10/10A Work Token 70 will be deactivated and disabled from the issuing SCIP system network 80. The same deactivation/disabling mechanism will automatically trigger and occur upon the death of a former SCIP 80 Data Contributor 10/10A. To store computing protocols, the processing mechanism 30, 40, 50 may include memory mechanisms as partly defined by the capability to execute memory-related tasks. The contemplated memory mechanisms 30, 40, 50 are capable of both volatile and non-volatile memory storage.

Cryptocurrency Value Growth

Figure 6:
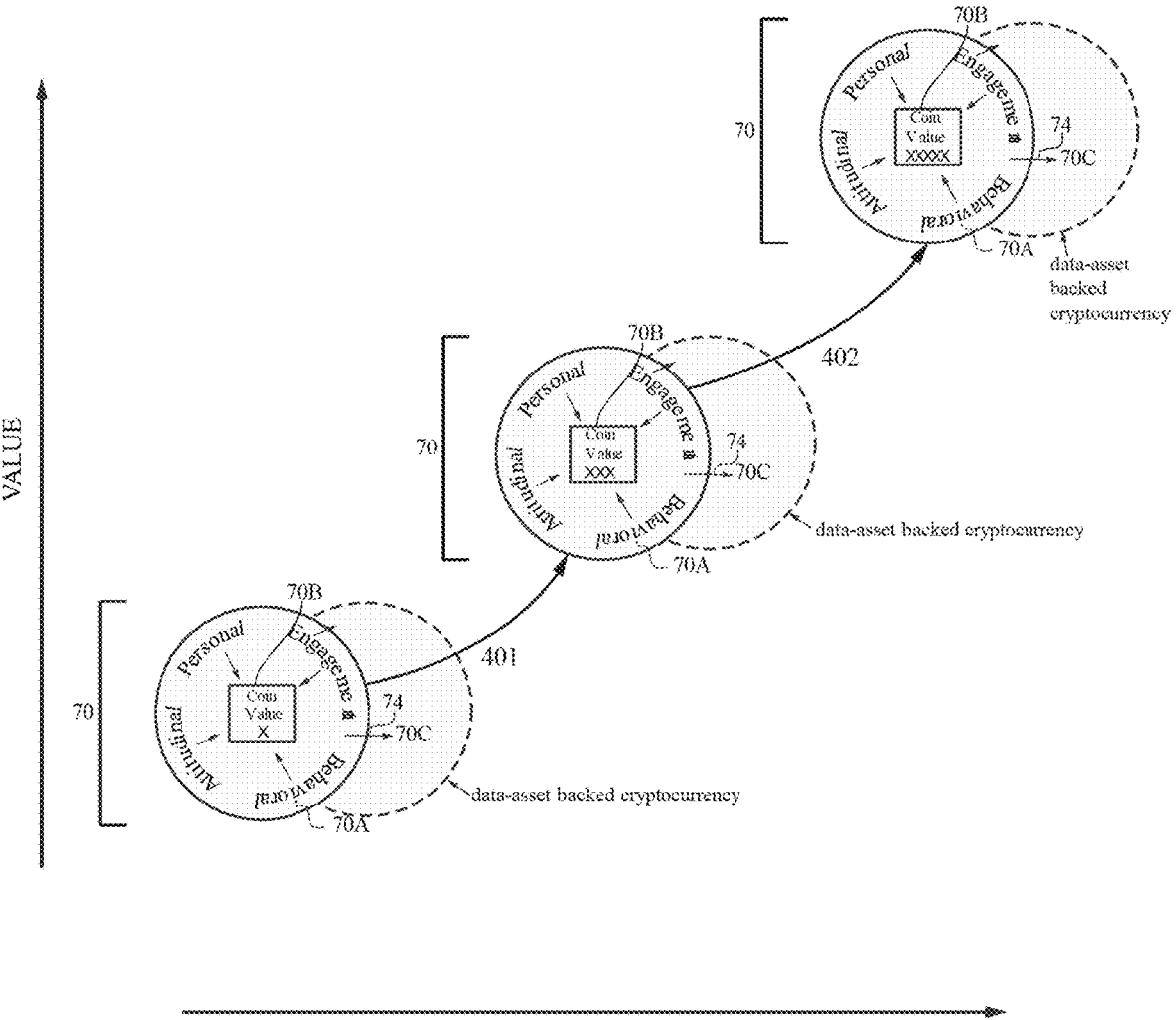
FIG. 6 represents an example of the system's Smart Contract that accretes value over time based on a human being's PII disclosure combined with his/her captured digital activity being tracked, captured, deposited, imprinted, blockchain-copyrighted, cleansed, sorted, analyzed, configured and assigned, licensed or otherwise create shared ownership and communicated via his/her corresponding Smart Contract and resulting data-asset-backed PIICOIN remuneration or alternative reward.

FIG. 6 represents a system's Work Token 70 that continually accretes its commercial value 70B which may become or take the form of a distinct data-asset-backed PIICOIN 70C value or other form of recompense including but not limited to fiat or electronic debit card to compensate the Data Contributor 10/10A for the commercialization of his/her combined PII/digital footprint 70A. As a SCIP 80 member and owner 10/10A continually generates an online presence and an ever-expanding digital footprint 70A (including but not limited to personal, engagement, behavioral, attitudinal and other attributed Personal Data), this data 70A will build commensurate commercial value 70B increasing his/her SCIP Work Token's 70 annual or other set period worth over the course of the active SCIP 80 Data Contributor's 10/10A lifetime.

The following is a recapitulation of fourteen illustrative steps and provides a final purview of the SCIP system's methodology 80:

(1) accessing a human's 10 personal identifiable information (PII) and digital presence/footprint 70A by one or more computing processors 30, 40, 50, via one or more computer networks 20, 60, 70, 80;

(2) providing an application to blockchain copyright a Data Contributor's 10/10A PII/digital presence/footprint 70A by one or more processors 30, 40, 50, the one or more data assets 70A to generate a blockchain of copyrighted 20A Personal Data 70A associated and owned by one Data Contributor 10/10A;

(3) providing a continually updated copyright application that serves to keep current all of the Personal Data 70A of a Data Contributor's 10/10A up-to-date and in-force with a governmental copyright organization;

(4) securely storing, by one or more processors 60, 70, 80, the generated blockchain copyrighted 20A Personal Data 70A in a secure computer memory or series of secure computer memories 80 or in a remote computing cloud or alternative computing device 30, 40, 50;

(5) sorting, analyzing, tiering, grouping and cataloging the individualized Personal Data 70A;

(6) creating a digital Work Token 70 to assign, represent, categorize, catalog, and provide individualized Work Token ownership 70 of the individualized Personal Data 70A on the behalf of the Data Contributor 10/10A;

(7) using a computer process or series of processors employing artificial intelligence and specialized algorithms, 20, 60, 70, 80 to assign a commercial value 70B to the individualized Personal Data 70A to be housed on the digital Work Token 70;

(8) providing the application 60 to license or assign the valuable commercially rendered individualized Personal Data 70A;

(9) compiling and adding the individualized Personal Data 70A to centralized data pool of like individualized Personal Data 70A stored in a secure computer memory or series of secure computer memories 80 or in a remote computing cloud or alternative computing device 30, 40, 50;

(10) the Data Contributor 10/10A of the individualized Personal Data 70A is invited electronically to participate in a Purchasing Collective 100, with other Data Contributors 10/10A of both separate and grouped individualized Personal Data 70A who are offered quantum discounts for goods and services from select vendors 100 along with invitations to partake in Peer-to-Peer Collectives 110 and Social Collectives 120.

(11) in response to the Data Contributors 10/10A of the individualized Personal Data 70A submitting an application 60 to the SPIC data repository 80 to create recompense 70B in the form a data-asset backed PIICOIN 70C;

(12) the data-asset backed PIICOIN 70C is backed by the revenues 208 generated by an enormous Data Repository 80 produced by Data Contributors 10/10A of the system;

(13) the data-asset backed PIICOIN 70C is also backed by the revenues 208 generated by commissions earned by providing the Purchasing Collective 100; Peer-to-peer Seller Collective 110; and Social Collective 120.

(14) the data-asset backed PIICOIN 70C is also backed by the value attributed to the massive data pool 70A of Data Contributors 10/10A of the system.

Illustrative System and Process Features

A computer-implemented method, comprising: generating, by first computing devices, raw data sets representative of activities performed by respective users while each of the users is using the Internet; determining, by a second computing device, an aggregate data value of at least a portion of an aggregate of the raw data sets, the at least a portion of the aggregate of the raw data sets being received from the users who contribute that portion of the raw data sets, the contributing users being data contributors; establishing, by the second computing device, a basis value of a cryptocurrency as a function of the aggregate data value; and regulating total quantity of the cryptocurrency in circulation as a function of the aggregate data value.

Establishing the basis value of the cryptocurrency may include calculating the basis value as a function of the aggregate data value. Establishing the basis value may further include calculating the basis value as a function of the market value of the cryptocurrency. Determining market value of the cryptocurrency may be based on the cryptocurrency exchange value and/or volume of cryptocurrency exchanges.

The process may further include calculating, by the second computing device, individual data value of at least a portion of each of the raw data sets as an apportionment from the aggregate data value; calculating, by the second computing device, an amount of cryptocurrency to be distributed to each of the respective users as a function of the individual data value; and automatically distributing the calculated amount of cryptocurrency to the respective users. Automatically distributing the calculated amount of cryptocurrency to respective users may include automatically applying the calculated amount of cryptocurrency to the respective users via digital wallets. Calculating an amount of cryptocurrency to be distributed may include periodically calculating an amount of cryptocurrency. Periodically calculating an amount of cryptocurrency may include calculating an amount of cryptocurrency to be distributed to each of the respective users on a quarterly basis.

The process may further include executing, by the first computing device, a browser that enables a user to access the Internet; enables the users via the browser to opt into the browser to collect the raw data sets as the users use the browser to perform the activities on the Internet; and collects, by the browser, opt-in activities performed by the respective users on the Internet. The process may further include enabling, by the first computing devices from respective users, personal identifiable information (PII) of the users inclusive at least of demographic and financial parameters; receiving, by the first computing devices from the respective users, at least a portion of the PII submitted by respective users; where determining an aggregate data value further includes determining an aggregate data value by using both the at least a portion of the PII in addition to the at least a portion of the raw data sets of the respective users; and where calculating individual data value includes calculating individual data value using both the at least a portion of the PII and at least a portion of the raw data sets of the respective users.

The process may further include parsing and recording, by the first computing device, selectable PII data chosen by the Smart Contract owner. The process may further include enabling the user to turn ON and turn OFF the collection of selectable PII and selectable raw data associated with Internet usage via a browser that enables the user to perform Internet usage.

Calculating, by the second computing device, an amount of cryptocurrency may include applying weightings to the demographic and financial parameters submitted by the respective users. Collecting, by the browser, may include storing data of the opt-in activities on the Internet of the users on blockchains associated with the respective users. Enabling, by the browser, the users to select types of PII and opt-in activities collected as portions of the raw data sets to submit; and wherein determining, by the second computing device, the aggregate data value of the at least a portion of an aggregate of the raw data sets includes determining an aggregate data value of the opt-in activities, the aggregate data value being a function of commercial value of the opt-in activities.

The process may further include generating terms and rules of a smart contract for each of the users; applying the terms and rules to the respective smart contracts; and storing the smart contracts with the terms and rules onto respective blockchains, thereby causing a browser that supports, monitors, and records Internet usage by the user to be collected as opt-in activities based on the terms of the smart contract.

The process may further include enabling, by the first computing devices of respective users, personal identifiable information (PII) of the users inclusive at least of demographic and financial parameters to be submitted; applying the PII of the users to respective smart contracts; and enabling, by the first computing devices, the respective users to select activities on the Internet as raw data sets to submit for individual data value.

The process may further include storing the smart contracts of respective users onto blockchains of the respective users. The process may further include executing an artificial intelligence algorithm to determine one or more categories in which the respective users are identified based on the activities on the Internet stored on the respective blockchains. The process may further include enabling the user to change the submitted PII and reselected activities on the Internet as raw data sets to submit for individual data value.

Automatically regulating total quantity of the cryptocurrency in circulation may includes releasing reserve minted cryptocurrency into circulation in response to the basis of the aggregate data value increasing; and collecting the cryptocurrency from circulation.

The process may further include submitting at least a portion of the raw data sets for copyright protection to a governmental organization. The process may further include generating work tokens for each of the data contributors, the work tokens storing personally identifiable information (PII) and digital footprint along with data value; assigning data value to the work token; and storing the data value in the work token, the work token being a non-fungible token (NFT).

The process may further include enabling the work tokens to communicate with one another using artificial intelligence directly or indirectly. The process may further include establishing an application with which each of the NFTs are able to communicate using artificial intelligence and machine learning to receive and respond to commercial offers, social causes, or directly between and amongst the NFTs; and in response to the application determining that a first and a second NFT have a commonality, algorithmically causing the first and second NFTs to communicate with one another on an opt-in basis to establish shared affinities to form groups of personal NFTs interacting on the basis of the shared affinities.

The process may further include determining, using artificial intelligence and/or machine learning, commonality of first and second NFTs. The process may further include establishing an application with which each of the NFTs are able to communicate; and in response to the application determining that a first and a second NFT have a commonality determined by artificial intelligence and machine learning, enabling users associated with the respective NFTs to engage with the application. Enabling the users to engage with the application may include enabling the users to engage with dating or other type of electronic human affinity interaction applications.

Additional Illustrative System and Process Features

A computer-implemented system and method may include collecting, by a first computing device, selectable personal identifiable information (PII) or Personal Data associated with the first user; generating a Smart Contract that resides on a blockchain which may be individualized, the Smart Contract contractually binding the first user Data Contributor and a third-party administrator; generating a self-sovereign Work Token digital identity through the Smart Contract providing individuals with control of their digital personality and presence to prohibit the (un) intended or non-permissioned sharing of users' personal data; monitoring, by the first computing device, Internet usage of the Data Contributor to generate a raw data set; generating, by the first computing device, a processed data set based on the raw data set from the monitored Internet usage; collecting, by a second computing device, the processed data set from the first computing device; parsing and recording, by the first computing device, selectable processed PII data chosen by the Smart Contract owner; applying, by the first or second computing device, an artificial intelligence algorithm as governed by terms and rules of the Smart Contract to the collected processed data set to digitally protect, identify, categorize and store the processed data sets; determining value of the processed selectable Personal Data set based on commercial market value to produce a work value created by the user; computing, by the second computing device, a data-asset backed cryptocurrency value derived from the work's commercial value; and adding, by the second computing device as governed by the Smart Contract, the specialized cryptocurrency to a previously distributed amount of cryptocurrency in a digital wallet on the blockchain allowing the Data Contributor to accrue said cryptocurrency amounts thereby enabling the user, should he or she choose, to purchase goods, services, using the cryptocurrency in the digital wallet or exchange said in the wallet for other types of cryptocurrency or fiat.

Monitoring may include executing a browser that enables a Data Contributor to access the Internet; and collecting, by the browser, opt-in activities performed by the Data Contributor on the Internet. The first Data Contributor may be an opt-in user, and wherein collecting activities includes collecting and combining both opt-in PII and digital activities that may, at the user's election, be shielded from all third parties.

Generating the processed data set may include generating the processed data set at a particular point-in-time that is both an aggregate or selectable data portion set depending on a first user's data collection preference of the raw data set's elements over a time interval. Generating the processed data set may be performed periodically as set forward in terms and rules of the Smart Contract. The PII may be stored onto a blockchain or individualized blockchain associated with the first user. The process may further include storing the user's raw data set onto the Data Contributor specific blockchain. The process may further include generating the Smart Contract that resides on the blockchain, and wherein the third-party administrator collects and processes the processed data set to generate the cryptocurrency reward value or other form of compensation representing the commercial work value of said processed data.

The process may further include performing, by the Smart Contract, cryptocurrency additional rewards to the digital wallet of the user. The process may further include providing, by the first computing device, a Data Contributor interface to the Data Contributor to enable the Data Contributor to (i) enter the user's entire or selectable Personal Data through a third party-administrator PII intake form and (ii) submit boundaries for capturing raw data of Internet of the user; receiving, by the first computing device, the PII, Internet-use and other data-related boundaries from the user; generating the terms and rules of the Smart Contract based on Data Contributor selected PII and Internet-use boundaries; setting the terms and rules of the Smart Contract; and storing the Smart Contract with the terms, rules, Data Contributor selected PII and Internet-use boundaries onto the blockchain, thereby causing a browser that supports, monitors, and records Internet by the Data Contributor to be restricted based on the terms of the Smart Contract as defined by Data Contributor control of selected PII and Internet-use boundaries.

The process may further include enabling the Data Contributor to establish times during which collection of raw data is performed by updating the boundaries stored in the Smart Contract. The process may further include enabling the Data Contributor to turn ON and turn OFF the collection of selectable PII and selectable raw data associated with Internet usage via a browser that enables the Data Contributor to perform Internet usage.

The process may further include collecting, by a plurality of third computing devices, personal identifiable information (PII) associated with a plurality of second users; generating a plurality of Smart Contracts that reside on a shared or user-specific individualized blockchain, the Smart Contracts contractually binding the respective second users and the third-party administrator; monitoring, by the third computing devices, Internet usage of the respective second users to generate a cumulative raw data set; generating, by the third computing devices, a plurality of processed data sets based on the raw or derivative select data sets from the monitored Internet usage of the respective second users; collecting, by the second computing device, the processed data sets from the second computing devices; applying, by the second computing device, the artificial intelligence algorithm as governed by terms and rules of the respective Smart Contracts to the collected processed data sets to identify and categorize the processed data sets of the respective second users; determining value of the respective processed data sets based on monetizable market data value to produce a commercial work value created by the respective second users; computing, by the second computing device, cryptocurrency reward values derived from and representative of the commercial work values of the respective second users; and adding, by the second computing device as governed by the Smart Contract, the cryptocurrency to a previous amount of cryptocurrency in digital wallets on the blockchain of the respective second users, thereby enabling the Data Contributor to purchase goods, services, and to initiate exchanges using the cryptocurrency in the digital wallet.

The process may further include establishing, by the second computing device, a total commercial work value of the first users and second users based on the processed data sets of the first and second users of a Work Token, thereby providing a data asset-backed value for the cryptocurrency provided to the first and second users. The process may further include determining, by the second computing device, a total commercial work value of the first and second users based on the processed data sets during repeated timeframes as set forward in terms and rules of the Smart Contracts.

The process may further include establishing a Work Token or non-fungible token (NFT) for each of the first and second users; and assigning the commercial work value of each of the respective first and second users to respective non-fungible tokens of each of the first and second users. The process may further include enabling each of the NFTs to communicate using artificial intelligence with one another directly or indirectly. The process may further include establishing an application with which each of the NFTs are able to communicate with the system platform using artificial intelligence and machine learning to receive and respond to commercial offers, social causes, or, alternatively, directly between and among NFTs; and in response to the application determining that a first and a second NFT have a commonality, algorithmically causing the first and second NFTs to communicate with one another on an opt-in basis to establish a commercial or personal affinity that may lead to large groups of personal NFTs interacting on the basis of shared affinities.

The process may further include determining, using artificial intelligence and machine learning, commonality of the first and second NFT. The process may further include establishing an application with which each of the NFTs are able to communicate; and in response to the application determining that a first and a second NFT have a commonality determined by artificial intelligence and machine learning, enabling users associated with the respective NFTs to engage with the application.

Enabling the users to engage with the application may include enabling the users to engage with a dating or other type of electronic human affinity interaction applications. The process may further include repeatedly monitoring, generating, collecting, applying, determining, computing, and adding based on terms and rules of the Smart Contracts.

Generating the Smart Contracts may include generating at least one term and rule of each of the Smart Contracts that are common with one another, wherein the at least one term and rule includes establishing a date that the cryptocurrency recompense values are computed and added to the digital wallets of the respective first and second users.

Creating a copyrightable Work Token or NFT comprised of Data Contributor controlled selectable data may include but not be limited to Data Contributor survey, analytic, review mining and buyer persona data supplied by the Data Contributor to the platform and then assigned to the first Data Contributor as a function of the raw data of the first user.

The process may further include storing the copyrightable NFT assigned to the first Data Contributor on a blockchain on which the Smart Contract of the first Data Contributor is stored. The process may further include registering the copyrightable NFT assigned to the first Data Contributor with a copyright registration governmental organization. The process may further include establishing an application with which a third-party is able to communicate with a first party NFT; and in response to the application determining that a first NFT has a commonality with an offering by the third-party, enabling the first Data Contributor associated with the NFT to engage with the application.

A computer-implemented method for collecting and using information based on browsing history may include tracking, by a specialized Internet browser, domains of which a Data Contributor visits on the Internet; storing, by the specialized Internet browser, browsing history of the domains visited by the Data Contributor in a protected manner that is inaccessible to others; enabling, the Data Contributor to selectably share at least a portion of the browsing history to a browsing history collection platform for usage thereby; and sharing at least a portion of the browsing history with the browsing history collection platform.

Storing the browsing history may include storing the browsing history in cookies or alternative data tracking and capture mechanisms. Enabling the Data Contributor to selectably share includes enabling the Data Contributor to selectably share by the browser. Enabling the Data Contributor to selectably share includes providing the Data Contributor with a Data Contributor interface to select particular portions of browser history to share; and enabling the Data Contributor to submit the selected particular portions of browsing history.

The process may further include collecting selected categories of domains for the Internet browser to store in the browsing history; and wherein tracking includes tracking domains limited to the selected categories.

The process may further include storing the browsing history of the selected categories into a blockchain independent of browsing history of categories not selected by the user. Sharing the at least a portion of the browsing history may include storing the stored browsing history into blocks on a blockchain accessible to the browsing history collection platform.

The process may further include storing the browsing history in a protected manner by encrypting and copywriting the browsing history. Storing may include storing data associated with each domain visited by the Data Contributor in a block on a blockchain; and encrypting the data stored in each block on the blockchain. The process may further include parsing the stored browsing history; and generating a data set score or commercial value as a function of the parsed browsing history.

The process may further include receiving, from the browsing history collection platform, a data set score associated with the at least a portion of the browsing history shared with the browsing history collection platform. The process may further include receiving, from the browsing history collection platform, a compensation value as a function of the data set score. Receiving the compensation may include receiving the compensation in the form of a cryptocurrency or fiat or electronic debit card or some other form of valuable consideration.

Receiving, from the browsing history collection platform, compensation as a function of the shared at least a portion of the browsing history to the browsing history collection platform. The process may further include automatically arranging the stored browsing history data into a format that represents different interests of the user.

The process may further include submitting the arranged, tangible form of expression and stored browsing history to a governmental organization for copyright protection. The process may further include enabling the browser to track the domains of which the Data Contributor visits based on time. The process may further include enabling the browser to track the domains of which they use a visit based on geography. The process may further include enabling the browser to track the domains of which they use a visit based on network location.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the presently claimed invention.

The preceding description of the disclosed embodiments is provided to enable any person skilled in the art to make or use the presently claimed invention. Various modifications to these embodiments will be readily apparent to those skilled in the art, and the generic principles defined herein may be applied to other embodiments without departing from the scope of the invention. Thus, the claimed invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A computer-implemented method, comprising:
creating, by a first computing device, a work token associated with a user, the work token being a non-fungible token (NFT) including a personal identifiable information (PII) portion and a digital footprint portion;
executing, by a first computing device, a user interface that enables the user to access online information;
enabling, via a smart contract, the user to opt into collecting raw data sets of the online information being accessed as the user utilizes the user interface to perform online activities;
enabling, by the first computing device and via the smart contract, personal identifiable information (PII) unique to the user and inclusive of at least one of demographic parameter to be submitted by the user;
receiving, by the first computing device, no PII information or at least a portion of the PII submitted by the user;
storing, by the first computing device, the PII submitted by the user in the PII portion of the work token;
collecting, by the first computing device, raw data sets of the information as the user performs online activities via the user interface, the raw data sets defining unique expressions defined by the online information accessed by the user utilizing the user interface;
executing a classification engine to automatically classify the raw data sets of the collected online information into specific categories for the user;
executing a digital footprint engine to process the classified raw data sets of the user to generate a digital footprint of the user;
storing the digital footprint of the user inclusive of the classified raw data sets of the user in the digital footprint portion of the work token;
based on terms of the smart contract, in response to determining that the user submitted PII information, enabling the user to selectably submit or refrain from submission data of the digital footprint and PII of the user, or in response to determining that the user submitted no PII information, enabling the user to selectably anonymously submit the data of the digital footprint; and
communicating, by the work token, directly or indirectly with an application configured to access and process the stored digital footprint and/or PII associated with the user selected to be submitted in exchange for remuneration and/or other forms of compensation on behalf of the user from a third-party that operates the application.

2. The method according to claim 1, wherein the digital footprint of the user is a unique digital footprint of the user relative to digital footprints generated by other users who perform other online activities.

3. The method according to claim 1, wherein enabling the work token to directly or indirectly communicate with an application includes enabling the worktoken to directly or indirectly communicate with an application using artificial intelligence and/or machine learning.

4. The method according to claim 1, further comprising calculating, by an individual data value calculator being executed by the computing device, individual data value of the user as a function of at least a portion of the digital footprint and at least a portion of the PII.

5. The method according to claim 1, wherein enabling the work token to directly or indirectly communicate with an application includes enabling the worktoken to directly or indirectly communicate with an application of a third-party that is an advertiser.

6. The method according to claim 1, wherein enabling the work token to directly or indirectly communicate with an application includes enabling the worktoken to directly or indirectly communicate with the application to receive and respond to commercial offers and/or social interactions.

7. The method according to claim 1, wherein:

forming a work token for the user includes forming one and only one work token that is a non-fungible work token;

preventing the work token from being transferable from the digital wallet; and storing the non-fungible work token in a digital wallet associated with the user.

8. The method according to claim 1, wherein enabling the work token to directly or indirectly communicate with an application includes enabling the worktoken to directly or indirectly communicate PII with the application, the PII including financial information of the user.

9. The method according to claim 1, wherein enabling the work token to directly or indirectly communicate PII with the application, the application configured to determine credit score.

10. The method according to claim 1, further comprising enabling work token to be updated by the application so as to update a credit score and/or financial standing of the user.

11. The method according to claim 1, wherein enabling the work token to directly or indirectly communicate with an application includes enabling the worktoken to directly or indirectly communicate PII with the application, the PII including financial information of the user, and wherein the application is configured to determine at least one financial metric of the user to enable the application to supply to potential advertisers for establishing bids for advertising to the user.

12. The method according to claim 1, further comprising:

generating terms and rules of at least one smart contract for the user;

applying the terms and rules to the respective at least one smart contract;

storing the at least one smart contract with the terms and rules onto at least one respective blockchain, thereby causing the user interface that supports, monitors, and records Internet usage by the user to be collected as opt-in activities based on the terms of the respective at least one smart contract;

applying the PII of the user to the respective at least one smart contract;

enabling, by the first computing device, the user to select activities on the Internet as raw data sets to submit for individual data value;

storing the at least one smart contract of the user onto the at least one blockchain of the users; and executing the at least one smart contract of the user with the third-party to enable the application to access the digital footprint and PII of the work token in exchange of the remuneration and/or other forms of compensation.

13. The method according to claim 12, wherein enabling the work token to directly or indirectly communicate with an application includes enabling the work token to directly or indirectly communicate PII with the application, the PII including financial information of the user.

14. The method according to claim 12, wherein enabling the work token to directly or indirectly communicate PII with the application, the application configured to determine a credit score and enabling worktoken to be updated by the application so as to update a credit score of the user.

15. The method according to claim 1, further comprising enabling, via the user interface, the user to (i) disable collection of the raw data sets, and (ii) enable collection of the raw data sets as a function of at least one smart contract agreed to by the user.

16. The method according claim 1, wherein creating the work token inclusive of the digital footprint portion includes creating the work token inclusive of a digital footprint portion that is tiered, and wherein storing the digital footprint of the user includes storing the classified raw data sets of the digital footprint of the user in a tiered manner.

17. The method according to claim 1, further comprising converting the PII and digital footprint stored in the work token using artificial intelligence and/or machine learning to a value for the remuneration and/or other forms of compensation on behalf of the user from the third-party that operates the application.

18. The method according to claim 1, further comprising generating a graphical representation of the amount of different classified raw data sets of the stored digital footprint of the user, thereby providing the user with the ability to view the graphical representation so as to view interests and behaviors.

19. The method according to claim 1, wherein storing, by the first computing device, the PII portion and digital footprint includes storing the PII portion and digital footprint only on an electronic device of the user on which the first computing device is operating.

20. The method according to claim 1, further comprising detecting a bot or other automated tool that purports to be the user, automatically stopping the bot or other automated tool from enabling the purported user from submitting PII and collecting raw data sets.

21. A computer-implemented method, comprising:

executing, by a first computing device, a user interface that enables a user to access online information;

enabling, via a smart contract, the user to opt into collecting raw data sets of the online information being accessed as the user utilizes the user interface to perform online activities;

collecting, via the user interface, raw data sets of the information as the user performs online activities;

enabling, by the first computing device and via the smart contract, personal identifiable information (PII) unique to the user and inclusive at least one of demographic parameter to be submitted by the user;

receiving, by the first computing device, no PII information or at least a portion of the PII submitted by the user;

generating, by the first computing device, raw data sets representative of activities performed by the user while the user using the user interface is performing the online activities;

storing the raw data sets in work token defined by a data structure associated with the user, the raw data sets defining unique expressions defined by the online information accessed by the user utilizing the user interface;

executing a classification engine to automatically classify the raw data sets of the collected online information into specific categories for the user;

executing a digital footprint engine to process the classi-
fied raw data sets of the user to generate a digital
footprint of the user;

forming a work token for the user as a combination of the
digital footprint and PII of the user;

based on terms of the smart contract, in response to
determining that the user submitted PII information,
enabling the user to selectably submit or refrain from
submission data of the digital footprint and PII of the
user, or in response to determining that the user sub-
mitted no PII information, enabling the user to select-
ably anonymously submit the data of the digital foot-
print; and enabling the work token to directly or indirectly commu-
nicate with an application configured to communicate
with the work token so as to process the work token to
at least in part determine a credit score of the user.

22. The method according to claim 21, wherein storing,
by the first computing device, the PII portion and digital
footprint includes storing the PII portion and digital foot-
print only on an electronic device of the user on which the
first computing device is operating.

23. The method according to claim 21, further comprising
detecting a bot or other automated tool that purports to be the
user, automatically stopping the bot or other automated tool
from enabling the purported user from submitting PII and
collecting raw data sets.

\* \* \* \* \*